United States Patent [19]
Yamaguchi et al.

[11] Patent Number: 5,520,858
[45] Date of Patent: May 28, 1996

[54] LIQUID VAPORIZING APPARATUS

[75] Inventors: Tooru Yamaguchi; Kouichirou Tsutahara; Takayuki Suenaga, all of Itami, Japan

[73] Assignees: Mitsubishi Denki Kabushiki Kaisha, Tokyo; Ryoden Semiconductor System Engineering Corporation, Hyogo, both of Japan

[21] Appl. No.: 244,265

[22] PCT Filed: Sep. 21, 1993

[86] PCT No.: PCT/JP93/01353

§ 371 Date: Jul. 25, 1994

§ 102(e) Date: Jul. 25, 1994

[87] PCT Pub. No.: WO94/06529

PCT Pub. Date: Mar. 3, 1994

[30] Foreign Application Priority Data

Sep. 21, 1992 [JP] Japan ................................. 4-251461

[51] Int. Cl.$^6$ ................................................. B01F 3/04
[52] U.S. Cl. ......................... 261/130; 261/142; 261/131; 261/122.1; 261/153; 261/23.1
[58] Field of Search .................... 261/142, 130, 261/131, 122.1, 153, 23.1

[56] References Cited

U.S. PATENT DOCUMENTS

| | | | |
|---|---|---|---|
| 2,514,463 | 7/1950 | Bayers, Jr. ........................... | 261/130 |
| 4,165,360 | 8/1979 | Casper et al. ........................ | 422/202 |
| 4,276,243 | 6/1981 | Partus .................................. | 261/142 |
| 4,436,674 | 3/1984 | McMenamin ......................... | 261/130 |
| 4,477,395 | 10/1984 | Albarda ............................... | 261/131 |
| 4,618,462 | 10/1986 | Fisher .................................. | 261/142 |
| 4,652,408 | 3/1987 | Montgomery ........................ | 261/130 |
| 4,861,524 | 8/1989 | Sielaff et al. ......................... | 261/130 |
| 4,897,226 | 1/1990 | Hoyle et al. ......................... | 261/130 |

FOREIGN PATENT DOCUMENTS

| | | |
|---|---|---|
| 53-135885 | 11/1978 | Japan . |
| 56-37486 | 4/1981 | Japan . |
| 56-67574 | 6/1981 | Japan . |
| 61-204602 | 12/1986 | Japan . |
| 4-63189 | 2/1992 | Japan . |

*Primary Examiner*—Tim R. Miles
*Attorney, Agent, or Firm*—Leydig, Voit & Mayer

[57] ABSTRACT

A liquid vaporizing apparatus includes a container for holding a liquid at a constant temperature with a temperature adjustment unit and a gas that does not react with the liquid is bubbled through the liquid in the container to vaporize the liquid. The container for holding the liquid has an internal space above the liquid and a second temperature adjustment unit for controlling the temperature of the internal space separately from the temperature of the liquid in the container. Since the internal space is maintained at a constant temperature, higher than the temperature of the liquid, the quantity of the vaporized liquid produced is stable.

8 Claims, 50 Drawing Sheets

5,520,858

LIQUID VAPORIZING APPARATUS

This application is a 371 of PCT/JP93/01353 09/21/93.

TECHNICAL FIELD

This invention relates to a liquid vaporizing apparatus for vaporizing liquid, and more particularly to a liquid vaporizing apparatus for use in a chemical gas-phase growth process for manufacturing semiconductors.

BACKGROUND ART

As a conventional liquid vaporizing apparatus, description will be made about a chemical gas-phase growth apparatus that vaporizes liquid material to use it as reaction gas so as to form a silicon oxide film, and, more particularly, about a liquid vaporizing apparatus for use in a process which uses a reaction gas consisting of gas formed by vaporizing tetraethylor-thosilicate (hereinafter called "TEOS"), a gas for adding P (phosphorus) into the film and formed by vaporizing trimethyl orthophosphate (hereinafter called "TMPO"), a gas for adding B (boron) into the film and formed by vaporizing triethyl borate (hereinafter called "TEB"), nitrogen gas and partially-ozonized oxygen gas, the liquid vaporizing apparatus vaporizing liquid by flowing the gas into the liquid heated and maintained higher than the room temperature.

As the foregoing chemical gas-phase growth apparatus, a chemical gas-phase growth apparatus for forming a silicon oxide film will be described. As a vaporizer, a vaporizer will be described in which the gas flows into liquid heated and maintained to a temperature higher than the room temperature, so as to vaporize the liquid by bubbling.

First, film forming reactions to be realized in the conventional chemical gas-phase growth apparatus will now be described. A chemical gas-phase growth apparatus of the foregoing type is constituted, for example, as shown in FIG. 50. The foregoing chemical gas-phase growth apparatus will now be described with reference to the foregoing figure. Referring to FIG. 50, the conventional chemical gas-phase growth apparatus comprises: a reaction chamber i for forming a film on a semiconductor wafer (omitted from illustration); an oxygen-gas supply pipe 2; an oxygen-gas flow-rate adjuster 3 for measuring and adjusting the flow rate of the oxygen gas flowing through the oxygen-gas supply pipe 2; an ozone generator 4 for ozonizing a portion of the oxygen gas; an ozone-gas introduction pipe 5 for supplying, to the reaction chamber 1, the partially-ozonized oxygen gas from the ozone generator 4; a liquid vaporizing apparatus 6 to be described later; a reaction-gas introduction pipe 7 for supplying, to the reaction chamber 1, the reaction gas from the liquid vaporizing apparatus 6; a heater 8 for heating and maintaining the hot state of the reaction-gas introduction pipe 7; and an exhaust pipe 9 for discharging the gas from the reaction chamber 1.

In the thus-constituted conventional chemical gas-phase growth apparatus, the ozone gas from the ozone-gas introduction pipe 5 and the reaction gas from the reaction-gas introduction pipe 7 are supplied onto a semiconductor wafer (omitted from illustration) heated and maintained by a wafer stage (omitted from illustration) so that they are made to react with each other. Thus, a film (omitted from illustration) is, by the reaction, formed on the semiconductor wafer, while the gas is, after the reaction, discharged outside from the reaction chamber 1 through the reaction pipe 9.

Then, a liquid vaporizing apparatus 6 of the foregoing conventional chemical gas-phase growth apparatus shown in FIG. 50 will now be described. A liquid vaporizing apparatus of the foregoing type is constituted, for example, as shown in FIG. 51 which is a view showing the system of piping of the same. Then, the liquid vaporizing apparatus will now be described with reference to the foregoing figure. Referring to FIG. 51, the liquid vaporizing apparatus 6 comprises: a plurality of vaporizers 10a, 10b and 10c for vaporizing TEOS liquid, TMPO liquid and TEB liquid; nitrogen-gas flow rate adjusters 11a, 11b and 11c for measuring and adjusting the flow rate of the nitrogen gas to be supplied to the vaporizers 10a, 10b and 10c; a nitrogen-gas flow rate adjuster 11d for measuring and adjusting the flow rate of the nitrogen gas serving as a carrier gas; a nitrogen gas supply pipe 12 for supplying the nitrogen gas to the liquid vaporizing apparatus; liquid-supply pipes 13a, 13b and 13c for supplying, from liquid-material supply containers (omitted from illustration) for storing the TEOS liquid, the TMPO liquid and the TEB liquid, the liquids to the corresponding vaporizers 10a, 10b and 10c; gas introduction pipes 14a, 14b and 14c for introducing, into the vaporizers 10a, 10b and 10c, the nitrogen gas, the flow rate of which has been adjusted by the nitrogen-gas flow rate adjusters 11a, 11b and 11c; gas ejection pipes 15a, 15b and 15c for ejecting the nitrogen gas and the vaporized gas from the gas introduction pipes 14a, 14b and 14c and the vaporizers 10a, 10b and 10c to supply the gases to the reaction-gas introduction pipe 7; bypass pipes 16a, 16b and 16c for establishing the connections between the corresponding gas introduction pipes 14a, 14b and 14c and the gas ejection pipes 15a, 15b and 15c; drain pipes 17a, 17b and 17c for discharging the liquid in the vaporizers to a waste-liquid pipe (omitted from illustration); valves 18a to 22c provided in each pipe; the reaction-gas introduction pipe 7 communicated with the nitrogen-gas flow rate adjuster 11d and joined to each of the gas ejection pipes 15a, 15b and 15c to supply the reaction gas from the liquid vaporizing apparatus 6 to the reaction chamber 1 shown in FIG. 50; and a heater 8 for heating and maintaining the hot state of the gas introduction pipes 14a, 14b, 14c, the gas ejection pips 15a, 15b and 15c, the bypass pipes 16a, 16b and 16c and the reaction-gas introduction pipe 7 in cooperation with a temperature sensor (omitted from illustration) for detecting their temperatures.

In the chemical liquid vaporizing apparatus shown in FIG. 51, the valves 21a, 21b and 21c are opened to introduce predetermined liquid materials (omitted from illustration), through the liquid-supply pipes 13a, 13b and 13c, to the vaporizers 10a, 10b and 10c heated and maintained at a predetermined temperature level. Then, the valves 18a, 18b and 18c and the valves 20a, 20b and 20c are opened, while the valves 19a, 19b and 19c are closed. Thus, the nitrogen gas of a predetermined quantity controlled by the nitrogen-gas flow rate adjusters 11a, 11b and 11c is introduced from the gas introduction pipes 14a, 14b and 14c into the vaporizers 10a, 10b and 10c so that the foregoing liquid materials are vaporized. The vaporized gas formed due to vaporization of the liquid materials performed in the vaporizers 10a, 10b and 10c and the nitrogen gas introduced into the same are ejected through the gas ejection pipes 15a, 15b and 15c. Then the nitrogen gas flow rate adjuster 11d controls the flow quantity of the gas to a predetermined quantity, the gas being then joined to the nitrogen gas flowing through the reaction-gas introduction pipe 7 to be supplied to the reaction chamber 1 shown in FIG. 50.

In order to prevent change in the temperature of the liquid occurring at this time due to blowing of the low-temperature nitrogen gas into the liquid materials heated and maintained in the vaporizers 10a, 10b and 10c, the gas introduction pipes 14a, 14b and 14c are always heated and maintained by the heater so that the nitrogen gas to be introduced has the same temperature as that of the foregoing liquid materials. The gas ejection pipes 15a, 15b and 15c and the reaction gas introduction pipe 7 are, by the heater 8, always heated and maintained at a temperature higher than the temperature at the vaporization in order to prevent re-liquefaction of the TEOS vaporized gas occurring due to lowering of the temperature of the TEOS vaporized gas in the foregoing pipes.

If the vaporization of the liquid materials is not performed, the valves 19a, 19b and 19c are opened and the valves 18a, 18b and 18c and the valves 20a, 20b and 20c are closed so that the nitrogen gas is not flowed to the vaporizers 10a, 10b and 10c but the same is flowed to the bypass pipes 16a, 16b and 16c to be introduced into the gas ejection pipes 15a, 15b and 15c so that only the nitrogen gas is introduced into the reaction gas pipe 7.

As a vaporizer of the conventional liquid vaporizing apparatus shown in FIG. 51, the vaporizer 10a using the TEOS liquid as the liquid material will now be described, the vaporizers 10b and 10c using the TMPO liquid and the TEB liquid being omitted from description because their elements and operations are the same as those of the vaporizer 10a. A vaporizer of the foregoing type is constituted, for example, as shown in FIG. 52 which is a cross sectional view. Then, a description will be made about the foregoing vaporizer with reference to the foregoing figure. Referring to FIG. 52, in a container 23 for accommodating TEOS liquid A, there are disposed a temperature sensor 24 for detecting the temperature of the TEOS liquid A and a liquid-surface sensor 25 for detecting liquid surface B of the TEOS liquid A. The liquid-surface sensor 25 has, at the leading portion thereof, a conical liquid-surface detection portion 26 for detecting a state of contact with the liquid surface B. Reference numeral 27 represents a heater for heating and maintaining the TEOS liquid A at a predetermined temperature level by using the temperature sensor 24. Also shown in FIG. 51, on the top surface of the container 23, there are connected a liquid-supply pipe 13a having a valve 21a, a gas introduction pipe 14a having a valve 18a, a gas ejection pipe 15a having a valve 20a and a pressure gauge 30, the foregoing pipes being communicated with the inside of the container 23. At the leading portion (the lower end) of the gas introduction pipe 14a, a bubbling pipe 28 for blowing nitrogen gas into the TEOS liquid A is integrally connected, the bubbling pipe 28 penetrating the top surface of the container 23 to extend to the inside of the container 23 while having a mesh 29 disposed at the leading portion thereof. A drain pipe 17a having a valve 22a is connected to the lower portion of the container 23. In the container 23, internal space C is formed above the liquid surface B so that the pressure of the internal space C is detected by the pressure gauge 30. The gas ejection pipe 15a has a pressure adjuster 31 for adjusting the pressure of the internal space C in the container 23 in accordance with the pressure level detected by the pressure gauge 30.

The TEOS liquid A is, prior to the vaporization, injected into the vaporizer 10a shown in FIG. 52 by opening the valve 20a and 21a and by closing the valves 18a and 22a until the liquid surface B in the container 23 reaches the liquid-surface detection portion 26 of the liquid-surface sensor 25. Then, the valves 20a and 21a are closed. The temperature of the TEOS liquid A in the container 23 is detected by the temperature sensor 24 so that it is heated and maintained at a predetermined temperature level by the heater 27.

When the vaporization is performed, the valves 18a and 20a are opened in a state where valves 21a and 22a are closed so as to blow the nitrogen gas into the TEOS liquid A in the container 23 through the mesh 29 disposed at the leading portion of the bubbling pipe 28. The blown nitrogen gas is formed into bubbles D in the TEOS liquid A so that the TEOS liquid A is vaporized in the bubbles D during rise of the bubbles D in the TEOS liquid A to the liquid surface B. The vaporization is continued until the vaporized TEOS gas is saturated in the nitrogen gas in the bubbles D. When it is saturated, further vaporization is interrupted. The quantity of the vaporized TEOS gas can be expressed as follows:

$$G_T = PT \div (P-PT) \times G \quad (1)$$

In Equation (1), GT is the quantity of the vaporized TEOS gas, G is the quantity of the nitrogen gas blown in the TEOS liquid A, PT is the vapor pressure of the TEOS liquid A heated and maintained at a predetermined temperature level and P is the pressure of the nitrogen gas in the bubbles D, the pressure being the same as the pressure of the internal space C in the container 23.

When the bubbles D reach the liquid surface B, the nitrogen gas in the bubbles D and the vaporized TEOS gas are ejected into the internal space C in the container 23 and then flows from the internal space C in the container 23 through the gas introduction pipe 15 so as to be ejected to the outside of the container 23.

When the vaporization is not performed, the valve 18a is closed to inhibit blowing of the nitrogen gas into the TEOS liquid A in the container 23. Since also the foregoing vaporization takes place from the liquid surface B to the internal space C in the container 23 until the partial pressure is made to be the same as the vapor pressure of the foregoing TEOS liquid A, the valve 20a is closed to inhibit the ejection of the vaporized TEOS gas from the container 23.

When the TEOS liquid A is discharged from the container 23, the valves 18a and 22a are opened in a state where the valves 20a, 21a are closed to blow the nitrogen gas into the container 23 through the bubbling pipe 28 so as to, with pressure, send and discharge the TEOS liquid A through the drain pipe 17a.

Although the vaporizer shown in FIG. 52 has been described as an example of the conventional vaporizer, there is a vaporizer 10a' shown in FIG. 53 serving as another example. Then, the foregoing vaporizer will now be described with reference to the foregoing figure. The description of the same structures and operations as those of the vaporizer shown in FIG. 52 are omitted here.

Referring to FIG. 53, reference numeral 32 represents a thermostatic chamber accommodating the container 23, the liquid-supply pipe 13a, the gas introduction pipe 14a, the gas ejection pipe 15a, the drain pipe 17a, their valves 18a, 20a, 21a and 22a, the pressure gauge 30 and the pressure adjuster 31. The thermostatic chamber 32 has, in the upper portion thereof, a temperature sensor 33 for detecting the temperature of the inside portion, while the thermostatic chamber 32 has, on the inner surface of the side wall thereof, a heater 34 for heating and maintaining the inside portion of the thermostatic chamber 32 at a predetermined temperature level in accordance with the temperature detected by the temperature sensor 33. In the vaporizer 10a' shown in FIG. 53, the elements in the thermostatic chamber 32 such as the container 23 and the TEOS liquid A in it are heated and maintained at a predetermined temperature level by the heater 34. Therefore, the temperature sensor 24 and the heater 27 shown in FIG. 23 are not provided.

Also in the vaporizer 10a' shown in FIG. 53, the injection of the TEOS liquid A into the container 23 and the vaporization of the TEOS liquid A in the container 23 and the discharge of the TEOS liquid A from the container 23 are performed identically to the foregoing vaporizer 10a shown in FIG. 52.

In each of the vaporizer 10a shown in FIG. 52 and the vaporizer 10a' shown in FIG. 53, the liquid surface B is lowered as the vaporization of the TEOS liquid A proceeds in the container 23. Therefore, the vaporization is interrupted at a certain moment and TEOS liquid A is again supplied to the liquid-surface detection portion 26 of the liquid-surface sensor 25 in the container 23 by a method identical to the foregoing method.

In the foregoing conventional vaporizer 10a shown in FIG. 52, the heater 27 provided for the container 23 is disposed on the side surface of the lower portion of the container 23. It leads to a fact that a vertical temperature difference of the TEOS liquid A occurs when no vaporization is performed. In this way the temperature of the upper portion is made to be higher than that of the lower portion. If the vaporization is performed in the foregoing state, the TEOS liquid A is stirred by the bubbles D, resulting in that the upper and lower portions having different temperatures are mixed. As a result, the temperature of the overall body of the TEOS liquid A is changed. An example of the results of a measurement of the temperature change is shown in FIG. 54.

If temperature change of the TEOS liquid A of the foregoing type takes place, the vapor pressure of the TEOS liquid A shown in Equation (1) is changed. Hence, the quantity of the vaporized gas is changed. If the quantity of the vaporized gas is changed, the vaporized gas changes the speed of the growth of the film to be formed on the semiconductor wafer due to the reactions. If the film formation is inhibited during the change in the temperature of the TEOS liquid A, the temperature of the TEOS liquid A in the container 23 is restored to an initially-set temperature and, therefore, the film formation must wait. As a result, the time taken to form the film is lengthened.

In the vaporizer 10a shown in FIG. 52, lowering of the liquid surface B occurring as the TEOS liquid A in the container 23 is vaporized reduces the quantity of the vaporized gas of the TEOS liquid A. FIG. 55 shows the change of the quantity of the vaporized TEOS gas as the time passes from the commencement of the vaporization due to bubbling. As can be understood from the figure, the vaporization, which takes place due to bubbling, lowers the liquid surface B and reduces the quantity of the vaporized TEOS gas.

Therefore, the reduction in the quantity of the vaporized TEOS gas lowers the growth speed of the film to be formed on the semiconductor wafer by the vaporized gas. FIG. 56 is a graph showing the relation between the film growth speed and the quantity of the TEOS liquid in the container 23 serving as the vaporizer. As can be understood from the figure, the film growth speed is lowered, dependent on the quantity of the liquid.

One of the main reasons for the reduction in the quantity of the vaporized gas taking place as the liquid surface B lowers is that: there is escape of heat to the outside portion of the container 23 from the internal space C in the container 23 through the temperature sensor 24, the liquid-surface sensor 25 and the bubbling tube 28, the escape of the heat being augmented because the exposure to the internal space C in the container 23, of the temperature sensor 25 and the bubbling tube 28 increases as the liquid surface B lowers so that the temperature of the internal space C in the container 23 is made to be lower than the temperature of the TEOS liquid A so that the TEOS liquid A in the internal space C in the container 23 is again liquefied, causing the quantity of the vaporized gas to be reduced.

Another main reason of the reduction in the quantity of the vaporized gas as the liquid surface B lowers is that the internal space C in the container 23 is enlarged as the liquid surface B is lowered, the area of the gas in the internal space C in the container 23 which is in contact with the side wall of the container 23 is enlarged and the escape of the heat from the internal space C in the container 23 to the outside portion of the container 23 is augmented, resulting in that the temperature of the internal space C in the container 23 is made to be lower than the temperature of the TEOS liquid A and that the TEOS liquid A in the internal space C in the container 23 is again liquefied, causing the quantity of the vaporized gas to be reduced.

As contrasted with the fact that the foregoing problems are experienced with the vaporizer shown in FIG. 52, the vaporizer shown in FIG. 53 is free from the augmentation of the heat escape from the internal space C in the container 23 to the outside portion of the container 23 even if the liquid surface B is lowered. Therefore, the reduction in the quantity of the vaporized gas due to the re-liquefaction of the TEOS liquid A does not take place. However, the inside portion of the actual thermostatic chamber 32 is not fully and always heated and maintained at a predetermined temperature level. In particular, the temperature of the portions apart from the temperature sensor 33 and the heater 34 is lower than the predetermined temperature, resulting in heat escape from the internal space C in the container 23 to the outside portion of the container 23. As a result, TEOS liquid A in the internal space C in the container 23 is again liquefied, causing the quantity of the vaporized gas to be reduced.

Under a circumstance that the TEOS liquid A must be, at predetermined intervals, supplied into the container 23 of each of the foregoing conventional vaporizers shown in FIGS. 52 and 53, if the temperature of the TEOS liquid A to be supplied is not the same as the temperature of the TEOS liquid A heated and maintained at a predetermined temperature level in the container 23, the temperature of the TEOS liquid A in the container 23 is changed after the liquid supply. The change in the liquid temperature, as described above, changes the quantity of the vaporized gas which changes the growth speed of the film to be formed due to the reactions and which requires a waiting time for the formation of the film to be taken.

As for the temperature change, the vaporizer shown in FIG. 53 and having the arrangement that the container 23 and the TEOS liquid A are heated and maintained at a predetermined temperature level in the thermostatic chamber 32 does not easily encounter the vertical temperature difference of the TEOS liquid A as is experienced with the vaporizer shown in FIG. 52 because the overall body of the container 23 is heated by the ambient. Since heating of the container 23 is not performed by a heater attached directly, the Lime taken to restore the original controlled-temperature is lengthened as compared with the time required for the vaporizer shown in FIG. 52.

In order to prevent the foregoing liquid change, a vaporizer serving as another conventional example and shown in FIG. 57 comprises a reservoir tank 35 disposed in the thermostatic chamber 32 so as to supply, to the container 23, the TEOS liquid A heated and maintained, in the reservoir tank 35, at the same temperature as the TEOS liquid A in the container 23.

However, the foregoing method involves a fact that the size of the thermostatic chamber 32 cannot be reduced. Moreover, if liquid, the temperature of which is lower than the internal temperature of the thermostatic chamber 32, is injected into the reservoir tank 35, the temperature in the thermostatic chamber 32 is undesirably lowered, resulting in that the quantity of the vaporized gas is reduced. Therefore, a long time is required to restore the original controlled-time.

In a case where the mesh 29 is not used in the bubbling tube 28, vaporization takes place in a state where each bubble D has a large volume and the number of the bubbles D is small as shown in FIG. 58. Since the area of the nitrogen gas, which is in contact with the TEOS liquid A, per volume is small at this time, the TEOS is not vaporized sufficiently to saturation.

If the vaporization is performed sufficiently to the saturation level, the quantity of the saturated vapor cannot be changed although the time during which the nitrogen gas in the bubbles D is in contact with the TEOS liquid A is shortened. In a state where the saturation is not achieved or in a state where the saturation is at the very limit, the liquid surface B is lowered, and the time taken for the bubbles D to rise in the TEOS liquid A is reduced. Therefore, the contact time of the nitrogen gas in the bubbles D and with the TEOS liquid A is shortened. Therefore, the vaporization state does not reach saturation and therefore the quantity of vapor sent from the vaporizer is reduced.

If the distance which the bubbles D rise in the TEOS liquid A is lengthened so as to sufficiently lengthen the time in which the nitrogen gas in the bubbles D comes in contact with the TEOS liquid A, saturation is achieved. Therefore, the reduction in the quantity of vapor taking place due to lowering of the liquid surface can be prevented. However, the foregoing method involves a necessity of enlarging the height of the container, causing a problem in that the size of the vaporizer cannot be reduced.

If the vaporization has not sufficiently reached saturation, vaporization, as shown in FIG. 59, takes place from he liquid surface B, liquid droplets E generated when the bubbles D have burst at the liquid surface B and are adhered to the internal surface of the container 23 in the internal space C in the container 23 and mist F is generated similarly and present in the vaporized gas. Since the states of the liquid surface B, the liquid droplets E and the mist F are not stable in constant conditions, the quantity of the vapor from the vaporizer can change.

If the vaporization has not sufficiently reached the saturation level, the usual quantity of the vaporized gas is smaller than the quantity realized in a saturated state. In a period in which the vaporization is not performed by bubbling, the TEOS liquid A is vaporized from the liquid surface B into the internal space C in the container 23, causing the vaporized TEOS gas, which has been saturated, to be accumulated in the internal space C in the container 23. Therefore, the saturated and vaporized gas, which has been accumulated, flows out and the state shown in FIG. 55, in which the quantity of the vapor is very large, is continued for the while until the vapor quantity is made to be a usual non-saturated quantity.

if the quantity of the nitrogen gas to be blown into the TEOS liquid A is enlarged or if the enlargement of the bubbles D considerably changes the liquid surface B, the quantity of the generated liquid droplets E and the mist F are enlarged proportionally. If the quantity of the generation is enlarged, a portion of it is ejected from the container 23 to the gas ejection pipe 15a and the liquid-supply pipe 13a, resulting in that the ejected portion is allowed to adhere to and accumulated on the inner surface of the piping. The accumulated portion is again vaporized and flowed into the internal space C in the container 23, causing the quantity of the vapor to be changed.

Accordingly, the conventional vaporizer comprises, as shown in FIG. 60 in an enlarged manner, the mesh 29 disposed at the leading portion of the bubbling tube 28 to make small the bubbles D of the nitrogen gas to be blown into the TEOS liquid A in order to bring the vaporization closer to saturation so as to prevent a change in the liquid surface B at the bursting of the bubbles D so that generation of the liquid droplets E and the mist F is prevented or minimized. However, the actual vaporizer comprising the mesh 29 having fine squares results in that the bubbles join together on the surface of the mesh 29 and that large bubbles D are undesirably formed.

Since only one mesh 29 for blowing the nitrogen gas into the TEOS liquid A is provided, a very small portion of the TEOS liquid A is passed in a period in which the bubbles D reach the liquid surface B. The vaporization is performed in only a portion adjacent to the bubbling pipe 28, thus resulting in that the bubbles D join together in the TEOS liquid A and that the area of the nitrogen gas, which comes in contact with the TEOS liquid A, cannot be enlarged even if the flow rate of the nitrogen gas is enlarged. Therefore, saturation cannot easily be realized.

The foregoing conventional vaporizers 10a and 10a' shown in FIGS. 52 and 53 involve a necessity of stopping the vaporization at regular intervals to supply the TEOS liquid A to the container 23. The liquid supply is performed by the foregoing method so that the height of the liquid surface B is determined by the temperature sensor 25.

However, the detection of the liquid surface B performed by the temperature sensor cannot be performed sufficiently accurately such that the TEOS liquid A cannot be supplied to the same liquid surface with excellent reproducibility. Therefore, there arises the foregoing problem of the change in the quantity of the vapor occurring due to the change in the liquid surface.

Moreover, if the liquid-surface detection portion 26 of the liquid-surface sensor 25 cannot detect the liquid surface B because it is contaminated with the reaction products of the reactive TEOS liquid A, the TEOS liquid A flows over the container 23 through the gas ejection pipe 15a when the liquid is supplied as described above. The liquid flows from the vaporizer 10a, shown in FIG. 51, through the reaction-gas introduction pipe 7, causing a problem to rise in that the TEOS liquid A flows to the reaction chamber i shown in FIG. 50.

In order to overcome the foregoing problem, the foregoing conventional examples shown in FIGS. 52 and 53 comprise the liquid-surface-contact type sensor 25. In another method, for example, a sensor of a type for detecting the position of the liquid surface B by reflecting a laser beam G from a light emitter 37 from the liquid surface B and received by a light-receptor 38 involves a problem of the deterioration in the detection accuracy due to the shift of the liquid surface B and contamination of the light emitter 37 and the light receptor 38 interrupt the normal operation. A sensor of a type arranged as shown in FIG. 62 such that a float 38 is disposed on the liquid surface B to detect the position of the liquid surface B involves a similar deterioration in the detection accuracy due to the shift of the liquid surface B. Another risk is involved in that dust can be generated from a movable portions of the float 38. Therefore, the change of the type of the float does not enable accurate detection of the liquid surface.

Since the foregoing conventional vaporizers 10a and 10a' shown in FIGS. 52 and 53 comprise the vaporizing container 23 which is made of opaque material, the state of vaporization with nitrogen blown into the TEOS liquid A cannot be confirmed. Therefore, a variety of problems rise in that the changed state of the vaporization, such as the change in the size of the bubbles D and the state of the shift of the liquid surface B, cannot be confirmed, the changed stage being due to the adhesion of the reaction products of the TEOS liquid A to the mesh 29 or the like and breakage or the like due to degradation of the internal elements of the container 23.

The present invention is directed to overcome the foregoing problems and therefore an object is to provide a liquid vaporizing apparatus which is capable of accurately maintaining the liquid surface in a container for liquid to be vaporized by bubbling at a predetermined range.

Another object of the present invention is to provide a liquid vaporizing apparatus, arrangement of which is such that the vaporization by bubbling is made closer to saturation to prevent flying and adhesion of liquid droplets and change in the temperature of the liquid and the container are avoided to prevent a change in the quantity of vapor, so that reaction gas can further stably be supplied.

Another object of the present invention is to prevent change in generation of vaporized gas by maintaining the temperature of liquid in a container at a constant level without any change, by maintaining the temperature of a space above liquid in the container at a constant level without any change, and by maintaining the height of the liquid surface in the container at a constant value to prevent flying and adhesion of liquid droplets so as to maintain the vaporization state at a constant state.

DISCLOSURE OF INVENTION

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and a member disposed on the inner surface of the container in a portion which is immersed in the liquid in the container so as not to disorder natural convection of the liquid, extending from the inner surface of the container toward the inside portion of the liquid and exhibiting excellent heat conductivity.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and liquid-surface detection means for detecting the liquid surface of the liquid in the container, wherein all portions of the bubbling tube, the temperature detection means and the liquid-surface detection means that are disposed in the container are disposed below the liquid surface of the liquid in the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; first temperature-detection means provided for the container and capable of detecting the temperature of the liquid; first temperature-adjustment means provided for the container and using the temperature detected by the first temperature-detection means to heat and maintain the liquid in the container at a predetermined temperature; second temperature-detection means for detecting the temperature of an internal space in the container formed on the liquid surface of the liquid in the container; and second temperature-adjustment means so provided for the container as to cover only the internal space in the container and using the temperature detected by the second temperature-detection means to perform control in such a manner that the temperature of the internal space in the container is the same as the temperature of the liquid.

A liquid vaporizing apparatus according to the present invention has an arrangement that a portion of the container positioned between a lower end of a portion of the second temperature-adjustment means that is disposed on the side surface of the container and the liquid surface of the liquid in the container is made of material exhibiting excellent heat conductivity.

A liquid vaporizing apparatus according to the present invention has an arrangement that a member exhibiting heat conductivity superior to that of a side wall portion of the container is so disposed in a portion of a lower portion of a side surface of the container in which the second temperature-adjustment means is not disposed as to outwards project over the outer surface of the container.

A liquid vaporizing apparatus according to the present invention has an arrangement that a portion of the second temperature-adjustment means disposed on the side surface of the container is so constituted as to be capable of changing a portion effective to perform temperature adjustment in a direction of the height of the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; first temperature-detection means provided for the container and capable of detecting the temperature of the liquid; first temperature-adjustment means provided for the container and using the temperature detected by the first temperature-detection means to heat and maintain the liquid in the container at a predetermined temperature; second temperature-detection means for detecting the temperature of an internal space in the container formed on the liquid surface of the liquid in the container; and second temperature-adjustment means disposed in the internal space of the container and using the temperature detected by the second temperature-detection means to perform control in such a manner that the temperature of the internal space in the container is the same as the temperature of the liquid.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; first temperature-detection means provided for the container and capable of detecting the temperature of the liquid; first temperature-adjustment means provided for the container and using the temperature detected by the first temperature-detection means to heat and maintain the liquid in the container at a predetermined temperature; a cover so disposed in an upper portion of the container as to cover the internal space in the container and having, therein, a closed space for surrounding portions of the bubbling tube, the gas ejection pipe, the liquid-supply pipe and the first temperature-detection means that extend to the outside portion of the container; second temperature-detection means for detecting the temperature of the closed space in the cover; and second temperature-adjustment means provided for the cover and using the temperature detected by the second temperature-detection means to perform control in such a manner that the temperature of the closed space in the cover is the same as the temperature of the liquid.

A liquid vaporizing apparatus according to the present invention has an arrangement that the bottom surface of the cover that is in contact with the side surface of the container is so constituted as to be capable of vertically moving along the container.

A liquid vaporizing apparatus according to the present invention comprises: a first container for holding liquid to be vaporized in a predetermined quantity; a second container disposed in the first container and having an opening portion for introducing the liquid in the first container; a bubbling tube penetrating the first container and the second container to be inserted into liquid in the second container and capable of vaporizing the liquid by blowing predetermined gas into the liquid; a gas ejection pipe penetrating the first container to be connected to an upper portion of the second container and capable of ejecting the blown gas and the vaporized gas to the outside portion of the second container; a liquid-supply pipe for supplying the liquid into the first container; temperature detection means for detecting the temperature of the liquid in the second container; and temperature adjustment means provided for the first container and using the temperature detected by the temperature detection means to heat and maintain the liquid in the second container at a predetermined temperature.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the top surface of the container is formed into a mountain shape, the vertex of which is at the position at which the gas ejection pipe is attached and which is inclined to the side surfaces of the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and an insulating plate disposed in the container immediately below a position at which the gas ejection pipe is attached, having a plain area larger than the inner diameter of the gas ejection pipe and having a central portion projecting upwards.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and filter means so disposed in an internal space in the container formed on a liquid surface of the liquid in the container at a position between an opened end of the gas ejection pipe and the liquid surface as to traverse the internal space in the container and to be in contact with the inner surface of the container at the outer surface thereof and capable of permitting gas to pass through but inhibiting liquid to pass through.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the bubbling tube has a hollow diffusion plate having a plurality of small apertures on the top surface thereof, the diffusion plate having a plain area which is larger than the cross sectional area of the bubbling tube and smaller than the internal cross sectional area of the container.

A liquid vaporizing apparatus according to the present invention has an arrangement that the diffusion plate is so provided with a filter capable of permitting gas to pass through and inhibiting liquid to pass through as to cover the small apertures in the top surface.

A liquid vaporizing apparatus according to the present invention has an arrangement that an ultrasonic oscillator is attached to the diffusion plate.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the bubbling tube is so constituted as to be formed into a shape having a narrowed leading portion.

A liquid vaporizing apparatus according to the present invention has an arrangement that the narrow leading portion of the bubbling tube has, at the central portion thereof, a passage having an end opened in a direction in which the gas is jetted and another end which is communicated with the inside portion of the liquid.

A liquid vaporizing apparatus according to the present invention has an arrangement that the bubbling tube is so disposed that its leading portion is positioned in the liquid in the container and allowed to face downwards at a position adjacent to the liquid surface.

A liquid vaporizing apparatus according to the present invention has an arrangement that the bubbling tube is so disposed that its leading portion is positioned in the liquid in the container at a position adjacent to the bottom portion of the container in a horizontal direction toward the side surface of the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein an opening which causes the liquid to flow over to the outside portion and which can be opened/closed is formed in the upper portion of the side surface of the container.

A liquid vaporizing apparatus according to the present invention has an arrangement that a supply container connected to the liquid-supply pipe and capable of supplying the liquid to the container through the liquid-supply pipe is disposed below the container, and the opening and the supply container are connected to each other by an overflow pipe.

A liquid vaporizing apparatus according to the present invention has an arrangement that the liquid-supply pipe is provided with a pump for, under pressure, sending the liquid from the supply container to the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and a capacity-variable liquid-surface adjustment container disposed in the liquid in the container and having a capacity which is expanded in accordance with lowering of the liquid surface.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the upper surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the inside portion of the container is, by an insulating wall, sectioned into a liquid vaporizing portion having the bubbling tube and the gas ejection pipe and a liquid-supply portion having the liquid-supply pipe, an upper portion of the insulating wall has an opening for flowing over the liquid in the liquid vaporizing portion toward the liquid-supply portion, a liquid circulation pipe is used to establish the connection between the liquid-supply portion and the liquid vaporizing portion, and a pump for supplying the liquid from the liquid-supply portion to the liquid vaporizing portion is disposed in the liquid circulation pipe.

A liquid vaporizing apparatus according to the present invention has an arrangement that a filter is disposed in the liquid circulation pipe for removing impurities in the liquid flowing in the liquid circulation pipe.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the upper surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the inside portion of the container is, by an insulating wall, sectioned into a liquid vaporizing portion having the bubbling tube and the gas ejection pipe and a liquid-supply portion having the liquid-supply pipe, an upper portion of the insulating wall has an opening for flowing over the liquid in the liquid vaporizing portion toward the liquid-supply portion, a liquid circulation pipe is used to establish the connection between the liquid-supply portion and the liquid vaporizing portion, an end of the liquid circulation pipe is immersed in the liquid in the liquid-supply portion and another end of the same is connected to a passage formed in the narrow leading portion of the bubbling tube disposed in the liquid vaporizing portion.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the upper surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the liquid-supply pipe is connected to the container at a position below the liquid surface in the container.

A liquid vaporizing apparatus according to the present invention has an arrangement that the liquid-supply pipe includes flow-rate adjustment means for detecting and controlling the flow rate of the liquid flowing in the liquid-supply pipe, and a valve is disposed between the flow-rate adjustment means of the liquid-supply pipe and the container.

A liquid vaporizing apparatus according to the present invention has an arrangement that a bypass pipe bypassing the flow-rate adjustment means and the valve is connected to the liquid-supply pipe, and a valve is provided for the bypass pipe.

A liquid vaporizing apparatus according to the present invention has an arrangement that the liquid-supply pipe is provided with pressure detection means for detecting the pressure of the liquid flowing in the liquid-supply pipe and pressure adjustment means for controlling the supply pressure of the liquid in accordance with the pressure detected by the pressure detection means.

A liquid vaporizing apparatus according to the present invention comprises: a first container for holding liquid to be vaporized in a predetermined quantity; a bubbling tube inserted into the liquid in the first container and capable of vaporizing the liquid by blowing a predetermined gas into the liquid; a gas ejection pipe connected to the upper surface of the first container and capable of ejecting the blown gas and the vaporized gas to the outside portion of the first container; first temperature-detection means provided for the first container and capable of detecting the temperature of the liquid in the first container; first temperature-adjustment means provided for the first container and using the temperature detected by the first temperature-detection means to heat and maintain the liquid in the first container at a predetermined temperature; a second container disposed below the first container and capable of reserving the liquid in a quantity larger than that of the liquid to be steadily supplied into the first container; second temperature-detection means provided for the second container and capable of detecting the temperature of the liquid in the second container; second temperature-adjustment means provided for the second container and using the temperature detected by the second temperature-detection means to heat and maintain the liquid in the second container at a temperature which is the same as the temperature of the liquid in the first container; and valve-equipped liquid-supply pipe that establishes the connection between the second container and a lower portion of the first container so as to supply the liquid from the second container into the first container.

A liquid vaporizing apparatus according to the present invention has an arrangement that a partition plate is disposed in the second container at a position between an upper portion to which the liquid-supply pipe is connected and a lower portion to which a pipe for supplying the liquid to the second container in order to lengthen the passage for the liquid.

A liquid vaporizing apparatus according to the present invention comprises: a container for holding liquid to be vaporized in a predetermined quantity; a bubbling tube inserted into the liquid in the first container and capable of vaporizing the liquid by blowing a predetermined gas into the liquid; a gas ejection pipe connected to the upper surface of the first container and capable of ejecting the blown gas and the vaporized gas to the outside portion of the first container; a liquid-supply pipe connected to the container at a position below the liquid surface in the container and capable of supplying the liquid into the container; first temperature-detection means provided for the container and capable of detecting the temperature of the liquid in the container; first temperature-adjustment means provided for the container and using the temperature detected by the first temperature-detection means to heat and maintain the liquid in the container at a predetermined temperature; second temperature-detection means for detecting the temperature of the liquid in the liquid-supply pipe; and second temperature-adjustment means for controlling the temperature of the liquid in the liquid-supply pipe to be the same as the temperature of the liquid in the container in accordance with the temperatures detected by the first and second temperature-detection means, wherein a capacity of a portion of the liquid-supply pipe which is subjected to temperature adjustment is larger than a quantity of the liquid to be supplied to the container by one supply operation.

A liquid vaporizing apparatus according to the present invention comprises: a container for holding liquid to be vaporized in a predetermined quantity; a bubbling tube inserted into the liquid in the first container and capable of vaporizing the liquid by blowing a predetermined gas into the liquid; a gas ejection pipe connected to the upper surface of the first container and capable of ejecting the blown gas and the vaporized gas to the outside portion of the first container; a liquid-supply pipe connected to the container at a position below the liquid surface in the container and capable of supplying the liquid into the container; first temperature-detection means provided for the container and capable of detecting the temperature of the liquid in the container; first temperature-adjustment means provided for the container and using the temperature detected by the first temperature-detection means to heat and maintain the liquid in the container at a predetermined temperature; second temperature-detection means for detecting the temperature of the liquid in the liquid-supply pipe; second temperature-adjustment means for controlling the temperature of the liquid in the liquid-supply pipe to be the same as the temperature of the liquid in the container in accordance with the temperatures detected by the first and second temperature-detection means, and flow-rate adjustment means for controlling the flow rate of the liquid which flows in the liquid-supply pipe.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and means for detecting sound in the container or vibrations of the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and vaporized-gas stabilizing means disposed at a position in front of a position at which the gas ejection pipe joins together another pipe and capable of controlling the flow rate of the vaporized gas flowing in the gas ejection pipe to a control value.

A liquid vaporizing apparatus according to the present invention has an arrangement that the vaporized-gas stabilizing means comprises a second container having an upper portion to which a pipe for introducing/ejecting the vaporized gas from the gas ejection pipe is connected and a lower portion to which a drain pipe is connected, second temperature-detection means for detecting the temperature of the inside portion of the second container, and second temperature-adjustment means for controlling the temperature in the second container in accordance with the temperature detected by the second temperature-detection means.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the gas ejection pipe connected to the container is branched into two sections each having a valve, one of branched pipes is connected to a portion in which the vaporized gas is used and another branched pipe is connected to an exhaust pipe.

A liquid vaporizing apparatus according to the present invention comprises: a plurality of containers for holding liquid to be vaporized in a predetermined quantity; a bubbling tube inserted into the liquid in each of the containers and capable of vaporizing the liquid by blowing a predetermined gas into the liquid; a gas ejection pipe provided for each of the containers and capable of ejecting the blown gas and the vaporized gas to the outside portion of the containers; a liquid-supply pipe for supplying the liquid into each of the containers; temperature detection means provided for each of the containers and capable of detecting the temperature of the liquid in each of the container; and temperature adjustment means provided for each of the containers and using the temperatures detected by the temperature detection means to heat and maintain the liquid in the containers at a predetermined temperature, wherein each of the gas ejection pipes connected to each of the containers is branched into two sections each having a valve, a group of branched pipes is connected to a portion in which the vaporized gas is used, another group of the branched pipes is connected to an exhaust pipe, and the branched pipes in the group branched from the gas ejection pipes are joined together at a position between a branch position and a portion in which the vaporized gas is used.

A liquid vaporizing apparatus according to the present invention has an arrangement that one pipe formed by joining the gas ejection pipes extending from the plural containers is inclined in such a manner that its position adjacent to the container is positioned above the branched point, and the pipe is branched into two sections in such a manner that one of the branched pipes to be connected to the portion in which the vaporized gas is used is branched upwards and another branched pipe to be connected to the exhaust pipe is branched downwards.

A liquid vaporizing apparatus according to the present invention has an arrangement that each of the gas ejection pipes is, from an upper portion, allowed to individually join together a pipe connected to a portion in which the vaporized gas generated in the container is used.

A liquid vaporizing apparatus according to the present invention has an arrangement that the plural containers are, together with the bubbling tube, the gas ejection pipe, the temperature detection means and the temperature adjustment means provided for each container, covered with a heat insulating member so as to be separated from one another.

BEST MODE FOR CARRYING OUT THE INVENTION

Figure 1:
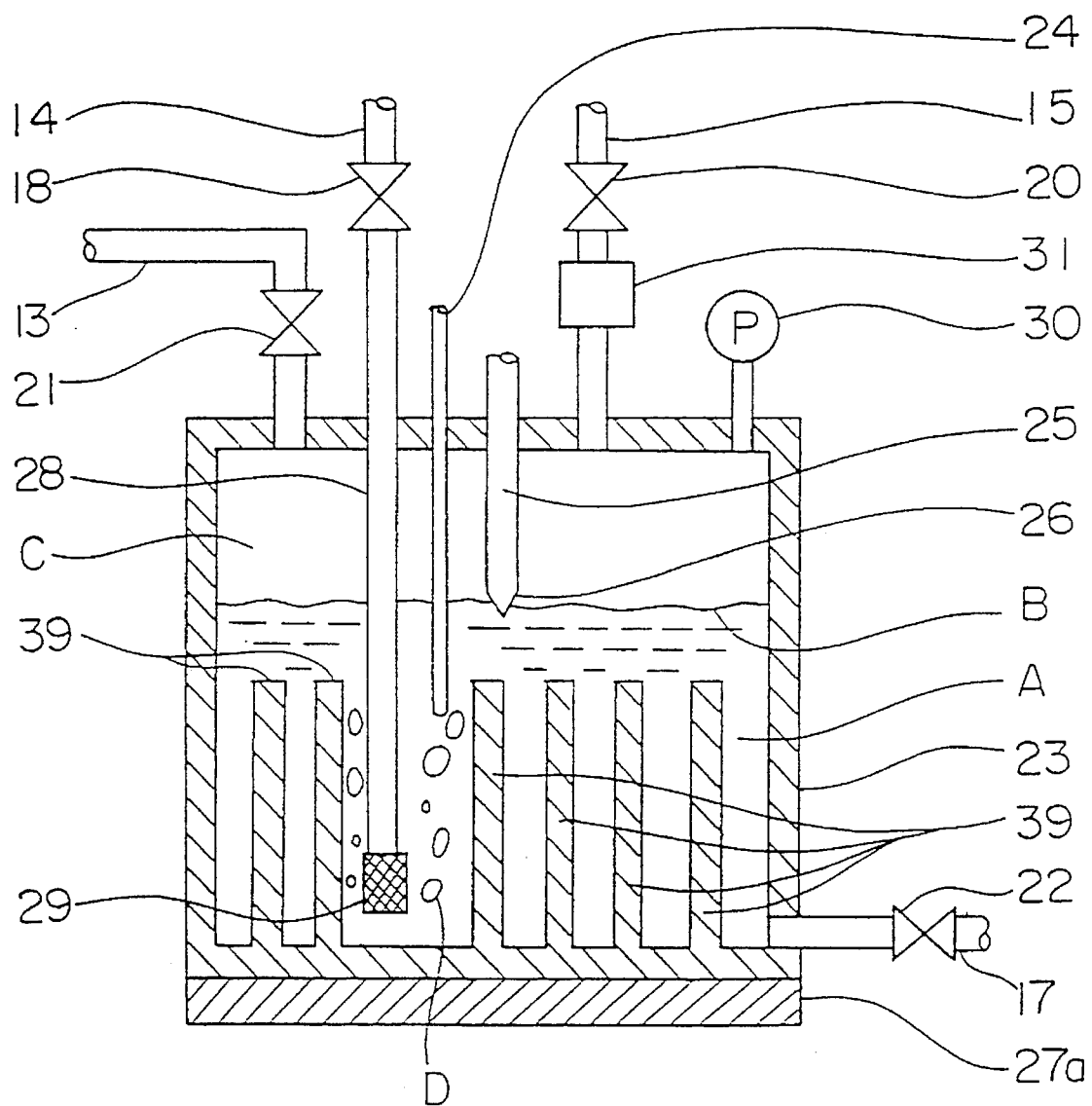
FIG. 1 is a vertical cross sectional view which illustrates the structure of a liquid vaporizing apparatus according to a first embodiment of the present invention.

As an embodiment of the present invention, a liquid vaporizing apparatus for use in a chemical gas-phase growth apparatus for manufacturing semiconductors will now be described. Since the chemical gas-phase growth apparatus according to the embodiment of the present invention is arranged similarly to the foregoing conventional chemical gas-phase growth apparatus of a type for forming a silicon oxide film, its description is omitted in this embodiment.

The embodiments of the present invention will now be described. Each embodiment relates to a liquid vaporizing apparatus for vaporizing TEOS liquid X1 employed in the chemical gas-phase growth apparatus for forming a silicon oxide film for use in a process for manufacturing semiconductors. In the descriptions to be made below, the same or similar portions of the conventional example are given the same reference numerals and their descriptions are omitted here.

Also the vaporizing system in the embodiment of the present invention uses, as liquid materials, tetraethylorthosilicate (hereinafter called "TEOS"), trimethyl orthophosphate (hereinafter called "TMPO") and triethyl borate (hereinafter called "TEB"), similar to the foregoing conventional example. Since the vaporizers among the foregoing vaporizers that use the TMPO and TEB have the same structure and perform the same operation as those of the vaporizer using the TEOS, their descriptions are omitted here.

As an embodiment of the present invention, referring to the drawings, descriptions will be made about a liquid vaporizing apparatus using TEOS liquid serving as the liquid material such that the TEOS liquid at room temperature is heated and maintained at the high temperature and using nitrogen flowed into the liquid so as to perform vaporization by bubbling and a vaporizing system having the liquid vaporizing apparatus.

FIG. 1 is a vertical cross sectional view showing the structure of the liquid vaporizing apparatus according to a first embodiment of the present invention. Referring to FIG. 1, a heater 27a serving as a heating means is disposed on the outer surface of the bottom portion of the container 23. On the inner surface of the bottom portion of the container 23, there are disposed rod-like projections 39 made of material exhibiting excellent thermal conduction and projecting vertically at adequate intervals which do not interrupt the heat convection of the TEOS liquid A in the container 23. The projections 39 may be formed into another shape if they are able to conduct heat in the bottom portion of the container 23.

Then, referring to FIG. 1, heating and maintaining the hot TEOS liquid A to be performed in this embodiment will now be described. In this embodiment, the valves 20 and 21 are opened prior to performing the vaporization and the valves 18 and 22 are closed to inject the TEOS liquid A from the liquid-supply pipe 13 into the container 23. When the liquid surface B has reached the liquid-surface detection portion 26 of the liquid-surface sensor 25, the valves 20 and 21 are closed. The TEOS liquid A in the container 23 is efficiently heated through the container bottom portion and the projections 39. The temperature sensor 24 detects the temperature of the TEOS liquid A. At this time, vertical thermal convection is generated between the lower portion of the TEOS liquid A adjacent to the heater 27a which can therefore be heated to a relatively hot level and the upper portion of the TEOS liquid A spaced from the heater 27a and which cannot easily be heated. Therefore, the temperature of the TEOS liquid A is made to be uniform level without vertical irregularity. In this state, the TEOS liquid A is heated and maintained at a predetermined temperature level. During this period, the temperature of the TEOS liquid A is maintained at a uniform state due to the thermal convection. Therefore, there can be prevented in the temperature of the liquid and change in the quantity of the vapor experienced with the foregoing conventional example.

As described above, the heater 27a heats the container bottom portion to enable the TEOS liquid A in the container to be heated and maintained at a predetermined temperature level. Further, the heat from the heater 27a is conducted from the container bottom portion to the projections 39 so as to diffuse the heat from the surface of each projection 39 into the TEOS liquid A. As a result, the heating efficiency by means of the heater 27a can be improved so that the time required to heat the TEOS liquid A to a predetermined temperature level can be shortened.

Figure 52:
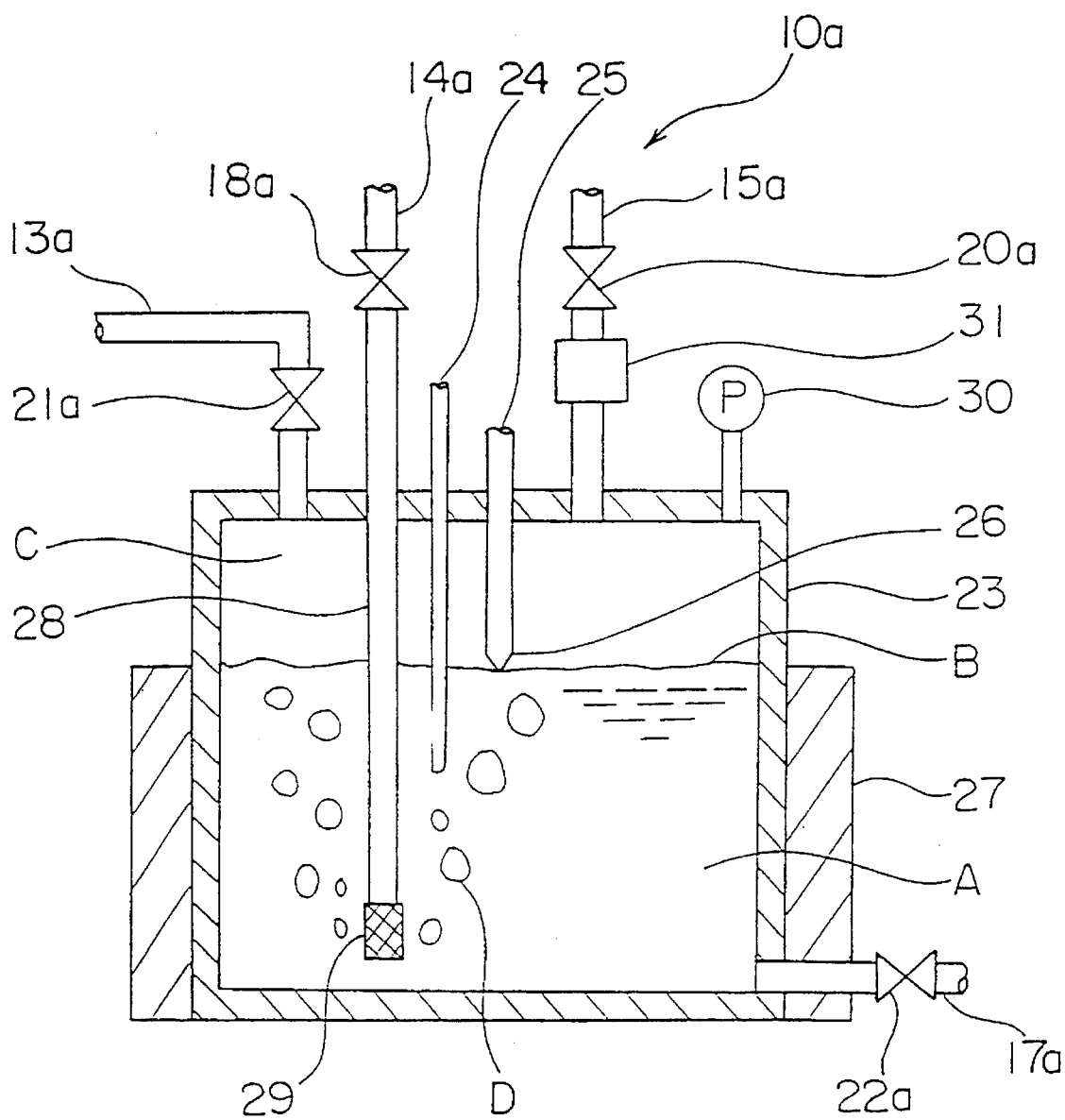
FIG. 52 is a vertical cross sectional view which illustrates the structure of a conventional liquid vaporizing apparatus.

The residual structures and operations of this embodiment are substantially the same as those of the foregoing conventional example shown in FIG. 52.

Figure 2:
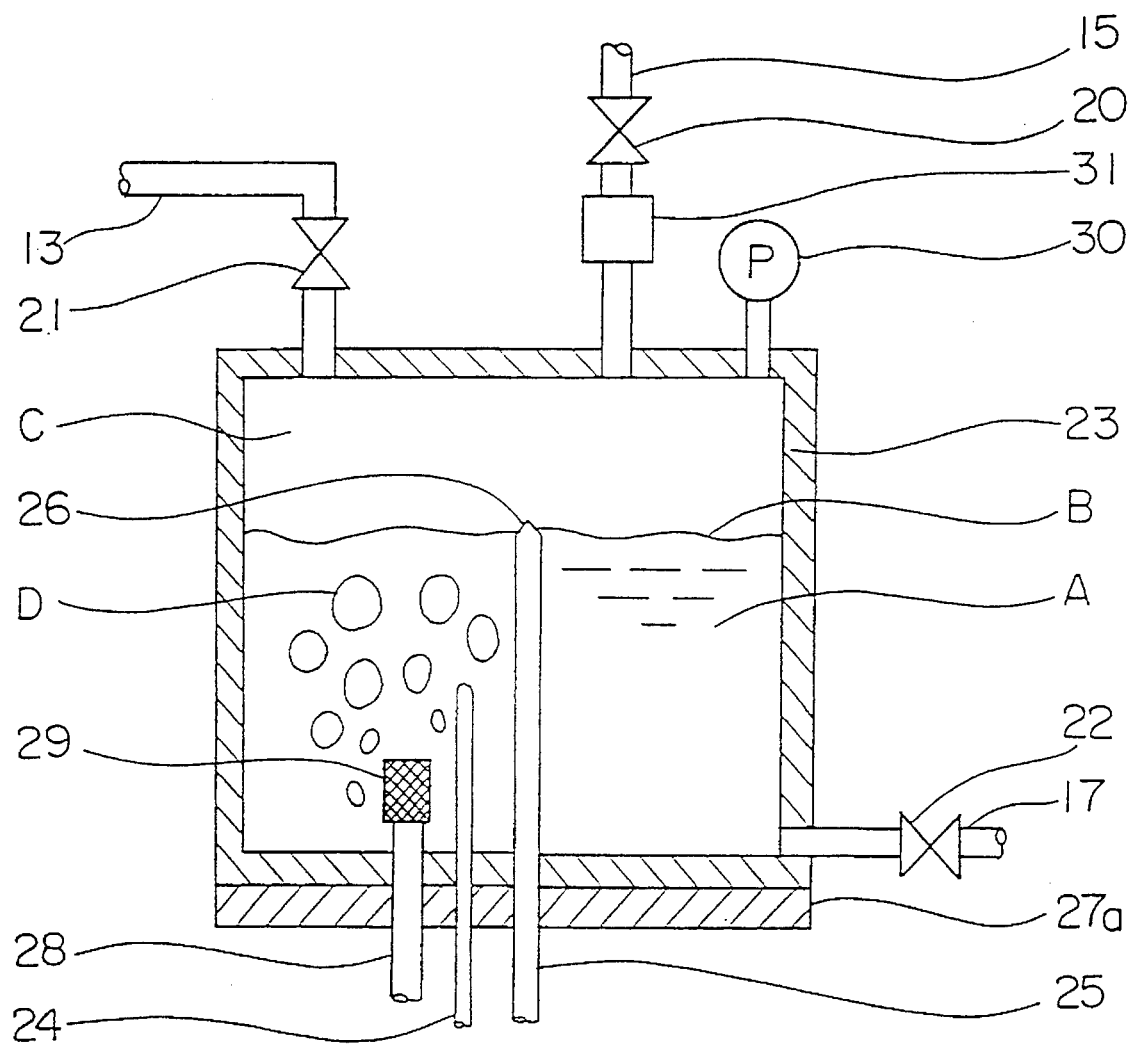
FIG. 2 is a vertical cross sectional view which illustrates the structure of a liquid vaporizing apparatus according to a second embodiment of the present invention.

FIG. 2 illustrates a second embodiment of the present invention. As shown in this figure, the temperature sensor 24, the liquid-surface sensor 25 and the bubbling tube 28 in the TEOS liquid A below the liquid surface B are provided so that the escape of heat as described in the conventional example shown in FIG. 52 is prevented. The escape takes place from the internal space C in the container 23 to the outside portion of the container 23 through the temperature sensor 24, the liquid-surface sensor 25 and the bubbling tube 28. Therefore, lowering of the liquid surface B due to the heat escape can be prevented, and therefore the reduction in the quantity of vapor and lowering of the film growth speed and the like can be prevented. Since the portion to which liquid droplets and mist are allowed to adhere can be reduced, the quantity of the vapor can be stabilized.

Figure 3:
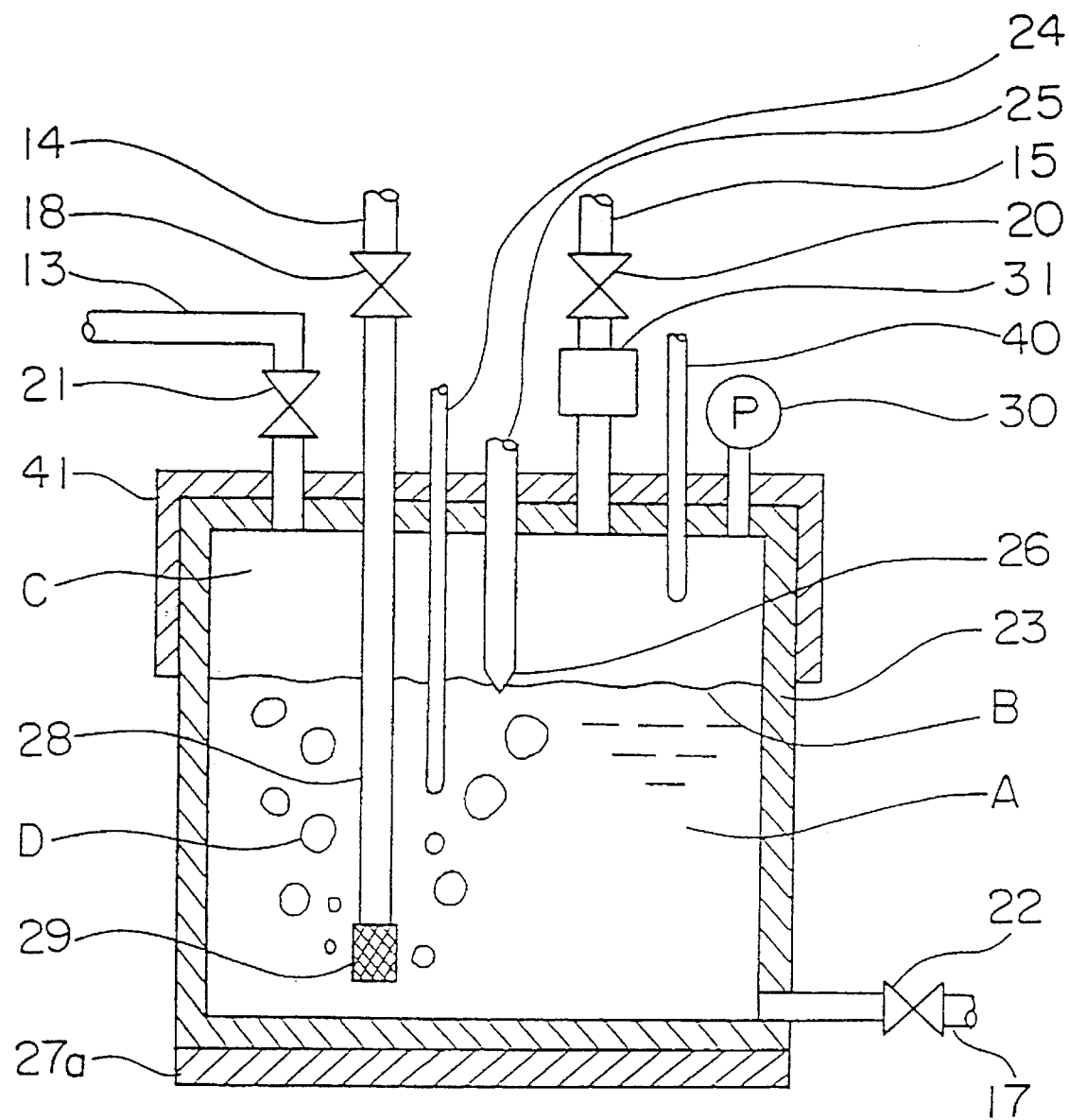
FIG. 3 is a vertical cross sectional view which illustrates the structure of a liquid vaporizing apparatus according to a third embodiment of the present invention.

FIG. 3 illustrates a third embodiment of the present invention. In this embodiment, a temperature sensor 40 having a leading portion facing the internal space C in the container 23 above the liquid surface is disposed on the top surface of the container 23 in addition to the heater 27a provided for the container bottom portion, a heater 41 is disposed along the top surface and the upper portion of the side portion of the container 23, that is, it is disposed to surround the internal space C in the container 23. The residual structures are substantially the same as those of the embodiment shown in FIG. 1. In the third embodiment, no projection is provided in the bottom portion of the container 23. However, the projections 39 may be provided similarly to the embodiment shown in FIG. 1.

Since the internal space C in the container 23 is, in the third embodiment, heated and maintained at a predetermined temperature level by the heater 41 in accordance with the temperature detected by the temperature sensor 40, heat escape can be prevented from the internal space C in the container 23 to the outside portion of the container 23 through the temperature sensor 24, the liquid-surface sensor 25 and the bubbling tube 28. Therefore, the reduction in the quantity of vapor and lowering of the film growth speed due to lowering of the liquid surface can be prevented.

However, heat conduction taking place at this time from the upper portion of the side surface of the container 23 to the upper portion of the TEOS liquid A due to the heat from the heater 41 undesirably raises the temperature of the foregoing portion of the TEOS liquid A, resulting in an irregular temperature of the liquid sometimes.

Figure 4:
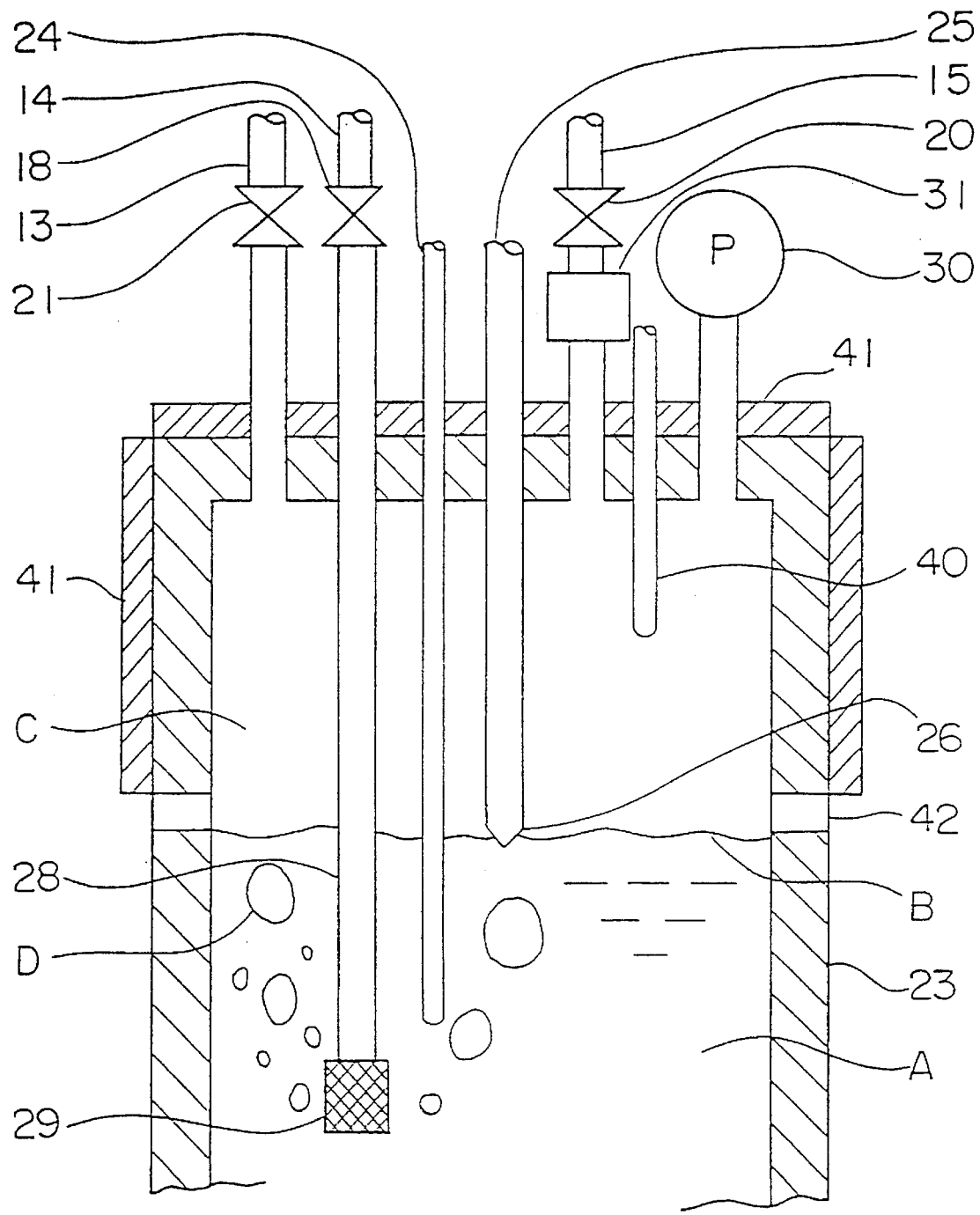
FIG. 4 is a vertical cross sectional view which illustrates the upper portion of a liquid vaporizing apparatus according to a fourth embodiment of the present invention.

Accordingly, a fourth embodiment of the present invention shown in FIG. 4 has an arrangement that a portion of the side wall of the container 23 in contact with the lower end of the heater 41 is made of a heat insulating material 42, such as glass or ceramic. Thus, the heat conduction from the heater 41 to the TEOS liquid A can be limited so that the foregoing irregular liquid temperature is prevented.

In order to achieve a similar object, a fifth embodiment of the present invention is arranged in this way so that a portion of the side wall of the container 23 connected to the lower end of the heater 41 is provided with fins 43 for radiating the heat. As a result, the heat conducted from the heater 41 to the lower portion of the side wall of the container 23 is radiated through the fins 43 so that heat conduction to the TEOS liquid A is reduced. Therefore, the foregoing irregular liquid temperature can be prevented.

Figure 5:
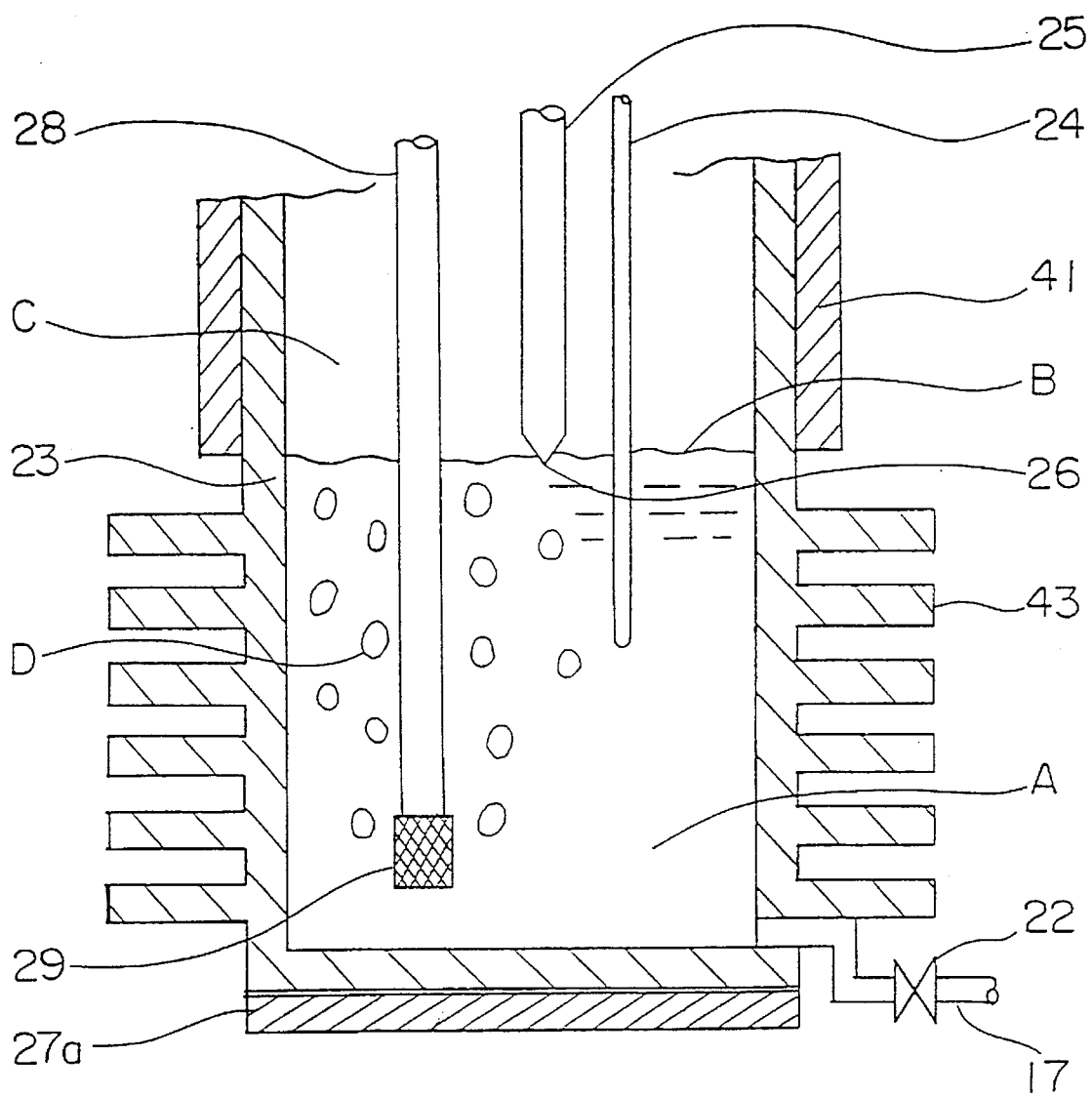
FIG. 5 is a vertical cross sectional view which illustrates the lower portion of a liquid vaporizing apparatus according to a fifth embodiment of the present invention.
Figure 6:
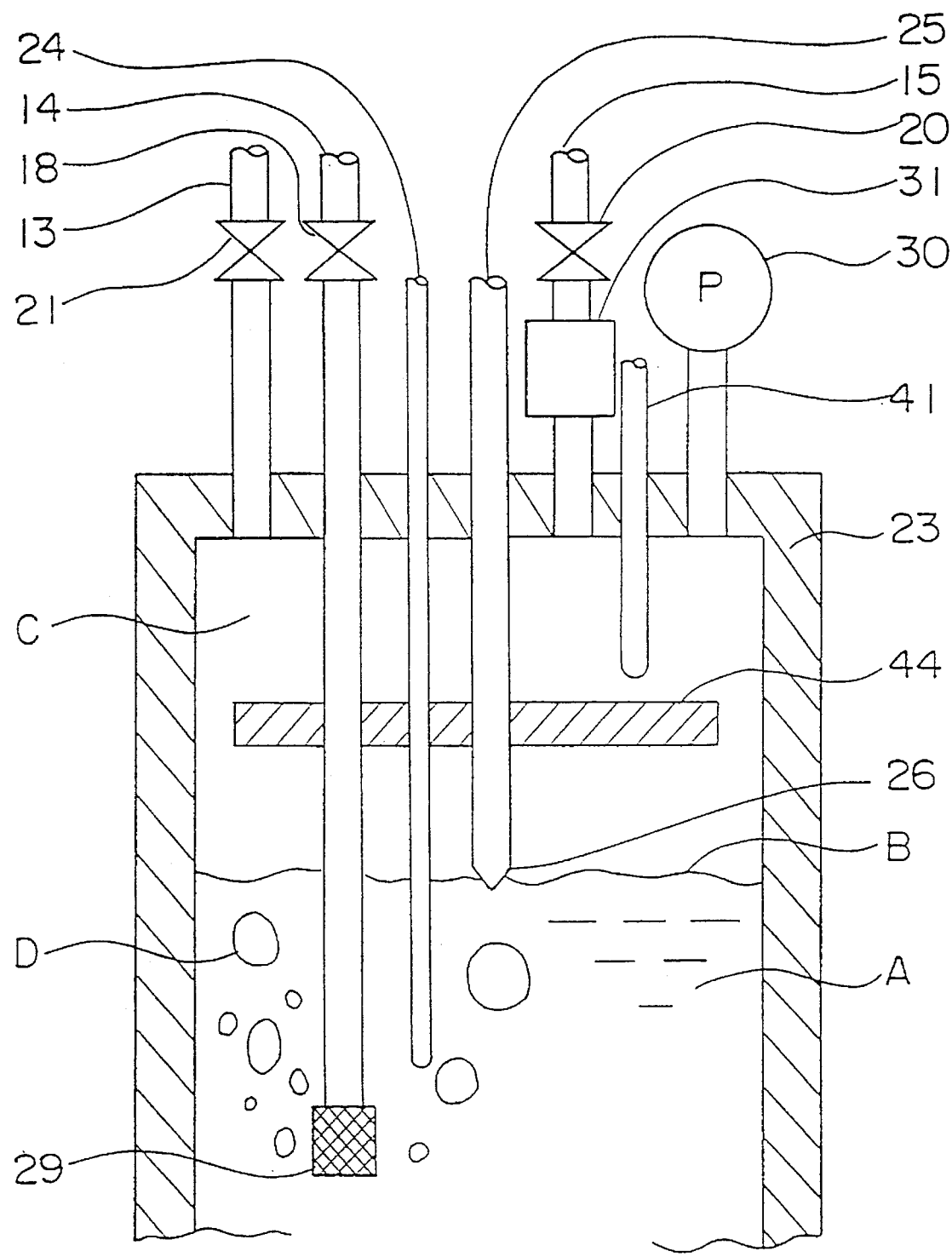
FIG. 6 is a vertical cross sectional view which illustrates the upper portion of a liquid vaporizing apparatus according to a sixth embodiment of the present invention.

FIG. 6 illustrates a sixth embodiment of the present invention. In this embodiment, the heater 41 is omitted from the upper portion on the outer surface of the container 23, but a heater 44 is disposed in the internal space C in the container 23 above the liquid surface B in the container 23. The residual structures of the sixth embodiment are the same as the embodiment shown in FIG. 3. Since the internal space C in the container 23 is, in the sixth embodiment, directly heated by the heater 44, an excellent heating efficiency can be obtained as compared with the embodiments shown in FIGS. 3 to 5 in which the heater is disposed on the outside of the container 23. Therefore, the size of the heater 44 can be reduced and the consumption of electricity can be reduced, resulting an economic effect. Furthermore, the outer dimensions of the apparatus can be reduced.

Figure 7:
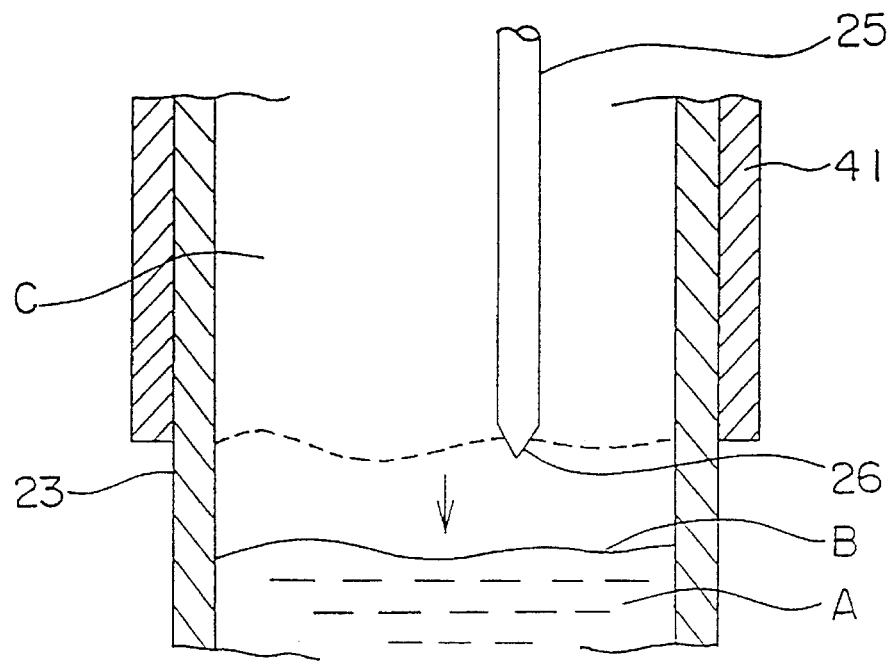
FIG. 7 is a vertical cross sectional view which illustrates the position of the heater and the movement of the liquid surface of the third embodiment of the present invention shown in FIG. 3.

As shown in FIG. 7 which simply illustrates the portion in the vicinity of the foregoing liquid surface B shown in FIG. 3, the arrangement that the lower end of the foregoing heater 41 is, as designated by a dashed line, located at the position of the liquid surface B before the liquid is vaporized. Heat escapes from the internal space C in the container 23 to the outside portion of the container 23 through a portion of the side wall of the container 23 between the liquid surface B designated by a continuous line and realized after the vaporization has been performed and the lower end of the heater 41 is exposed if continuation of the vaporization lowers the liquid surface. Therefore, the heat escape lowers the liquid surface as described, and therefore a reduction in the quantity of the vapor and lowering of the film growth speed take place.

Figure 8:
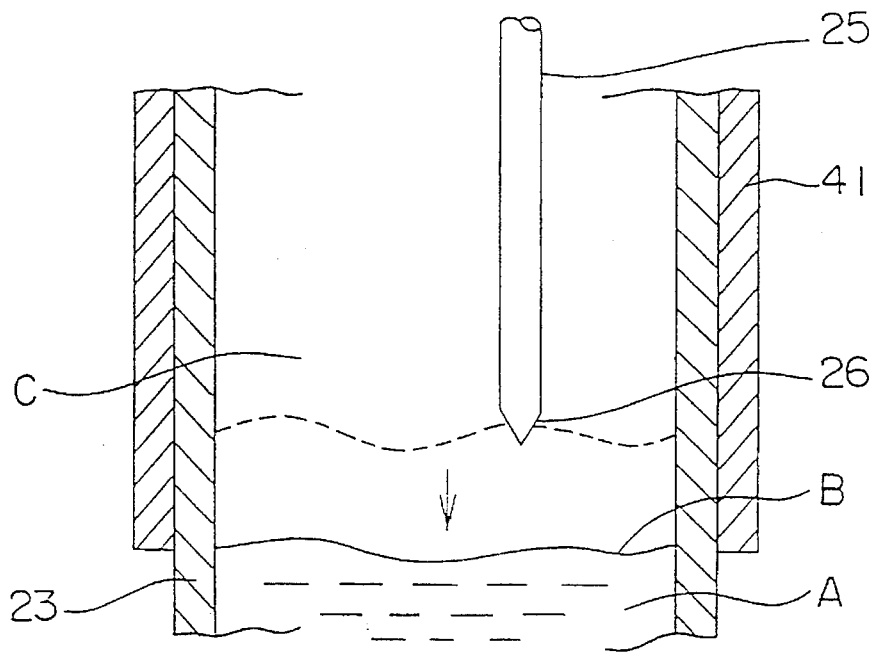
FIG. 8 is a vertical cross sectional view which illustrates the position of the heater and the movement of the liquid surface of the third embodiment of the present invention shown in FIG. 3.

If the lower end of the heater is, as shown in FIG. 8, located at the position of the liquid surface B designated by a continuous line and realized after the liquid has been vaporized, the liquid surface B designated by a dashed line and realized before the vaporization is performed is positioned above the lower end of the heater 41. Therefore, the lower end of the heater 41 heats the upper portion of the TEOS liquid A, causing the temperature of the same to be raised. As a result, an irregular liquid temperature takes place.

Figure 9:
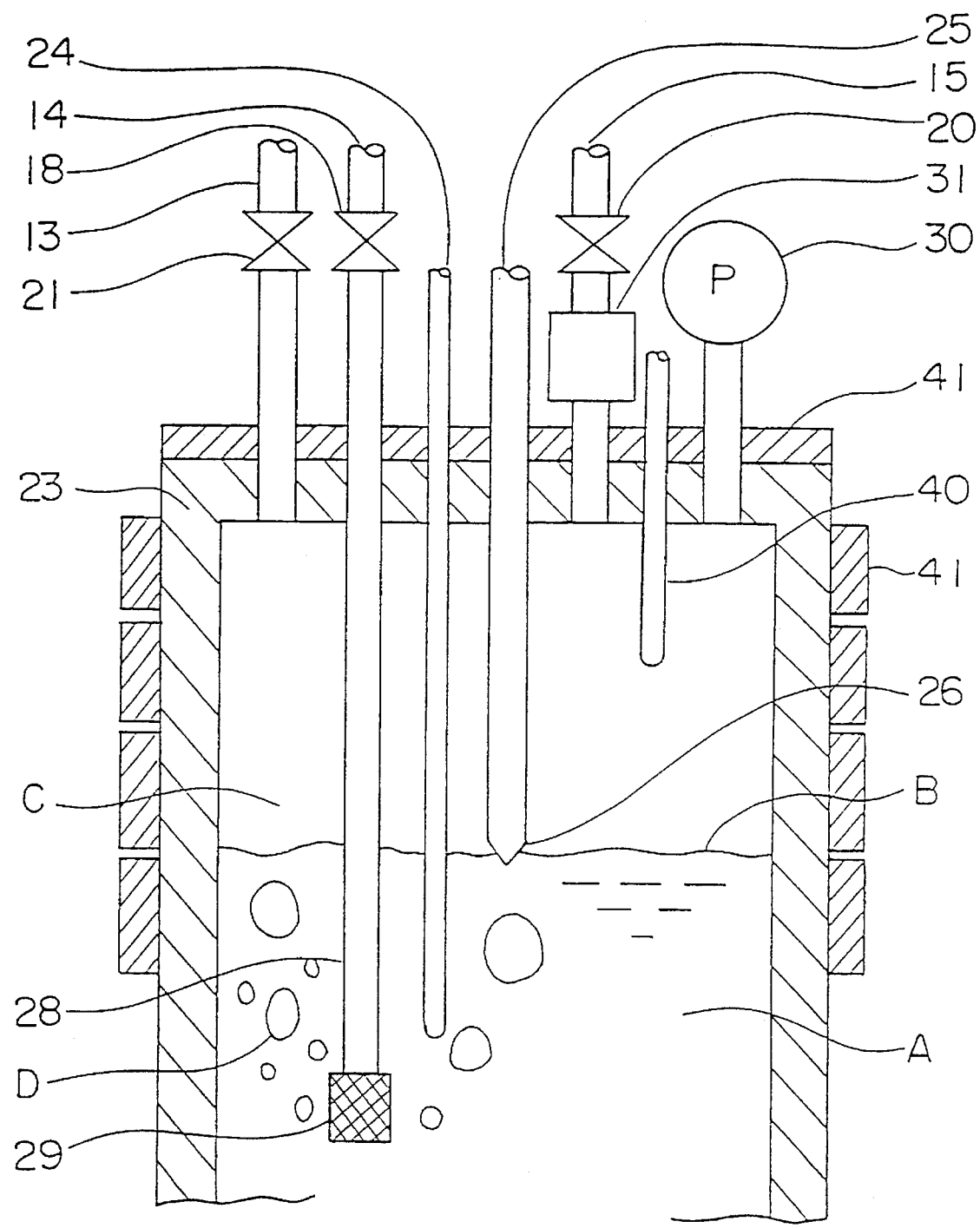
FIG. 9 is a vertical cross sectional view which illustrates the upper portion of a liquid vaporizing apparatus according to a seventh embodiment of the present invention.

Accordingly, an arrangement is employed in a seventh embodiment of the present invention as shown in FIG. 9 in which the heater 41 is divided into an upper portion and a side portion which is further vertically divided into a plurality of sections in order not to heat the portion of the side portion of the heater positioned below the liquid surface B first. Then, the portion above the liquid surface B is heated as the liquid surface B is lowered such that the temperature of the internal space C in the container 23 is made to be constant. As a result, there can be prevented the foregoing problem that the upper portion of the TEOS liquid A is heated by the lower end of the heater and the temperature of the same is undesirably raised.

Figure 10:
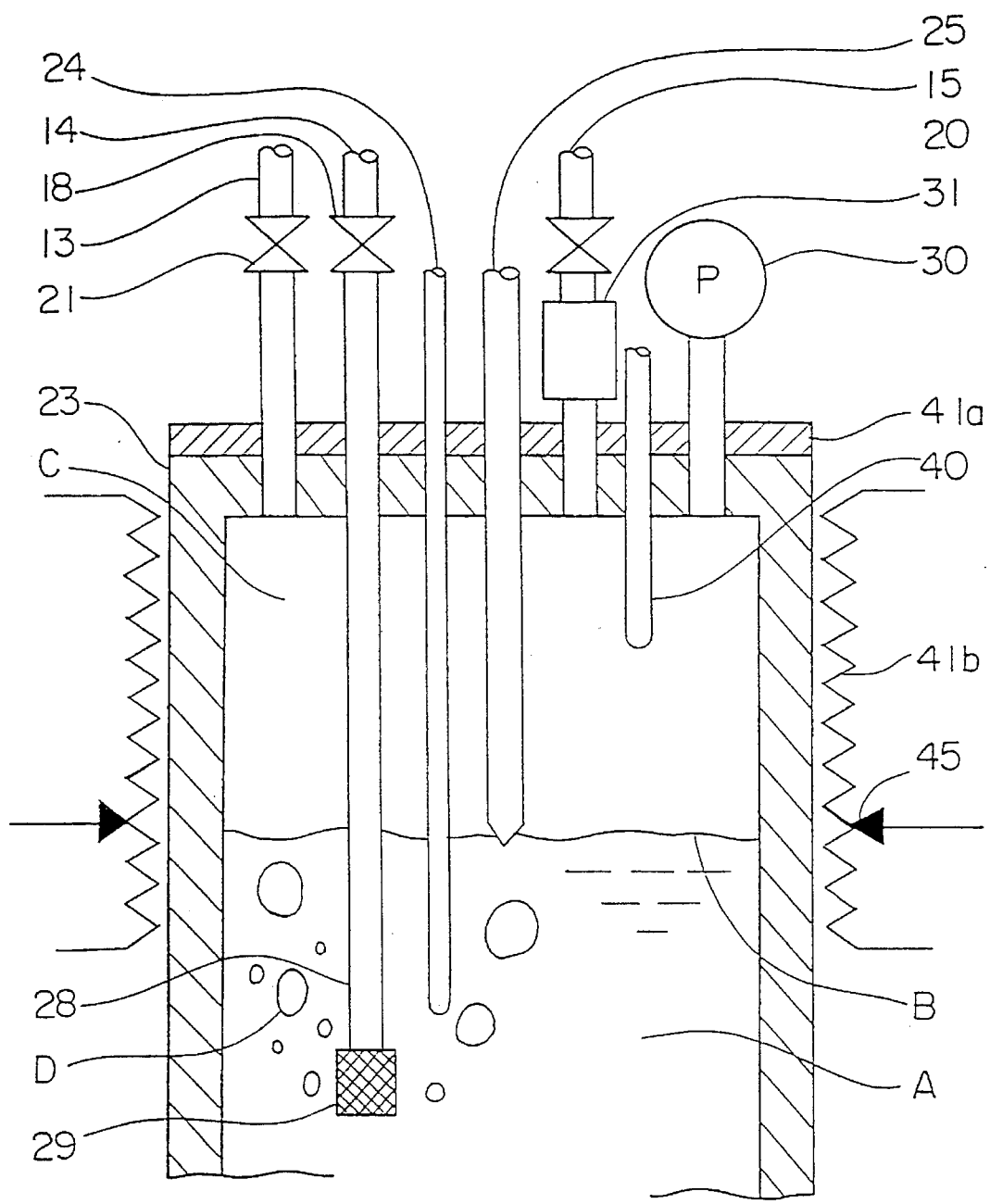
FIG. 10 is a vertical cross sectional view which illustrates the upper portion of a liquid vaporizing apparatus according to an eighth embodiment of the present invention.

FIG. 10 illustrates an eighth embodiment of the present invention. This embodiment has a structure that the heater 41 is composed of an upper heater 41a and a side heater 41b, and the side heater 41b is so structured that a resistance wire is wound around the side wall of the container 23. The upper end of the resistance wire is secured, while the lower end of the same is formed into a contact 45 movable vertically so as to flow an electric current through the resistance wire. As a result of the foregoing structure, lowering of the position of the contact 45 as the liquid surface B is lowered enables the effective length of the side heater 41b in the vertical direction to be changed. Therefore, the temperature of the internal space C in the container 23 can accurately be controlled to a constant level.

As another means for controlling the temperature of the foregoing internal space C in the container 23, a ninth embodiment of the present invention shown in FIG. 11 will now be described. Referring to the foregoing figure, a cover 46 for covering the upper wall and the internal space C in the upper portion of the side walls of the container 23 is disposed above the container 23. The cover 46 totally surrounds the gas introduction pipe 14 and the valve 18 disposed on the upper surface of the container 23, the gas ejection pipe 15 and the valve 20 also disposed on the upper surface of the container 23, the liquid-supply pipe 13, the valve 21, the pressure sensor 30 for measuring the pressure in the internal space C in the container 23 and the pressure adjuster 31 provided for the gas ejection pipe 15. Further, a temperature sensor for detecting the temperature of the inside portion of the cover 46 is disposed in the upper portion of the cover 46 so that the overall outer surface of the cover 46 is covered with a heater 48.

Figure 11:
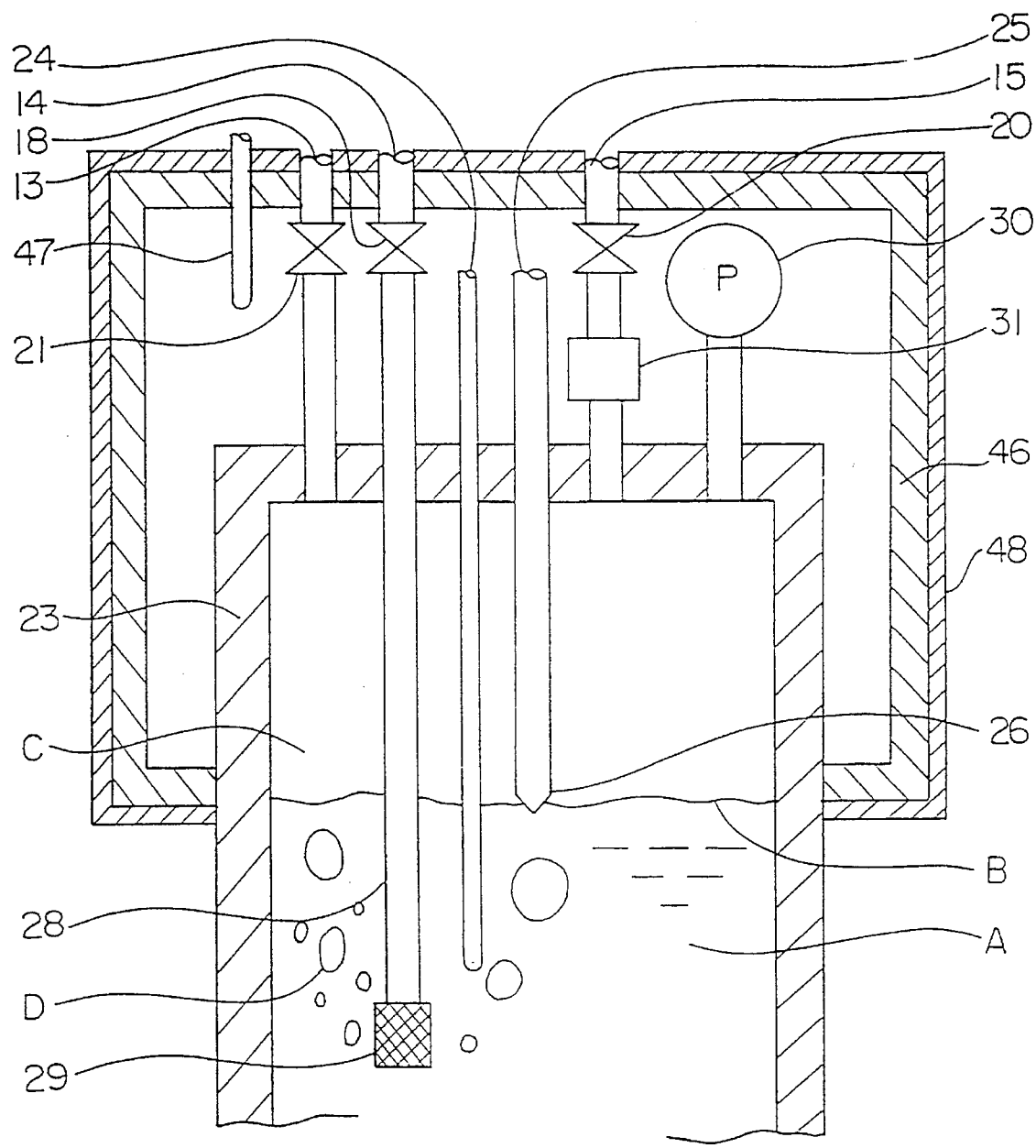
FIG. 11 is a vertical cross sectional view which illustrates the upper portion of a liquid vaporizing apparatus according to a ninth embodiment of the present invention.

In the embodiment shown in FIG. 11, the temperature in the cover 46 is detected by the temperature sensor 47 and heater 48 performs heating and control in accordance with the detected temperature so as to maintain the internal temperature of the cover 46 at the same level as that in the internal space C in the container 23. Therefore, heat escape from the internal space C in the container 23 to the inside portion of the cover 46 surrounding the internal space C can be prevented. As a result, the reduction in the quantity of the vapor and lowering of the film growth speed due to lowering of the liquid surface, which has been experienced with the conventional technology, can be prevented.

Figure 12:
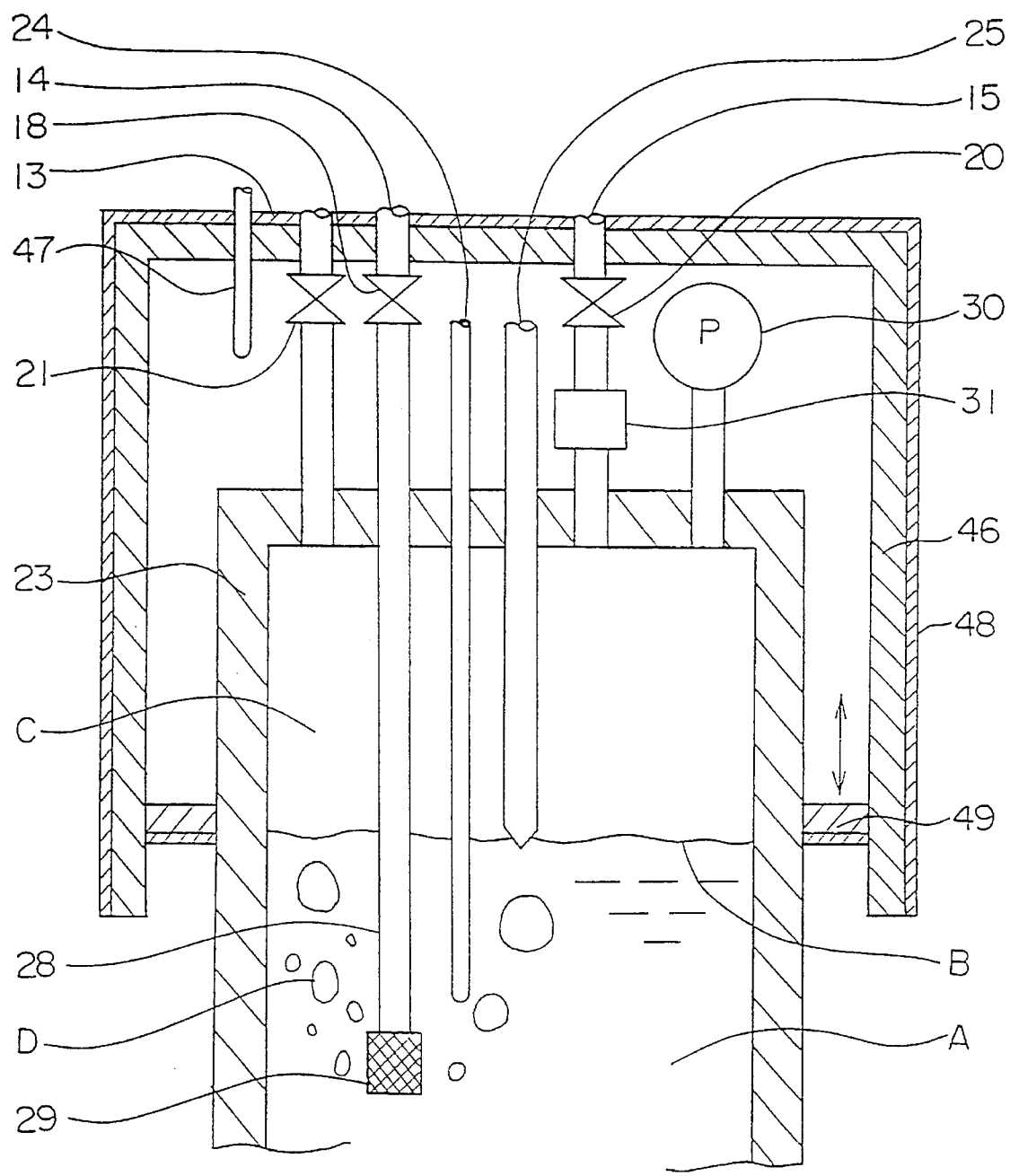
FIG. 12 is a vertical cross sectional view which illustrates the upper portion of a liquid vaporizing apparatus according to a tenth embodiment of the present invention.

A tenth embodiment of the present invention shown in FIG. 12 has an arrangement that a cover lower surface 49 of the cover 46 is made to be movable in the vertical direction so that the position of the cover lower surface 49 is adjusted to the position of the liquid surface B in the container 23 so that it is shifted downwards as the liquid surface B is lowered. As a result, similarly to the foregoing tenth embodiment, the temperature in the internal space C in the container 23 can be controlled to a constant level more accurately than the foregoing embodiment shown in FIG. 11.

Figure 13:
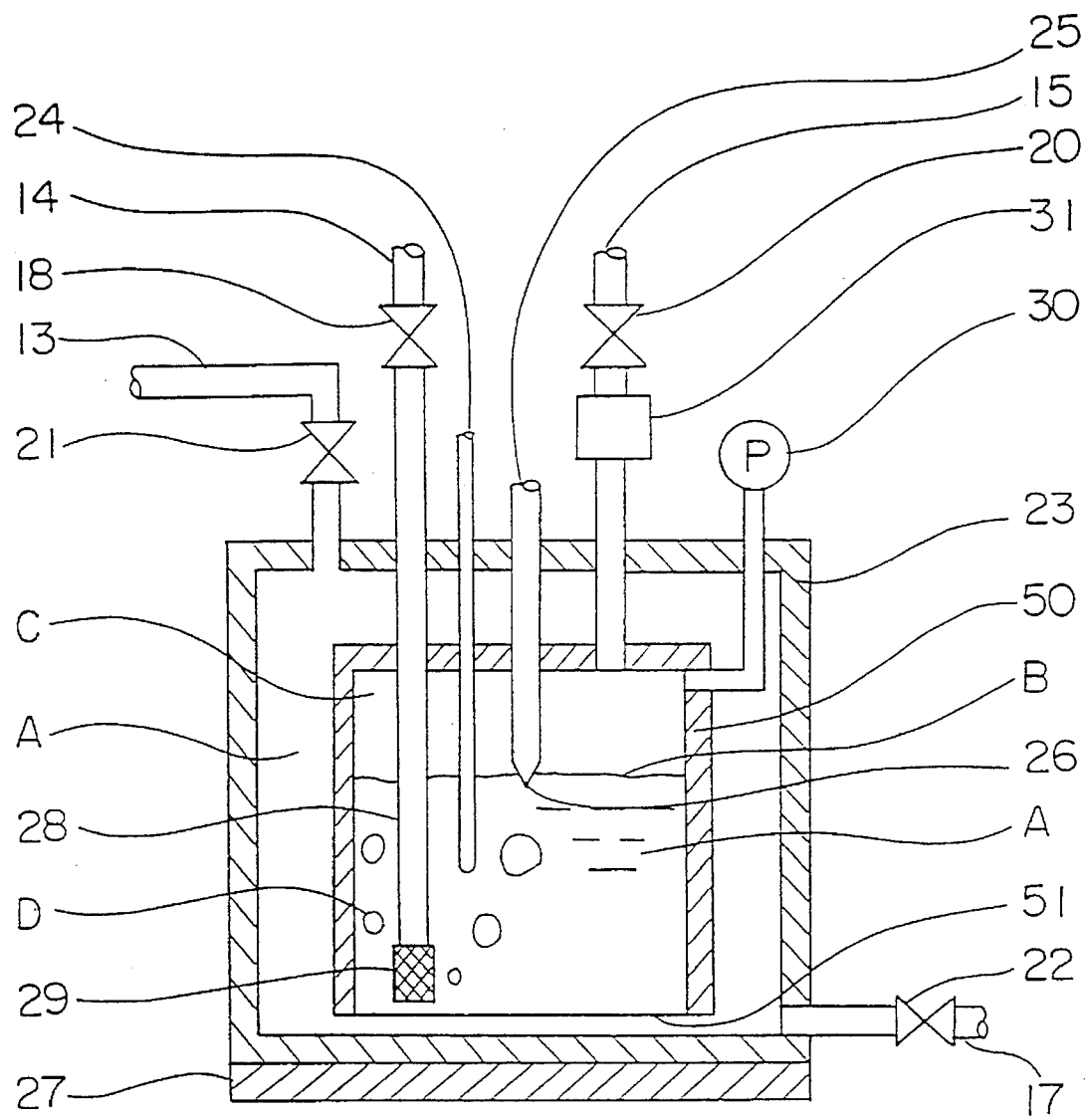
FIG. 13 is a vertical cross sectional view which illustrates the structure of a liquid vaporizing apparatus according to an eleventh embodiment of the present invention.

FIG. 13 illustrates an eleventh embodiment of the present invention comprising another means for making constant the temperature in the foregoing internal space C in the container 23. Referring to FIG. 13, an internal container 50 having an opening 51 formed in the lower portion thereof is disposed in the container 23. The bubbling tube 28, the gas ejection pipe 15, the temperature sensor 24, the liquid-surface sensor 25 and the pressure sensor 30, provided for the container 23 in the first embodiment shown in FIG. 1, are made to penetrate the upper wall of the container 23 to reach the internal container 50. In particular, the leading portions (bottom ends) of the bubbling tube 28, the temperature sensor 24 and the liquid-surface sensor 25 penetrate the upper wall of the internal container 50 to extend to its internal portion. The TEOS liquid A in the container 23 flows through the opening 51 formed in the lower portion into the internal container 50 so that the internal space C is formed on the liquid surface B.

In the embodiment shown in FIG. 13, the container 23 is filled with the TEOS liquid A except the internal space C in the container 23 which is formed in only the inside portion of the internal container. Since the internal space C in the container 23 is, therefore, completely surrounded by the TEOS liquid A heated and maintained at a predetermined temperature level, heat escape from the internal space C in the container 23 can be prevented. Therefore, the reduction in the quantity of the vapor and lowering of the film growth speed due to lowering of the liquid surface caused from the heat escaping from the internal space C in the container 23 can be prevented.

Figure 60:
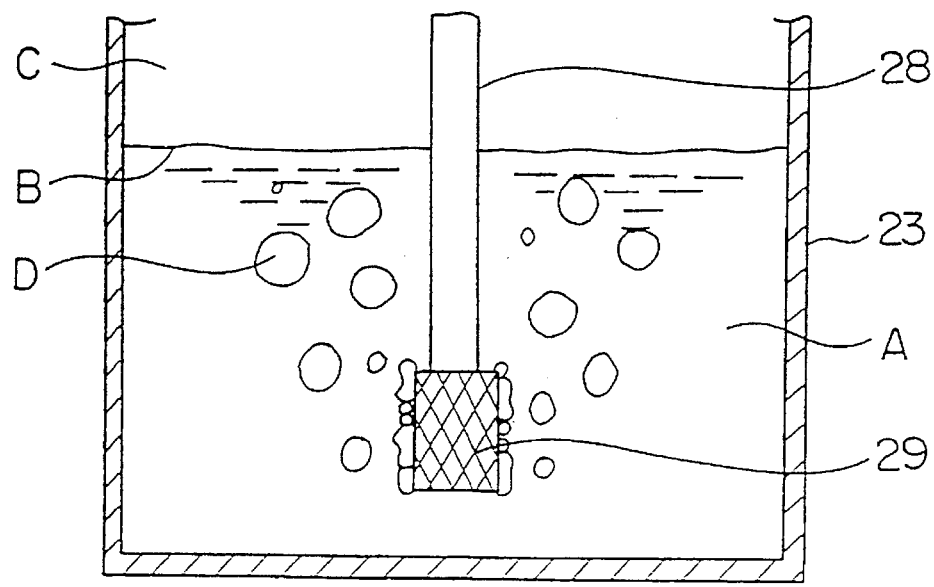
FIG. 60 is a vertical cross sectional view which illustrates the structure of an upper portion of a conventional liquid vaporizing apparatus and a state of vaporization realized by bubbling.
Figure 61:
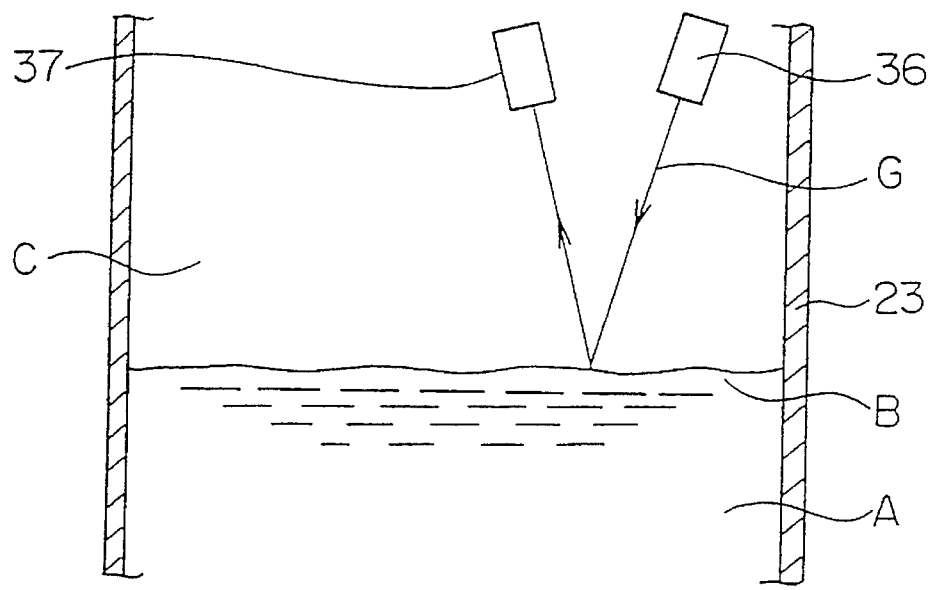
FIG. 61 is a vertical cross sectional view which illustrates the operation of a liquid-surface sensor in a conventional liquid vaporizing apparatus.
Figure 62:
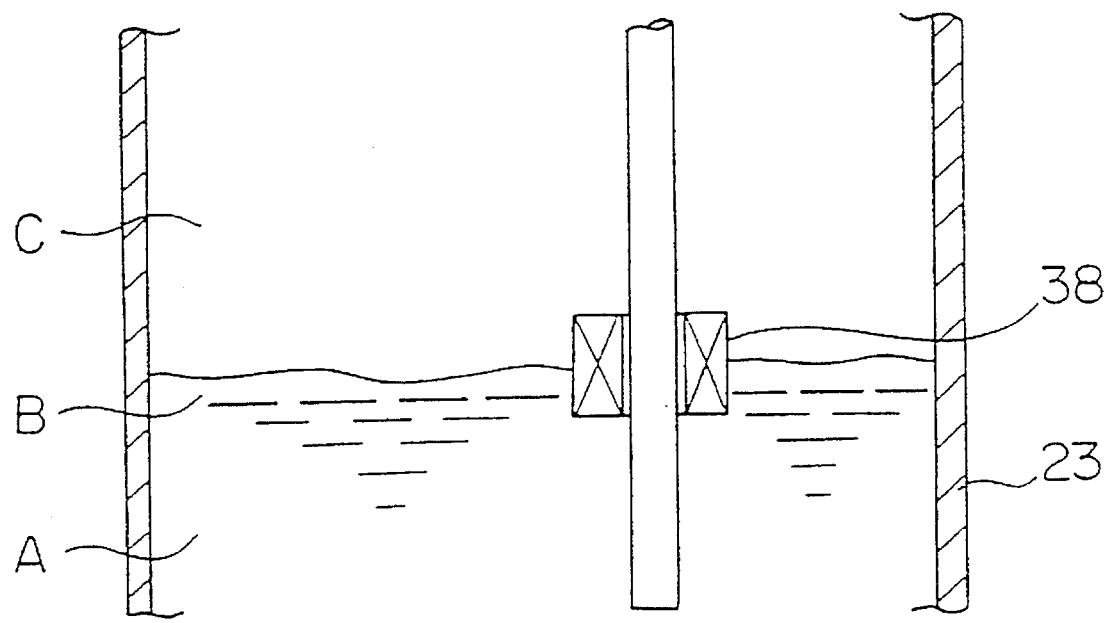
FIG. 62 is a vertical cross sectional view which illustrates the operation of a liquid-surface sensor in a conventional liquid vaporizing apparatus.

As described in the conventional example shown in FIG. 60, the nitrogen gas is jetted into the TEOS liquid A from the leading portion of the bubbling tube 28 through the mesh 28. The generated bubbles D each having a large size are formed even if the bubbles D are allowed to pass through the mesh 29. Therefore, the range in which the bubbles D rise in the TEOS liquid A is limited to a partial region around the bubbling tube 28 which is a relatively narrow range.

If the bubbles D are large and the range in which the same rise in the TEOS liquid A is narrow, the area in which the nitrogen gas and the TEOS liquid A are in contact with each other is reduced with respect to the flow rate of the nitrogen from the bubbling tube 28. As a result, the vaporization of the TEOS liquid A into the nitrogen gas cannot reach the saturation state, causing a problem of a change in the quantity of the vapor to arise.

Figure 59:
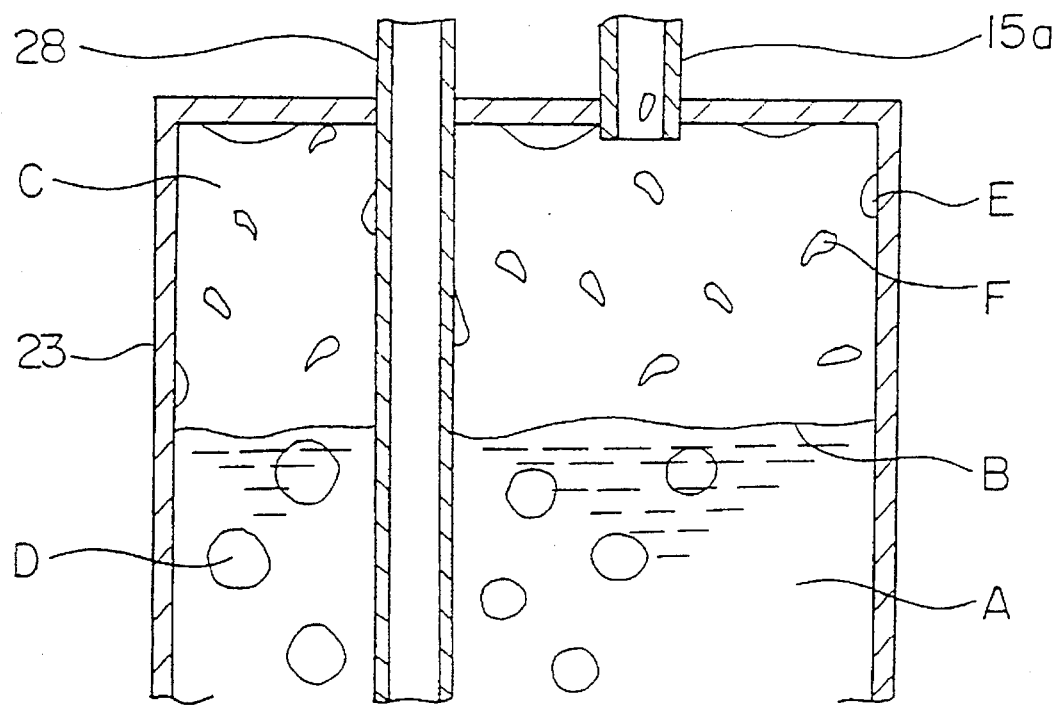
FIG. 59 is a vertical cross sectional view which illustrates the structure of an upper portion of a conventional liquid vaporizing apparatus and a state of vaporization realized by bubbling.

As described in the foregoing conventional example shown in FIG. 59, liquid droplets E fly and adhere to the inner surface of the container 23 when large bubbles D allowed to reach the liquid surface B burst. Although liquid droplets E allowed to adhere onto the inside of the side surface of the container 23 flow downwards to the liquid surface B, liquid droplets E adhering onto the inside of the top surface of the container 23 are held intact.

In the foregoing state, liquid droplets E allowed to adhere to the container 23 are in contact with the nitrogen gas in the internal space C in the container 23. When the vaporization due to bubbling has not reached the saturation level, the liquid droplets E makes the TEOS liquid A vaporize in the nitrogen gas. Therefore, if the quantity of the liquid droplets E is changed, the quantity of the vapor from the liquid droplets E is changed, and therefore the overall quantity of the vapor is changed.

In the foregoing state, generated liquid droplets E and mist F in the nitrogen gas are sometimes ejected to the outside portion of the container 23 through the gas ejection pipe 15 as shown in FIG. 59. If they are vaporized in the ensuing pipes, the overall quantity of the vapor can be changed undesirably.

Figure 14:
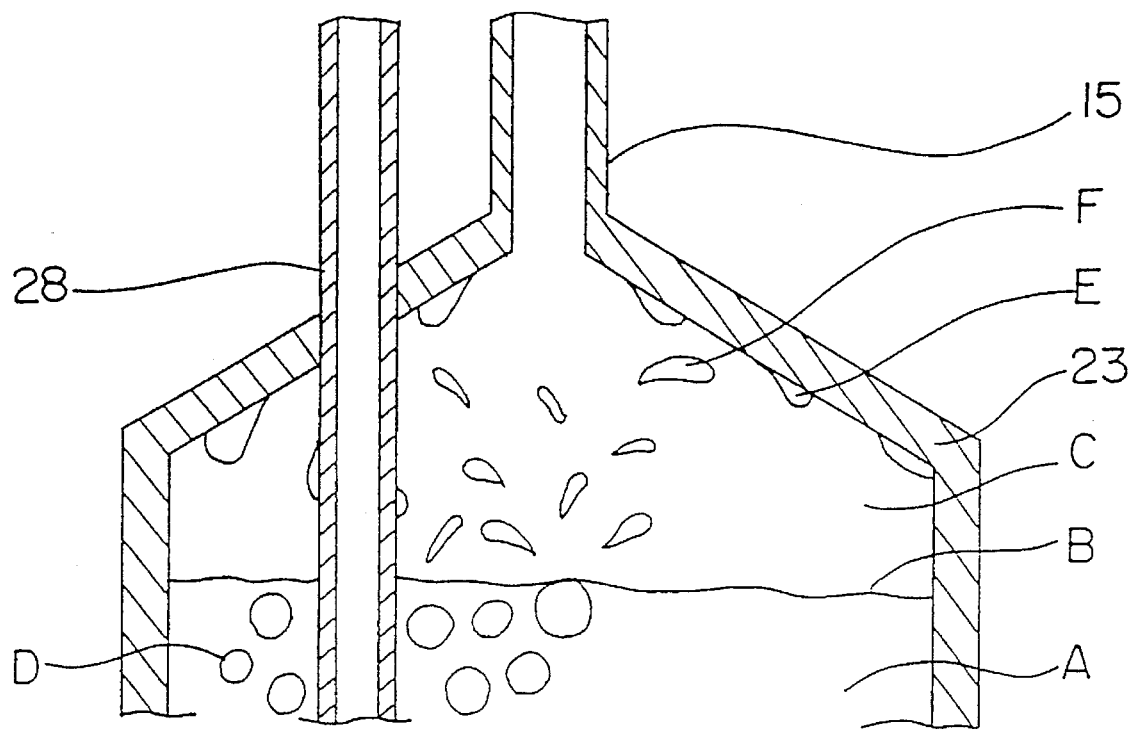
FIG. 14 is a vertical cross sectional view which illustrates the upper portion of a liquid vaporizing apparatus according to a twelfth embodiment of the present invention.

Accordingly, a twelfth embodiment of the present invention shown in FIG. 14 makes the shape of the inner top surface of the container 23 incline from the portion in which the gas ejection pipe 15 is disposed toward the side surface of the internal portion of the container 23. As a result of the foregoing structure, liquid droplets E adhered to the inner top surface of the container 23 are not held in the foregoing portion but they fall onto the liquid surface B. Therefore, the foregoing change in the quantity of the vapor can be prevented.

Figure 15:
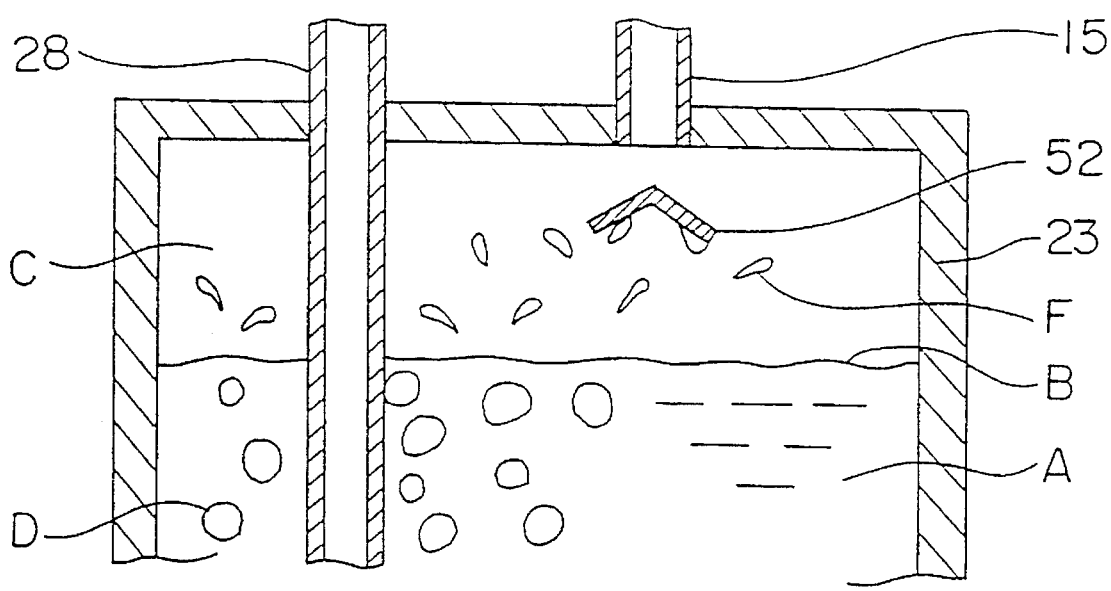
FIG. 15 is a vertical cross sectional view which illustrates the upper portion of a liquid vaporizing apparatus according to a thirteenth embodiment of the present invention.
Figure 16:
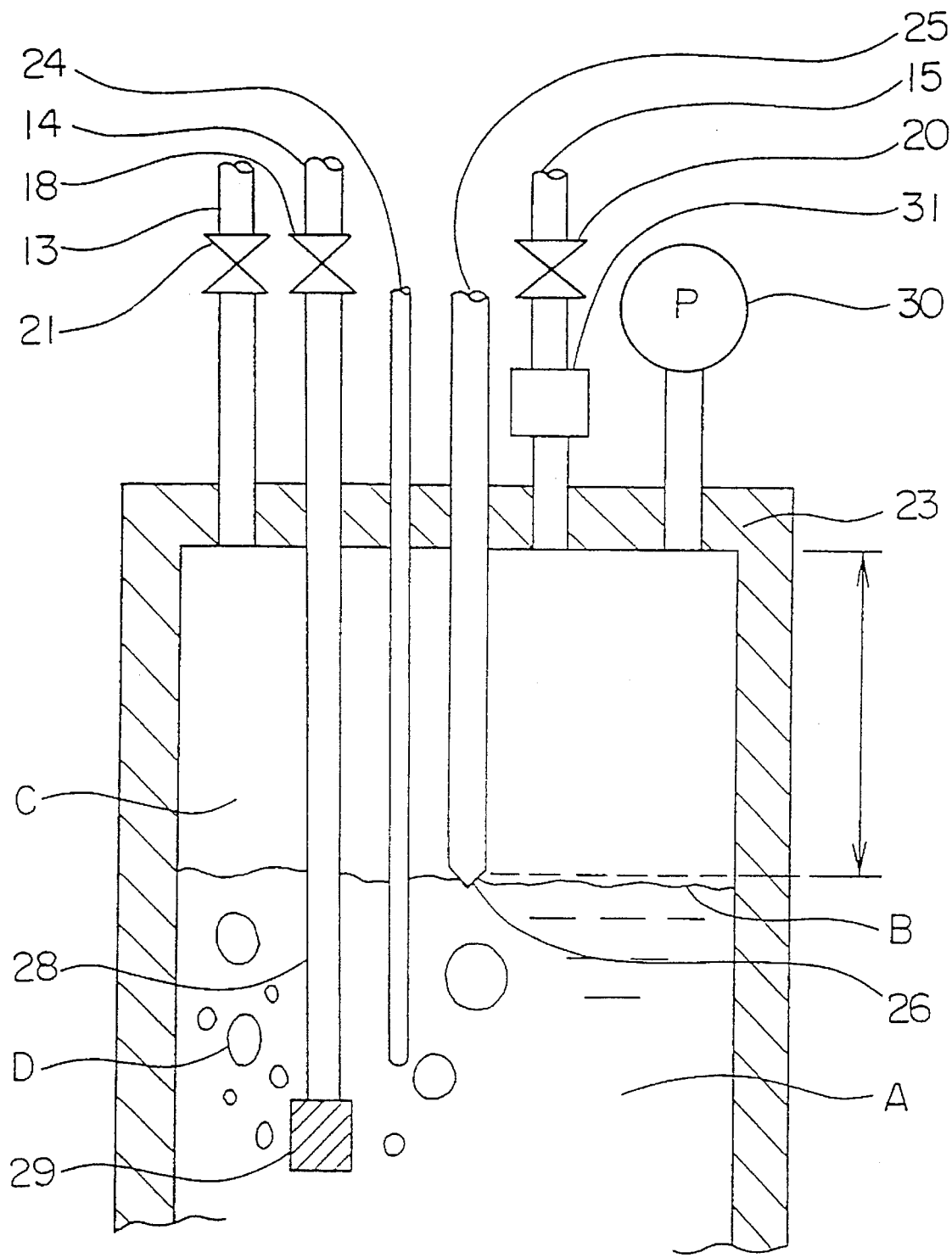
FIG. 16 is a vertical cross sectional view which illustrates the upper portion of a liquid vaporizing apparatus according to a fourteenth embodiment of the present invention.

In a thirteenth embodiment of the present invention shown in FIG. 15, the container 23 includes an insulating plate 52 which is disposed immediately below the gas ejection pipe 15 and which is larger than the diameter of the gas ejection pipe 15. In this embodiment, liquid droplets E moving toward the gas ejection pipe 15 is stopped by the insulating plate 52 so that the foregoing change in the quantity of the vapor due to liquid droplets E adhered to the internal surface of the gas ejection pipe 15 is prevented. The insulating plate 52 is formed into a shape having a central portion projecting upwards so that the adhesion and remaining of liquid droplets E on the insulating plate 52 are prevented. Therefore, the change in the quantity of the vapor due to the liquid droplets E adhered to the insulating plate 52 can be prevented. In a fourteenth embodiment shown in FIG. 16, the liquid-surface sensor 25 is disposed so that its liquid-surface detection portion 26 is spaced from the top inner surface of the container 23 by 50 mm or longer. The foregoing arrangement that the height of the internal space C in the container 23 from the liquid surface B to the top inner surface of the container 23 is 50 mm or more to prevent the movement of liquid droplets E generated from the liquid surface B to the inner top surface of the container 23 and the gas ejection pipe 15. Therefore, the foregoing change in the quantity of the vapor due to the liquid droplets E adhered to the container top surface can be prevented.

Figure 17:
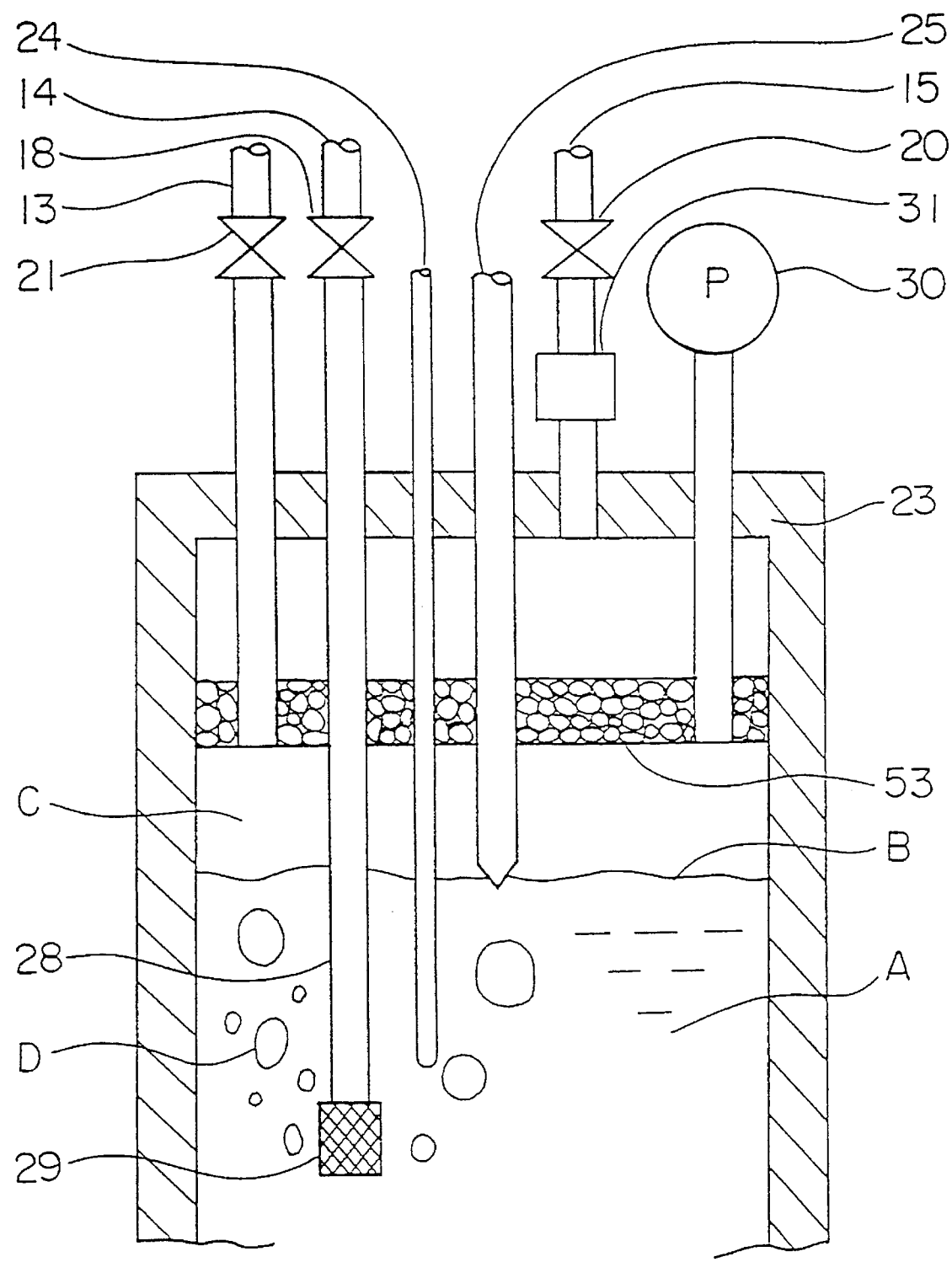
FIG. 17 ms a vertical cross sectional view which illustrates the upper portion of a liquid vaporizing apparatus according to a fifteenth embodiment of the present invention.

In a fifteenth embodiment of the present invention shown in FIG. 17, a filter 53 is so disposed between the liquid surface B in the container 23 and the lower end of the gas ejection pipe 15 or the inner surface of the upper wall of the container 23 that the outer end of the filter 53 is in contact with the inner surface of the side wall of the container 23. Although omitted from illustration, a heater is attached to the bottom wall of the container 23 similarly to the embodiment shown in FIG. 1. As a result of the foregoing structure, the filter 53, which is in contact with the side wall of the container 23, is heated with heat, through the side wall, conducted from the bottom wall of the container 23 heated by a heater (omitted from illustration). Therefore, the filter 53 vaporizes all liquid droplets E generated below the filter 53 due to the contact so that the foregoing change in the quantity of the vapor due to the liquid droplets E can be prevented.

In the foregoing conventional example shown in FIG. 60, the foregoing problem arising due to the liquid droplets E is overcome by employing the mesh 29 serving as the means for making the generated bubbles D small, the mesh 29 being disposed at the leading portion of the bubbling tube 28. However, the foregoing arrangement encounters enlargement of the bubbles D generated on the surface of the mesh 29 due to merging of the bubbles. Therefore, use of the mesh 29 is insufficient to effectively overcome the foregoing problem.

Figure 18:
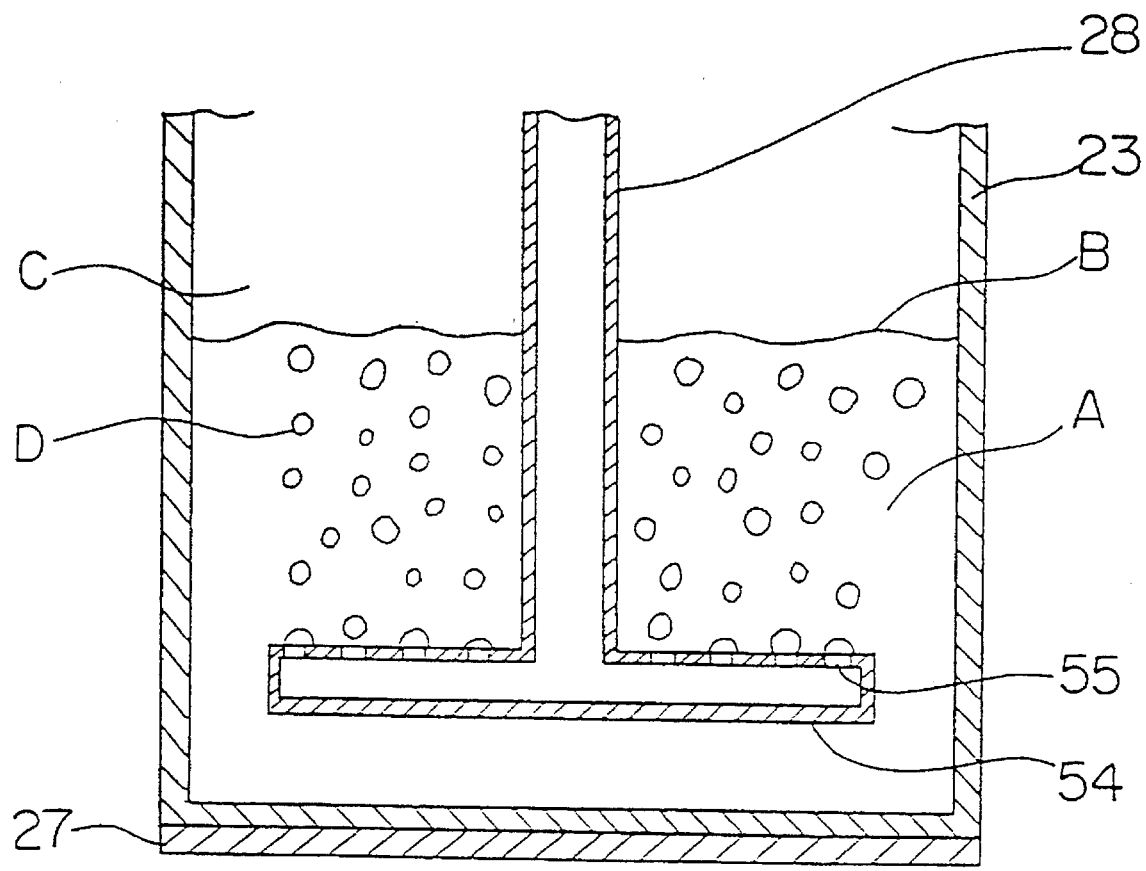
FIG. 18 ms a vertical cross sectional view which illustrates the lower portion of a liquid vaporizing apparatus according to a sixteenth embodiment of the present invention.

FIG. 18 illustrates a sixteenth embodiment of the present invention which is capable of effectively overcoming the foregoing problem. In this embodiment, a hollow diffusion plate 54 serving as a diffusion means is attached to the leading portion of the bubbling tube 28. In the top surface of the diffusion plate 54, a plurality of gas blowing holes 55 are formed. The area of the top surface of the diffusion plate 54 is larger than the cross sectional area of the bubbling tube 28 and also smaller than the inner cross-sectional area of the container 23.

Then, the operation of the foregoing diffusion means will now be described with reference to FIG. 18. The nitrogen flows from the bubbling tube 28 into the diffusion plate 54 and is blown through the plural gas blowing holes 55, causing the bubbles D to rise in a wide range in the liquid droplets E. In order to make the bubbles D small so as to cause the same to blow out equally from the entire surface of the diffusion plate 54 at this time, the diameter of each of the gas blowing holes 55 is made to be 1 mm or less. In order to prevent enlargement of the bubbles D due to merging the pitch (the interval) of the gas blowing holes 55 is made to be 3 mm or less.

Figure 19:
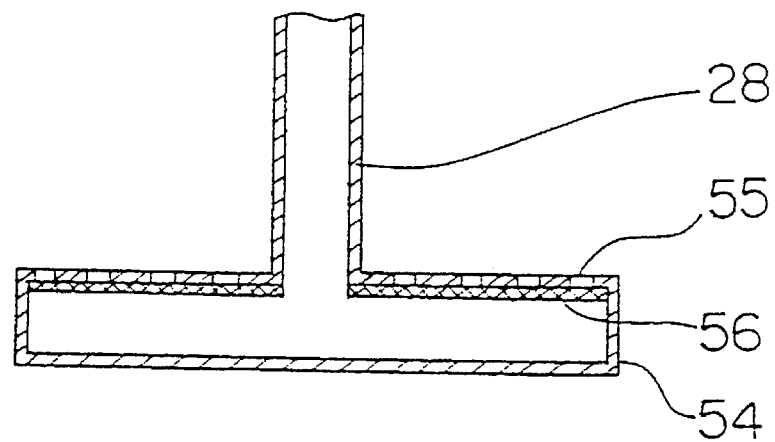
FIG. 19 is a vertical cross sectional view which illustrates a diffusion plate of a liquid vaporizing apparatus according to a seventeenth embodiment of the present invention.

FIG. 19 illustrates a seventeenth embodiment of the present invention, in which a modification of the diffusion means is shown in particular. According to this modification, a filter 56 having characteristics that permit gas to pass through but inhibit liquid passage is attached on the top surface of the diffusion plate 54 to cover the gas blowing holes 55. The filter 56 prevents the injection of the TEOS liquid A into the diffusion plate 54 when bubbling is not performed, that is, when the nitrogen gas is not blown through the gas blowing holes 55. As a result, the manner of the contact between the nitrogen gas and the TEOS liquid A can be made to be constant at the time of commencing bubbling. Therefore, the state in which the vaporization is performed can be stabilized.

Figure 20:
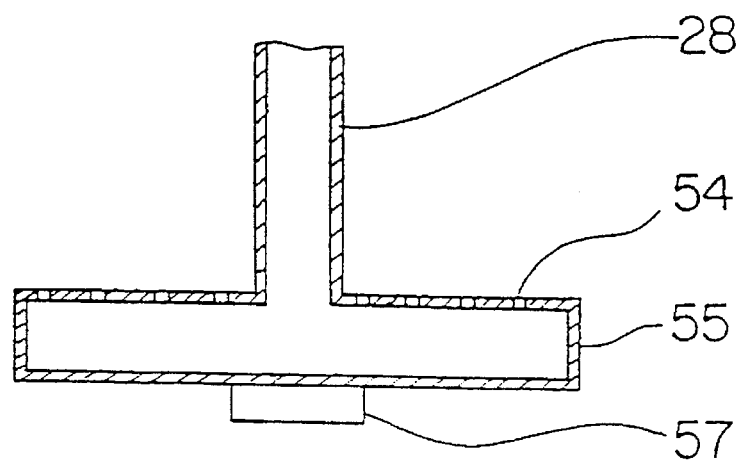
FIG. 20 is a vertical cross sectional view which illustrates a diffusion plate of a liquid vaporizing apparatus according to an eighteenth embodiment of the present invention.

FIG. 20 illustrates an eighteenth embodiment of the present invention, in which another modification of the diffusion means is shown in particular. In this modification, an ultrasonic oscillator 57 is disposed on the lower surface of the diffusion plate 54 having the plural gas blowing holes 55. When the ultrasonic operated 57 is oscillated, the bubbles D can be made to be smaller. The reason for this is that the bubbles D can be separated from the surface of the diffusion plate 54 by the oscillations of the diffusion plate 54 caused by the ultrasonic oscillator 57 in a state where the size of the bubbles D are is small before the bubbles D blown out through the gas blowing holes 55 and expand on the surface of the diffusion plate 54 thus having a certain size is separated from the surface.

Figure 21:
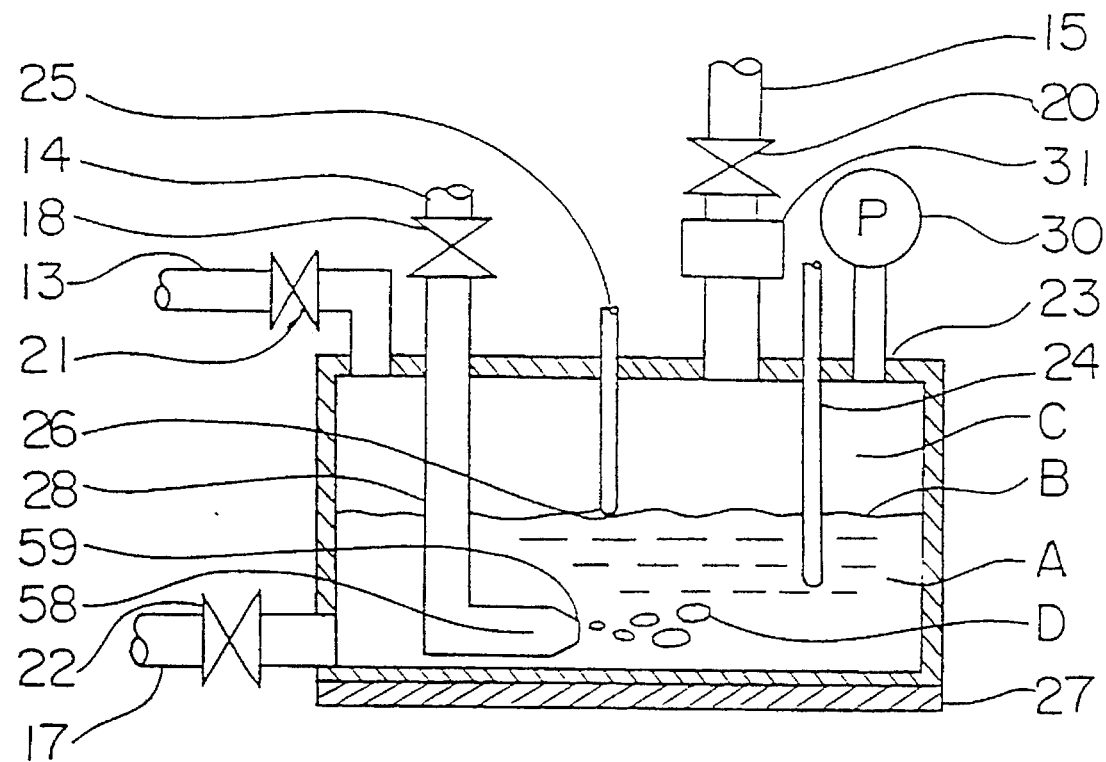
FIG. 21 is a vertical cross sectional view which illustrates the structure of a liquid vaporizing apparatus according to a nineteenth embodiment of the present invention.

FIG. 21 illustrates a nineteenth embodiment of the present invention. Referring to the foregoing figure, a gas jetting nozzle 58 is, in place of the mesh, disposed at the leading portion of the bubbling tube 28. A leading portion 59 of the nozzle 58 is tapered to have a narrower cross section than that of the bubbling tube 28. The residual structures of this embodiment are substantially the same as the embodiment shown in FIG. 1 except that the projections 39 are omitted.

Referring to FIG. 21, the vaporizing operation of this embodiment will now be described. The nitrogen gas is blown out from the bubbling tube 28 into the TEOS liquid A through the nozzle 58. At this time, the fact that the cross section of the nozzle leading portion 59 is smaller than the cross section of the bubbling tube 28 raises the allow velocity of the nitrogen gas so that the generated bubbles D are blown away before they join together and are enlarged. As a result, the bubbles D are made to be small bubbles D, causing the vaporization to be performed to substantially the saturation level.

Figure 22:
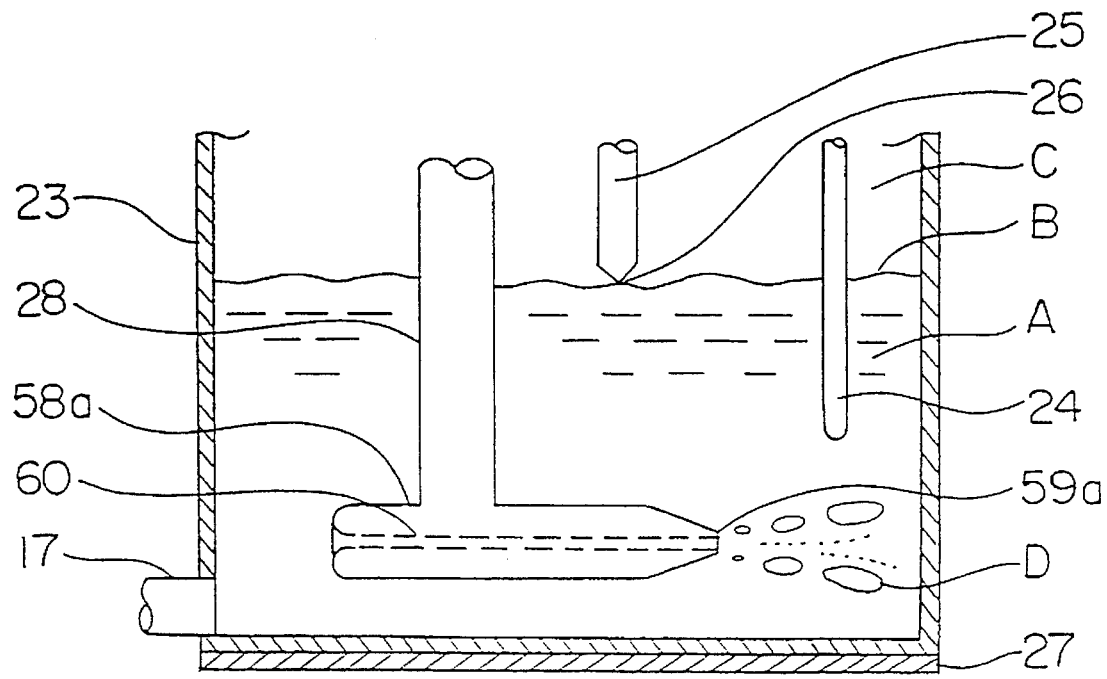
FIG. 22 is a vertical cross sectional view which illustrates the lower portion of a liquid vaporizing apparatus according to a twentieth embodiment of the present invention.

FIG. 22 illustrates a twentieth embodiment of the present invention. A nozzle 58a is, similarly to the nozzle 58 shown in FIG. 21, has a leading portion 59a tapered to have a narrower cross section than the cross section of the bubbling tube 28. In addition, the nozzle 58a includes a pipe 60 having a narrower the nozzle 58a. An end of the pipe 60 is so disposed to be in contact with the tapered nozzle leading portion 59a, while another end of the same penetrates the other end of the nozzle 58a to be in contact with the TEOS liquid A.

The vaporizing operation according to this embodiment will now be described with reference to FIG. 22. The nitrogen gas is blown from the bubbling tube 28 into the TEOS liquid A through the nozzle 58a and the nozzle leading portion 59a. At this time, Bernoulli's effect realized at the nozzle leading portion 59a makes the TEOS liquid A flow in the pipe 60 through the nozzle 58a from the end which is in contact with the TEOS liquid A toward the end of the nozzle leading portion 59a. Thus, the TEOS liquid A is blown from the nozzle leading portion 59a together with the bubbles D of the nitrogen gas. The blown TEOS liquid A prevents joining of the bubbles D, reducing the size of the generated bubbles D. As a result, the vaporization can be brought closer to the saturation level.

Since an annular gap between the nozzle leading portion 59a and the pipe 60 is narrowed in order to obtain the Bernoulli effect, flow of the nitrogen gas in a quantity larger than a predetermined quantity is inhibited.

Figure 23:
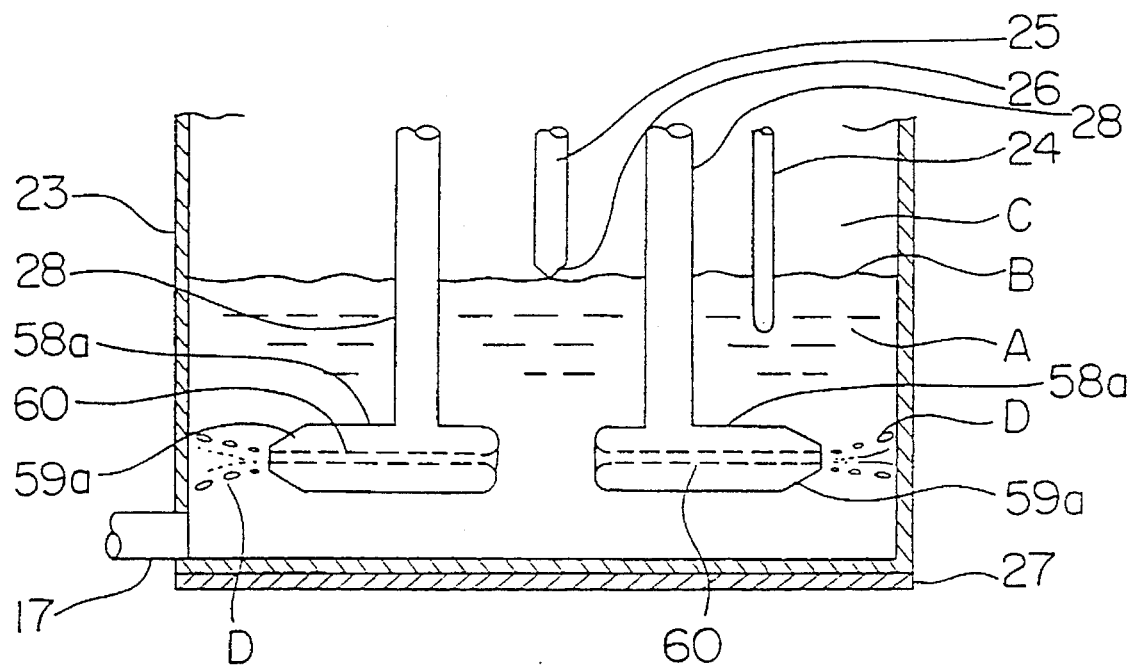
FIG. 23 is a vertical cross sectional view which illustrates the lower portion of a liquid vaporizing apparatus according to a twenty-first embodiment of the present invention.

A plurality of nozzles 58a each including the bubbling tube 28 and the pipe 59a as employed in a twenty-first embodiment of the present invention shown in FIG. 23 enable a large quantity of the nitrogen gas to flow. Therefore, a large quantity of vaporized gas can be obtained.

Figure 24:
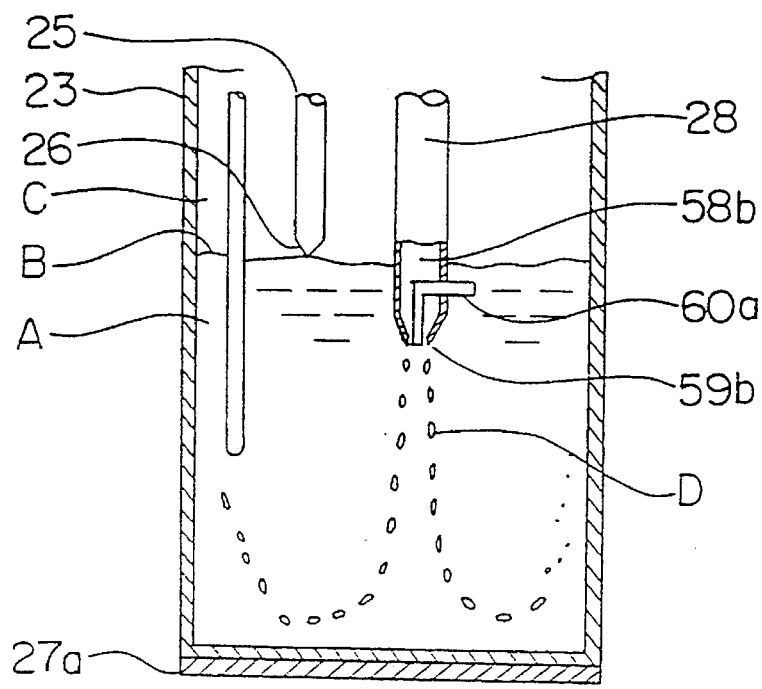
FIG. 24 is a vertical cross sectional view which illustrates the lower portion of a liquid vaporizing apparatus according to a twenty-second embodiment of the present invention.

FIG. 24 is a vertical cross section which illustrates a twenty-second embodiment of the present invention. In this embodiment, a nozzle 58b similar to the nozzle 58a shown in FIG. 22 is disposed at the leading portion of the bubbling tube 28 so that its leading portion 59b is positioned downwards in the TEOS liquid A adjacent to the liquid surface B in the container 23. In this embodiment, the nitrogen gas is downwards blown from the nozzle leading portion 59b so that bubbles D move downwards in the TEOS liquid A in the container 23. When the movement energy is lost, the bubbles D rise in the liquid. As a result, the distance and the time in which the bubbles D pass through the TEOS liquid A can be lengthened, causing the vaporization to be brought closer to the saturation level. Therefore, the quantity of the vapor can be stabilized.

Similarly to the nozzle 58a shown in FIG. 22, an L-shape pipe 60a disposed in the nozzle 58b so that an end of the pipe 60a is disposed in the tapered leading portion 59b of the nozzle 58b and another end is made to penetrate the side wall of the nozzle 58b and injected into the TEOS liquid A to enable substantially the same operations and effects as those obtainable from the pipe 60 shown in FIG. 22 to be obtained.

Figure 25:
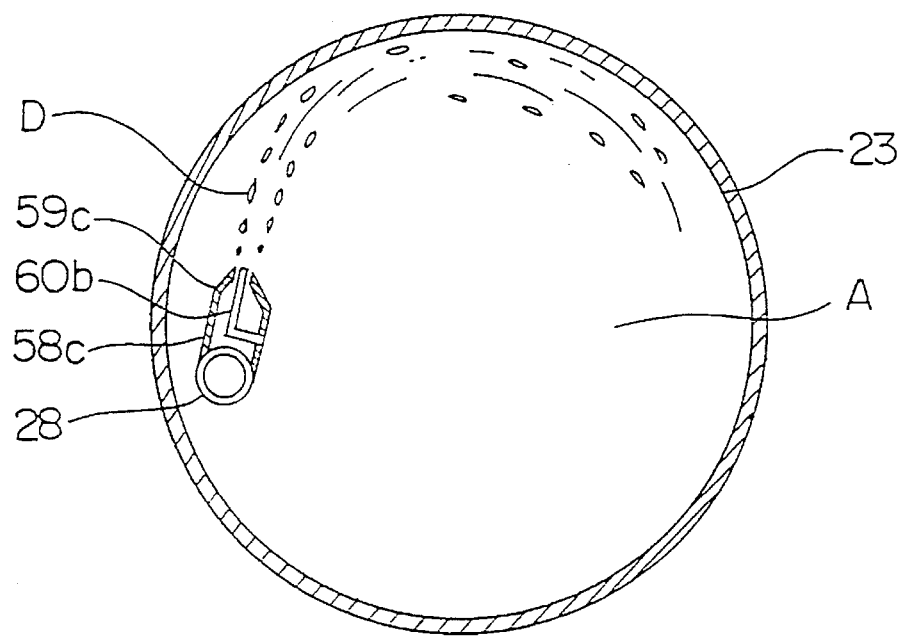
FIG. 25 is a horizontal cross sectional view which illustrates the lower portion of a liquid vaporizing apparatus according to a twenty-third embodiment of the present invention.

FIG. 25 is a lateral cross sectional view which illustrates a twenty-third embodiment of the present invention. In this embodiment, similarly to the nozzle 58b shown in FIG. 24, a nozzle 58c including an L-shape pipe 60b is disposed on the bottom surface of the container 23 adjacent to the side wall of the same so that its leading portion 59c substantially faces the horizontal direction toward the tangent direction of the side wall of the container 23. When the nitrogen gas is blown in the horizontal direction from the nozzle leading portion 59c, eddy flows are generated in the TEOS liquid A in the container 23. The generated bubbles D are brought by the eddy flows and raised spirally in the TEOS liquid A in the container 23. As a result, the distance and the time in which the bubbles D pass through the TEOS liquid A can be lengthened, causing the vaporization to be brought closer to the saturation level. Therefore, the quantity of the vapor can be stabilized.

Figure 26:
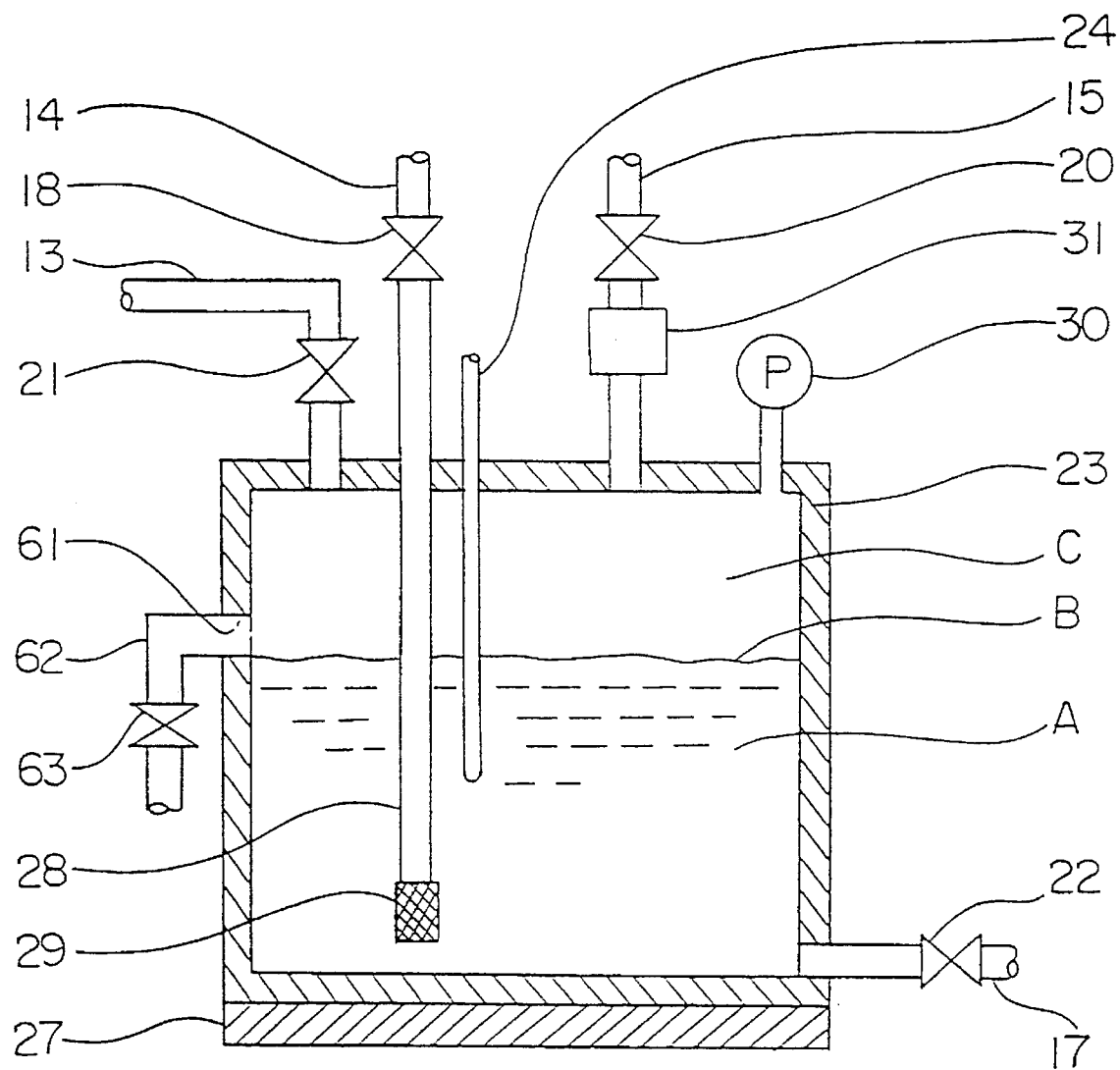
FIG. 26 is a vertical cross sectional view which illustrates the structure of a liquid vaporizing apparatus according to a twenty-fourth embodiment of the present invention.

FIG. 26 illustrates a twenty-fourth embodiment of the present invention. In this embodiment, the liquid-surface sensor 25 is omitted, but a liquid-discharge port 61 is formed in the side wall of the container 23. An overflow pipe 62 having a valve 63 is connected to the liquid-discharge port 61. The residual structures of this embodiment are substantially the same as the conventional example shown in FIG. 52 except that the heater 27a is provided for the bottom surface of the container 23.

Referring to FIG. 26, the evaporating operation of this embodiment will now be described. The evaporating operation is performed similarly to the conventional example shown in FIG. 52 so that the valves 18 and 20 are opened and the nitrogen gas is blown into the TEOS liquid A from the bubbling tube 28 to perform bubbling. The evaporated TEOS gas and the nitrogen gas are discharged from the gas discharge pipe 15.

As the vaporization of the TEOS gas proceeds causing the liquid surface B to be lowered, the film growth speed is lowered. Therefore, the evaporating operation is stopped before lowering exceeds the allowable range, and the valve 63 and the valve 21 are opened to supply the TEOS liquid A through the liquid-supply pipe 13 to the container 23.

When the liquid surface B in the container 23 is, at this time, raised and allowed to exceed the position of the liquid-discharge port 61, the TEOS liquid A flows from the liquid-discharge port 61 through the overflow pipe 62. Therefore, closing of the valve 63 after the valve 21 has been closed at the time of stopping the supply of the TEOS liquid A into the container 23 enables the position of the liquid surface B to be made constant at the liquid-discharge port 61. Therefore, the change in the generated vaporized gas occurring due to the change in the liquid surface taking place at the time of supplying the TEOS liquid A can be prevented.

Figure 27:
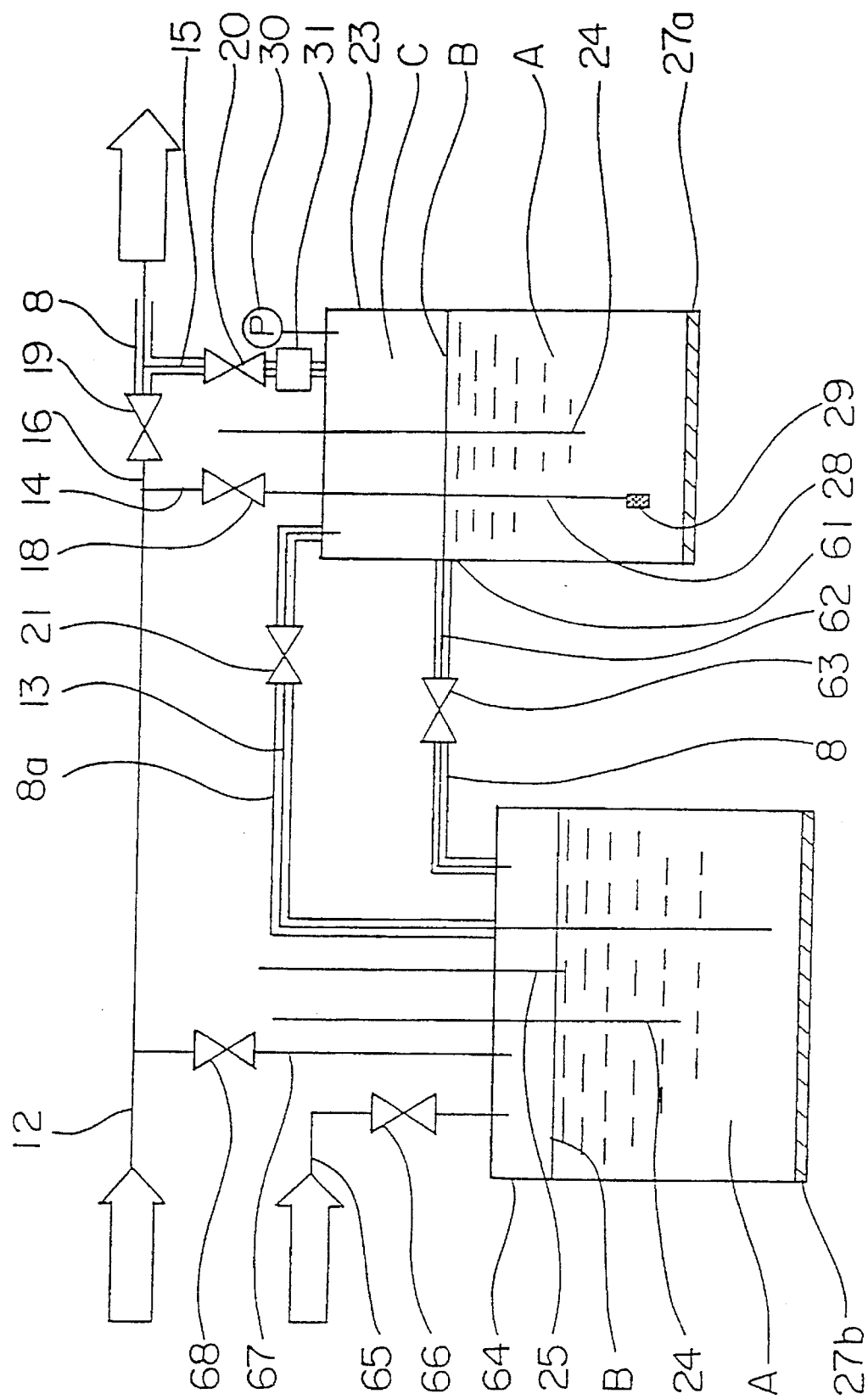
FIG. 27 is a vertical cross sectional view which illustrates the structure of a liquid vaporizing apparatus and another container according to a twenty-fifth embodiment of the present invention.

FIG. 27 illustrates a twenty-fifth embodiment of the present invention. In this embodiment, a reservoir tank 64 is disposed below the container 23 serving as the vaporizer shown in FIG. 26. The reservoir tank 64 is, by the liquid-supply pipe 13 having the valve 21 and a pipe-heating heater 8a and by the overflow pipe 62 having a valve 63 and a pipe-heating heater 8b, connected to the container 23. On the top surface of the reservoir tank 64, the temperature sensor 24 and the liquid-surface sensor 25 similar to those of the foregoing conventional example shown in FIG. 52 are disposed so that their lower ends are injected into the TEOS liquid A in the reservoir tank 64. Further, a liquid-supply pipe 67 having a valve 66 at an intermediate position thereof and a pressure-conduction pipe 67 branched from the nitrogen-gas supply pipe 12 and having a valve 68 at an intermediate position thereof are respectively connected to the top surface of the reservoir tank 64. Further, a heater 27b similar to the heater 27a disposed on the bottom surface of the container 23 is attached to the bottom surface of the reservoir tank 64.

The bubbling tube 28 provided for the container 23 is connected to the nitrogen-gas supply pipe 12 through the valve 18 and the gas introduction pipe 14. The gas ejection pipe 15 for guiding the vaporized gas in the internal space C in the container 23 into the reaction chamber (omitted from illustration) is, through the bypass pipe 16 having the valve 19 at an intermediate position thereof, connected to the nitrogen-gas supply pipe 12. The gas ejection pipe 15 has the valve 20 and the pressure adjuster 31.

Referring to FIG. 27, the operation of supplying the TEOS liquid A to the container 23 will now be described. First, the valve 65 is opened to supply the TEOS liquid A from the liquid-supply pipe 65 into the reservoir tank 64. When the liquid surface B of the TEOS liquid A reaches the lower end position of the liquid-surface sensor 25, the valve 65 is closed. The heater 27b is activated to heat and maintain the TEOS liquid A in the reservoir tank 64 at the same temperature as the TEOS liquid A in the container 23.

Then, the valves 20, 21 and 68 are opened so that the TEOS liquid A in the reservoir tank 64 is, under pressure, sent to the container 23 through the liquid-supply pipe 13 by the nitrogen gas supplied from the pressure-conduction pipe 67. The supply is continued until the liquid surface B exceeds the position of the liquid-discharge port 61 in the container 23. Then, the valves 20 and 68 are closed and the valve 63 is opened so that the TEOS liquid A exceeding the position of the liquid-discharge port 61 flows through the overflow pipe 62 into the reservoir tank 64. Thus, the liquid surface B in the container 23 can be made to be a constant height accurately at the position of the liquid-discharge port 61. As a result, the quantity of the vaporized gas generated due to the vaporization of the TEOS liquid A in the container 23 can be made to be a constant quantity. Further, the TEOS liquid A flows from the container 23 flows through the overflow pipe 62 heated to an adequate temperature level and returns to the reservoir tank 64 so that the temperature is not lowered and that it is again used, resulting in waste prevention.

Since the vaporization performed in the container 23 decreases the TEOS liquid A causing the liquid surface B in the reservoir tank 64 to be lowered, the liquid-surface sensor 25 detects the liquid surface B to adequately supply the TEOS liquid A from the liquid-supply pipe 67 into the reservoir tank 64 by opening/closing the valve 66. The foregoing liquid supply is not required to be performed frequently and the necessity of accurately adjusting the liquid surface B can be eliminated.

Figure 28:
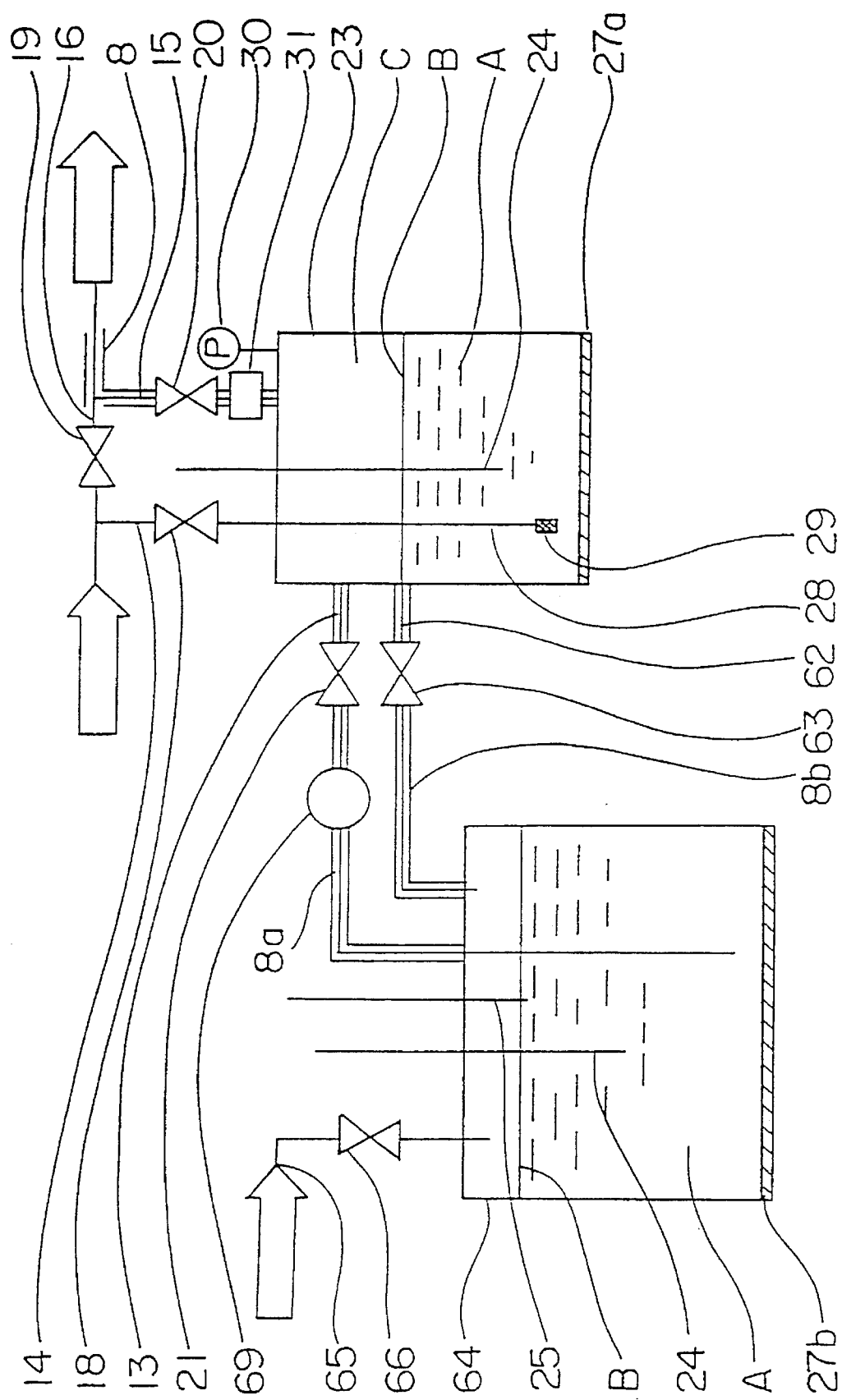
FIG. 28 is a vertical cross sectional view which illustrates the structure of a liquid vaporizing apparatus and another container according to a twenty-sixth embodiment of the present invention.

FIG. 28 illustrates a twenty-sixth embodiment of the present invention. In this embodiment, the pressure-conduction pipe 67 is provided for the reservoir tank 64 according to the embodiment shown in FIG. 28. As an alternative to this, a pump 69 is disposed at an intermediate position of the liquid-supply pipe 13. In place of the pressure supply of the TEOS liquid A with the nitrogen gas, the TEOS liquid A can be sent to the container 23 by the pump 69. Therefore, the liquid surface can be maintained at a constant level by the operation of the pump 69 even during the vaporizing operation. Further, the quantity of the vaporized gas can be made to be a constant quantity.

Figure 29:
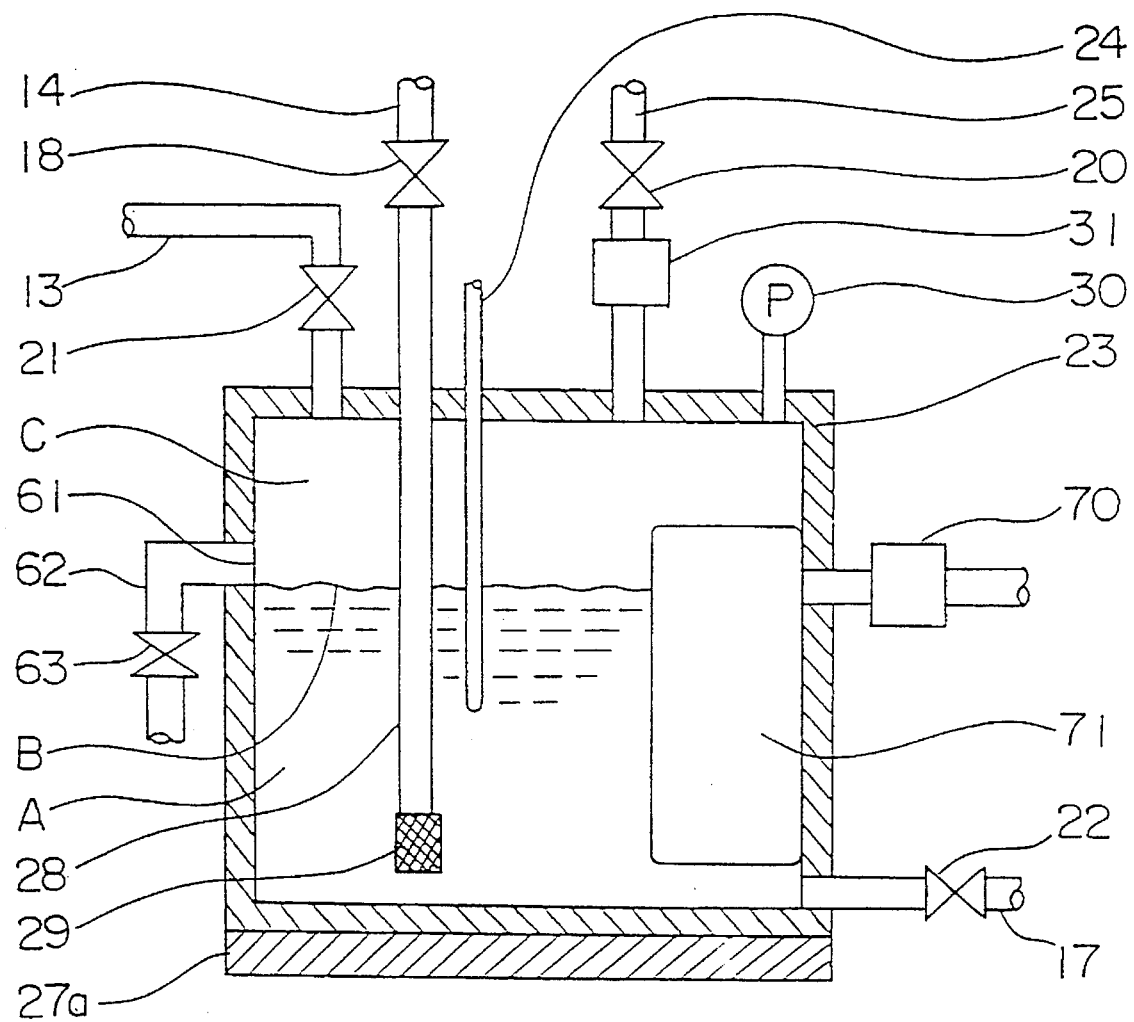
FIG. 29 is a vertical cross sectional view which illustrates the structure of a liquid vaporizing apparatus according to a twenty-seventh embodiment of the present invention.

FIG. 29 illustrates a twenty-seventh embodiment of the present invention. In this embodiment, a variable-capacity small container 71 capable of supplying gas from the outside portion of the container 23 through a pressure valve 70 is disposed below the liquid surface B in the container 23. The gas is supplied to the small container 71 to enlarge its capacity so as to raise the liquid surface B in order to flow the TEOS liquid A over the liquid-discharge port 61. As a result, the liquid surface can be maintained at a constant level even during the vaporizing operation. In addition, the number of supplying operations required for the TEOS liquid A to the container 23 can be decreased.

When the TEOS liquid A is supplied into the container 23, the gas in the small container 71 is ejected by the pressure valve 70 to reduce the capacity in a state where the vaporization is not being performed. Then, the TEOS liquid A is supplied to flow over the liquid-discharge port 61. The residual structures and operations of this embodiment are the same as those of the embodiment shown in FIG. 26.

Figure 30:
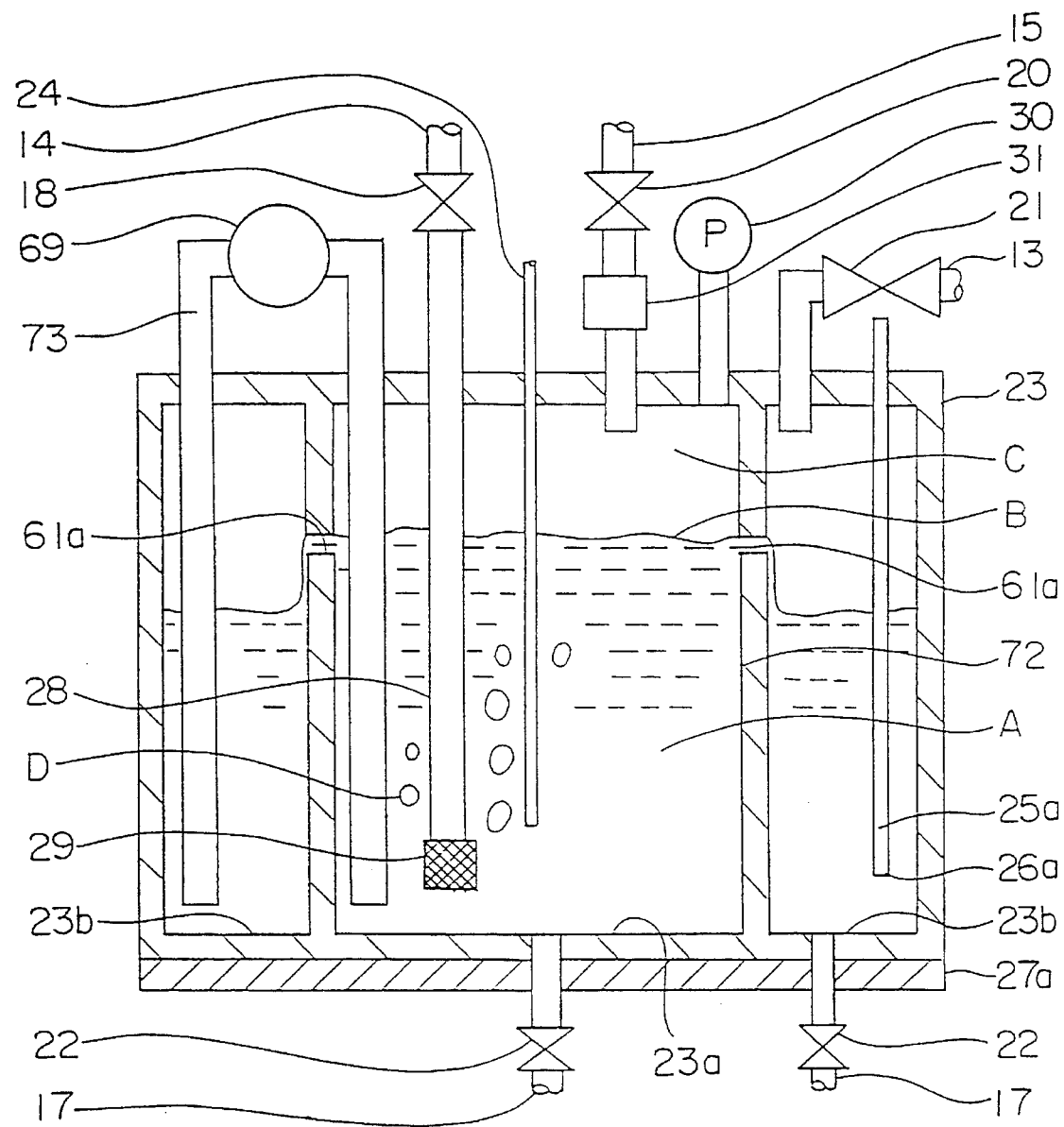
FIG. 30 is a vertical cross sectional view which illustrates the structure of a liquid vaporizing apparatus according to a twenty-eighth embodiment of the present invention.

FIG. 30 illustrates a twenty-eighth embodiment of the present invention. Referring to the foregoing figure, the hollow and cylindrical container 23 includes an annular insulating wall 72 having, in the upper portion thereof, a plurality of liquid-discharge ports 61a. The insulating wall 72 sections the container 23 into a cylindrical inner chamber 23a and an annular outer chamber 23b disposed on the outside of the inner chamber 23a. The cylindrical inner chamber 23a has an upper wall on which are disposed: the bubbling tube 28 having the mesh at the leading portion thereof; the temperature sensor 24; the gas ejection pipe 15 having the valve 20 and the pressure adjuster; and the pressure gauge 30. An end of the liquid-supply pipe 63 having the valve 63 is connected to the upper wall of the annular outer chamber 23b. Further, a liquid-surface sensor 25a having, at the leading portion thereof, a liquid-surface detection portion 26a for detecting the lower limit of the liquid surface B of the TEOS liquid A in the outer chamber 23b is fastened to the foregoing upper wall. The plural liquid-discharge ports 61a formed in the upper portion of the annular insulating wall 72 are disposed at a predetermined height from the bottom surface of the container 23 while being disposed apart from one another in the circumferential direction. The inner chamber 23a and the outer chamber 23b are communicated with each other by a U-shape liquid circulating pipe 73. Further, the pump 69 is connected to a portion of the U-shape liquid circulating pipe 73 that extends outwards from the top surface of the container 23.

Referring to FIG. 30, the evaporating operation of this embodiment will now be described. Prior to commencing the vaporization, the inner chamber 23a having the bubbling tube 28 in the container 23 is filled with the TEOS liquid A to the height of the liquid-discharge ports 61a formed in the insulating wall 72. On the other hand, the outer chamber 23b having the liquid-surface sensor 25 is filled with the TEOS liquid A to a position lower than the height of the liquid-discharge ports 61.

Figure 57:
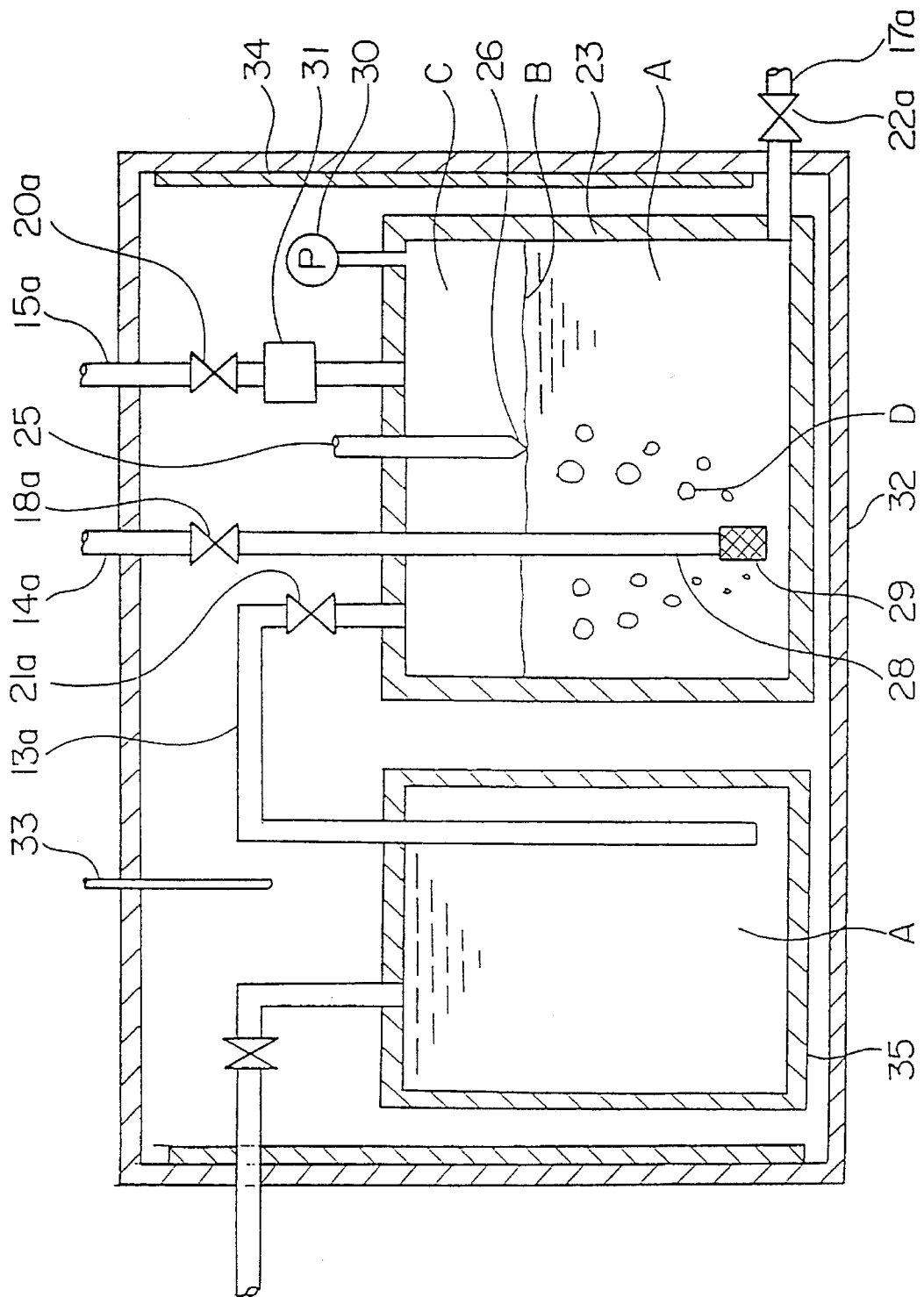
FIG. 57 is a vertical cross sectional view which illustrates the structure of a conventional liquid vaporizing apparatus and a reservoir tank.
Figure 58:
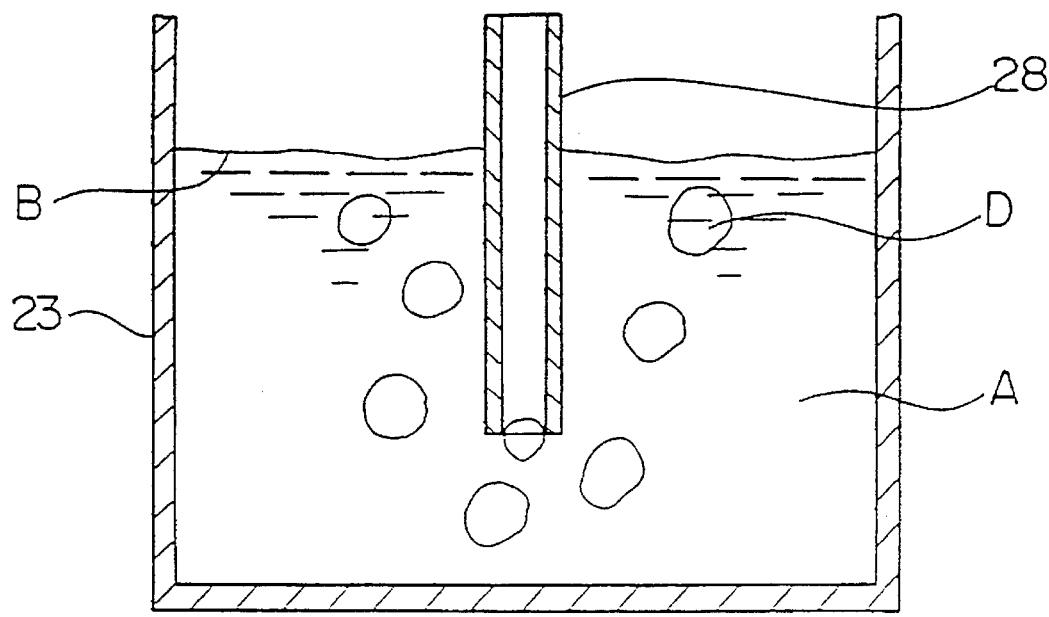
FIG. 58 is a vertical cross sectional view which illustrates the structure of a lower portion of a conventional liquid vaporizing apparatus and a state of vaporization realized by bubbling.

The vaporizing operation is performed similarly to the foregoing conventional example shown in FIG. 57 so that the nitrogen gas from the bubbling tube 28 is bubbled in the TEOS liquid A. During the vaporizing operation, the pump 69 is operated to flow the TEOS liquid A from the outer chamber 23b to the inner chamber 23a through the liquid circulation pipe 73 so that the overflowing TEOS liquid A always flows, through the liquid-discharge ports 61a, from the inner chamber 23a, in which bubbling is being performed, to the outer chamber 23b, in which bubbling is not performed. As a result, the height of the liquid surface B in the inner chamber in which bubbling is being performed can be made to be always constant at the position of the liquid-discharge ports 61a. Therefore, only one vaporizer container having no reservoir tank 64 according to the foregoing embodiment shown in FIG. 28 is able to make constant the liquid surface. Further, the quantity of the vaporized gas can be made to be a constant quantity.

When the vaporization further proceeds, the TEOS liquid A in the container 23 decreases, causing the liquid surface B in the outer chamber 23b to be lowered. Therefore, the liquid-surface sensor 25 detects the liquid surface B to open the valves 20 and 21 when bubbling is not performed so as to supply the TEOS liquid A from the liquid-supply pipe 13 to the outer chamber 23b. The quantity of the supply at this time makes the height of the liquid surface B in the outer chamber 23b not exceed the position of the liquid-discharge ports 61a. The height of the liquid surface B is not required to have excellent accuracy.

Figure 31:
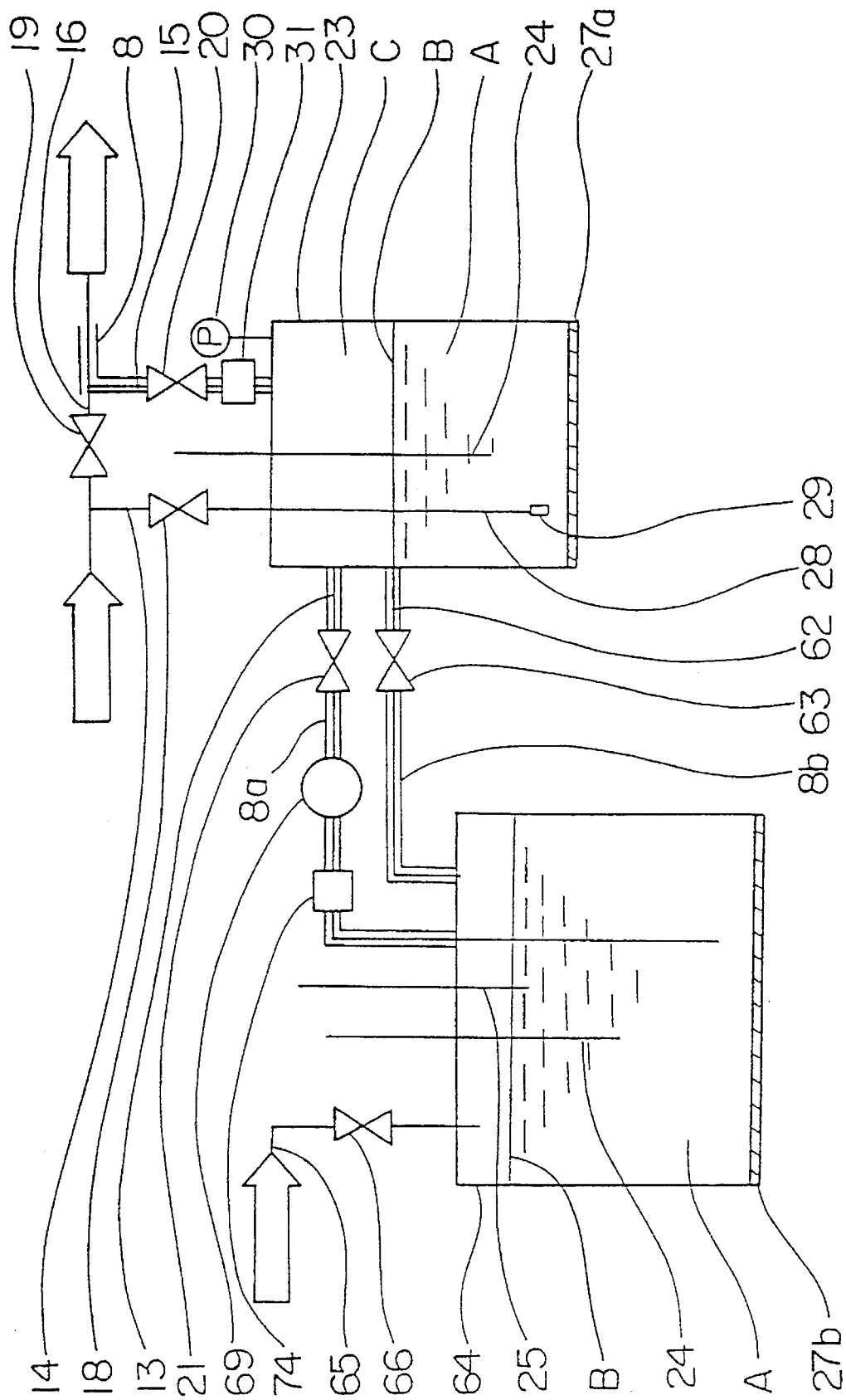
FIG. 31 is a vertical cross sectional view which illustrates the structure of a liquid vaporizing apparatus and another container according to a twenty-ninth embodiment of the present invention.

FIG. 31 illustrates a twenty-ninth embodiment of the present invention in which a filter 74 is provided for the liquid-supply pipe 13 shown in FIG. 28 so that impurities generated due to the denaturalization of the TEOS in the circulating TEOS liquid A are removed. The residual structures and operations of this embodiment are the same as those of the embodiment shown in FIG. 28.

Figure 32:
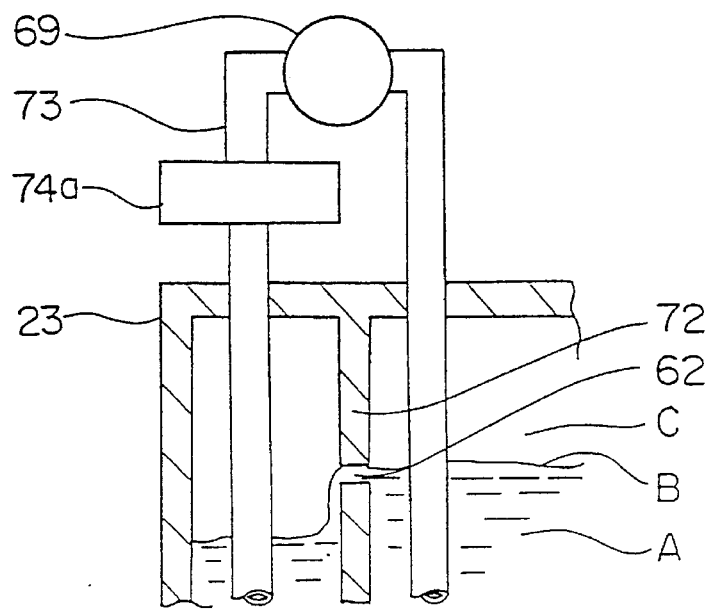
FIG. 32 is a vertical cross sectional view which illustrates the upper portion of a liquid vaporizing apparatus according to a thirtieth embodiment of the present invention.

As employed in a thirtieth embodiment of the present invention shown in FIG. 32, a filter 74a provided for the liquid-circulating pipe 73 shown in FIG. 30 enables impurities generated due to denaturing of the TEOS in the circulating TEOS liquid A to be removed.

Figure 33:
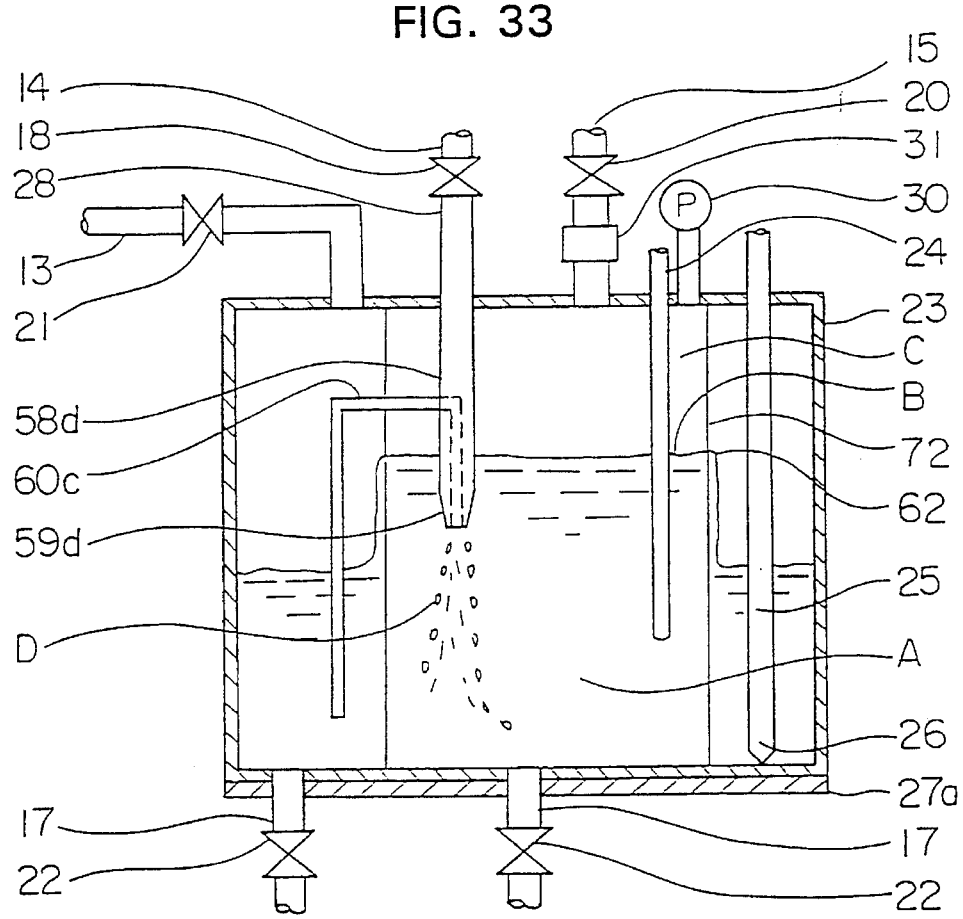
FIG. 33 is a vertical cross sectional view which illustrates the structure of a liquid vaporizing apparatus according to a thirty-first embodiment of the present invention.

FIG. 33 illustrates a thirty-first embodiment of the present invention. In this embodiment, a nozzle 58d having the tapered leading portion 59d as shown in FIG. 24 and including a U-shape pipe 60c is disposed in place of the mesh 29 shown in FIG. 30. Another end of the pipe 60c is disposed below the outer chamber 23b to serve in place of the liquid-circulating pipe 73. As a result of the foregoing structure, bubbling performed by the bubbling tube 28 similarly to the embodiment shown in FIG. 24 causes the TEOS liquid A to flow from the outer chamber 23b to the inner chamber 23a through the pipe 60c. Therefore, the liquid surface can be made to be a constant level without use of the pump 69 shown in FIG. 30. Therefore, the quantity of the vaporized gas can be a constant quantity.

Figure 34:
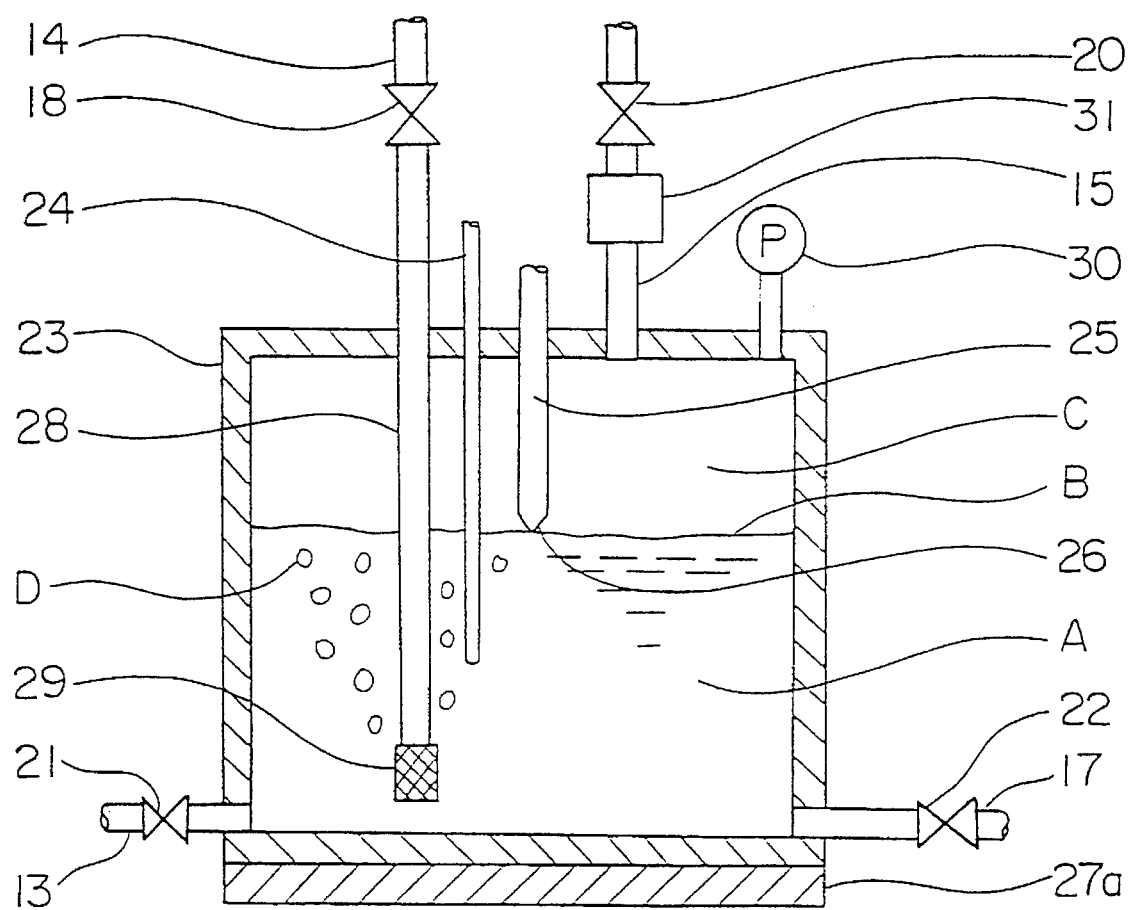
FIG. 34 is a vertical cross sectional view which illustrates the structure of a liquid vaporizing apparatus according to a thirty-second embodiment of the present invention.

FIG. 34 illustrates a thirty-second embodiment of the present invention. In this embodiment, the liquid-supply pipe 13 having the valve 21 is connected to the lower portion of the side wall of the container 23. The residual structures are the same as those of the embodiment shown in FIG. 1 except that the projections 39 are provided on the bottom surface of the container 23.

In the embodiment shown in FIG. 34, when the TEOS liquid A is supplied from the liquid-supply pipe 13 to the container 23, the supply position is below the liquid surface B. Therefore, the change in the liquid surface due to drops of the TEOS liquid A from the liquid-supply pipe 13 into the container 23 and resulting change in the quantity of the vapor can be prevented, the foregoing changes being problems experienced with the conventional example shown in FIG. 52.

Figure 35:
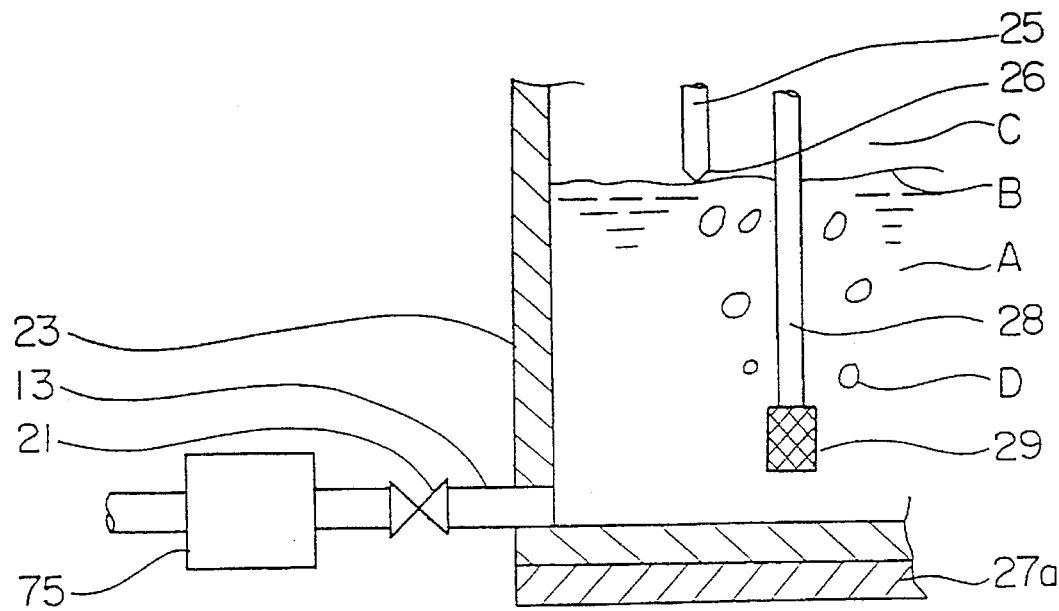
FIG. 35 is a vertical cross sectional view which illustrates the lower portion of a liquid vaporizing apparatus according to a thirty-third embodiment of the present invention.

FIG. 35 illustrates a thirty-third embodiment of the present invention. Referring to the foregoing figure, the liquid-supply pipe 13 having the valve 21 is, similarly to that according to the foregoing embodiment shown in FIG. 34, disposed in the lower portion of the side wall of the container 23. The liquid-supply pipe 13 has a flow-rate adjuster 75 for adjusting the flow rate of the TEOS liquid A.

In the embodiment shown in FIG. 35, the valve 21 is opened even during the evaporating operation so that the TEOS liquid A is, in a predetermined quantity, supplied from the liquid-supply pipe 13 to the container 23. By adjusting the flow rate to be supplied at this time to the quantity of the TEOS liquid A in the container 23 that is reduced due to the vaporization, the height of the liquid surface B can be made to be a constant height. Therefore, lowering of the liquid surface B and the resulting reduction in the quantity of the vapor can be prevented, and therefore, the quantity of the vapor can be made to be a constant quantity.

Figure 36:
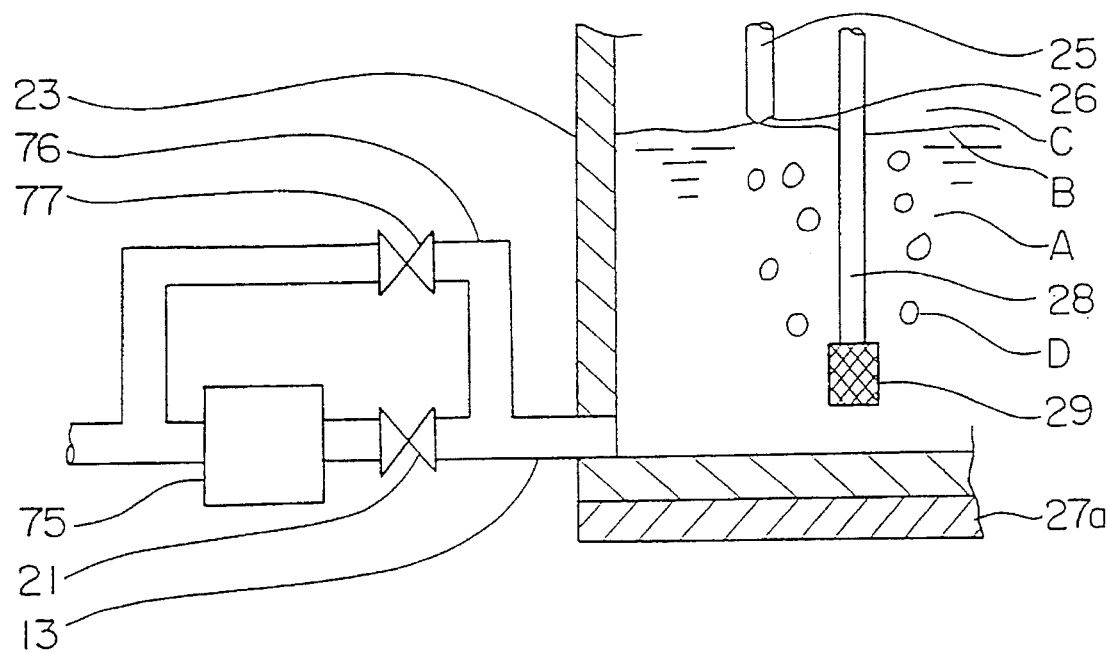
FIG. 36 is a vertical cross sectional view which illustrates the lower portion of a liquid vaporizing apparatus according to a thirty-fourth embodiment of the present invention.

A thirty-fourth embodiment shown in FIG. 36 comprises a bypass pipe 76 having a valve 77 so connected to the liquid-supply pipe 13 shown in FIG. 35 that the bypass pipe 76 bypasses the flow-rate adjuster 75 and the valve 21. The foregoing structure is provided for use in a case where the accuracy in the flow rate realized by the flow-rate adjuster 75 is unsatisfactory to adjust the quantity of the TEOS liquid A to a quantity reduced from the container 23.

Figure 37:
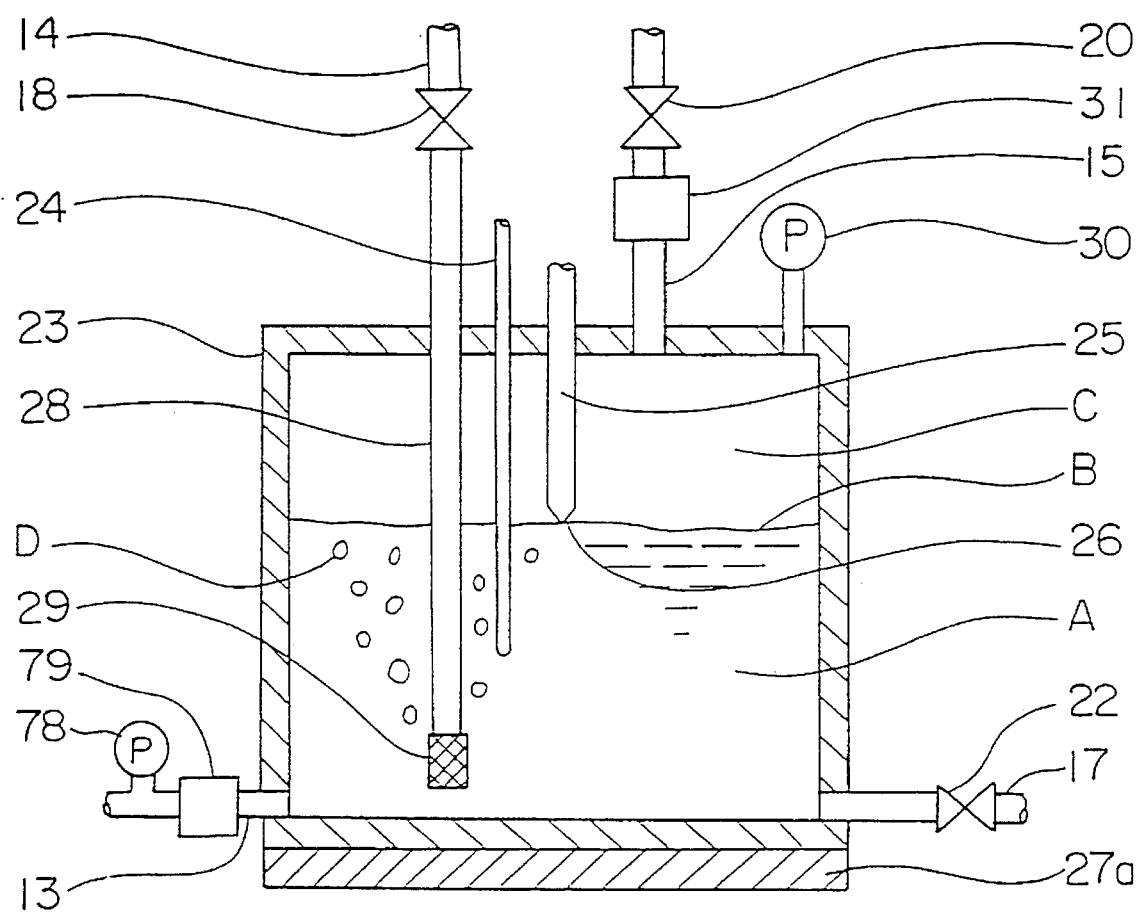
FIG. 37 is a vertical cross sectional view which illustrates the structure of a liquid vaporizing apparatus according to a thirty-fifth embodiment of the present invention.

In the embodiment shown in FIG. 37, the flow rate of the TEOS liquid A realized by the flow-rate adjuster 75 is set to a quantity which is smaller than the reduction quantity of the TEOS liquid A from the container 23 due to the actual vaporization. If the vaporization is performed, the liquid surface B in the container 23 is gradually lowered. Therefore, when the liquid surface is lowered to a predetermined height, the vaporization is stopped and the TEOS liquid A is supplied to the position of the liquid-surface detection portion 26 at the leading portion of the liquid-surface sensor 25.

Since a long time is taken to supply the TEOS liquid A through the flow-rate adjuster 75 set to the foregoing flow rate, the valve 21 is closed and the valve 77 is opened to supply it through the bypass pipe 75. Thus, the liquid supply can be completed in a shorter time. When the TEOS liquid A reaches the position of the liquid-surface detection portion 26 at the leading portion of the liquid-surface sensor 25, the valve 77 is closed and the valve 21 is again opened.

FIG. 37 illustrates a thirty-fifth embodiment of the present invention. In this embodiment, the liquid-supply pipe 13 is, similarly to the embodiment shown in FIG. 35, disposed in the lower portion of the side wall of the container 23. The liquid-supply pipe 28 comprises: a pressure gauge 78 for measuring the pressure of the TEOS liquid A flowing through the liquid-supply pipe 28; and a pressure adjuster 79 for adjusting the supply pressure of the TEOS liquid A on the basis of the measured pressure. The valve 21 employed in the embodiment shown in FIG. 35 is omitted.

In the embodiment shown in FIG. 37, the TEOS liquid A is adjusted by the pressure adjuster 79 to have a predetermined pressure when it is supplied from the liquid-supply pipe 13 into the container 23. Since the pressure of the internal space C on the liquid surface B in the container 23 is, at this time, maintained at a constant level by the pressure adjuster 31 provided for the gas ejection pipe 15, the liquid surface B is made to be constant at a position at which the pressure of the TEOS liquid A and than of the internal space C in the container 23 are balanced. Therefore, the pressure adjusters 31 and 79 adjust the pressure of the TEOS liquid A and that of the internal space C in the container 23 respectively so that the liquid surface B can be maintained at a predetermined level. Therefore, the problem experienced with the conventional technology that the liquid surface is lowered and resulting reduction in the quantity of the vapor can be prevented.

Figure 38:
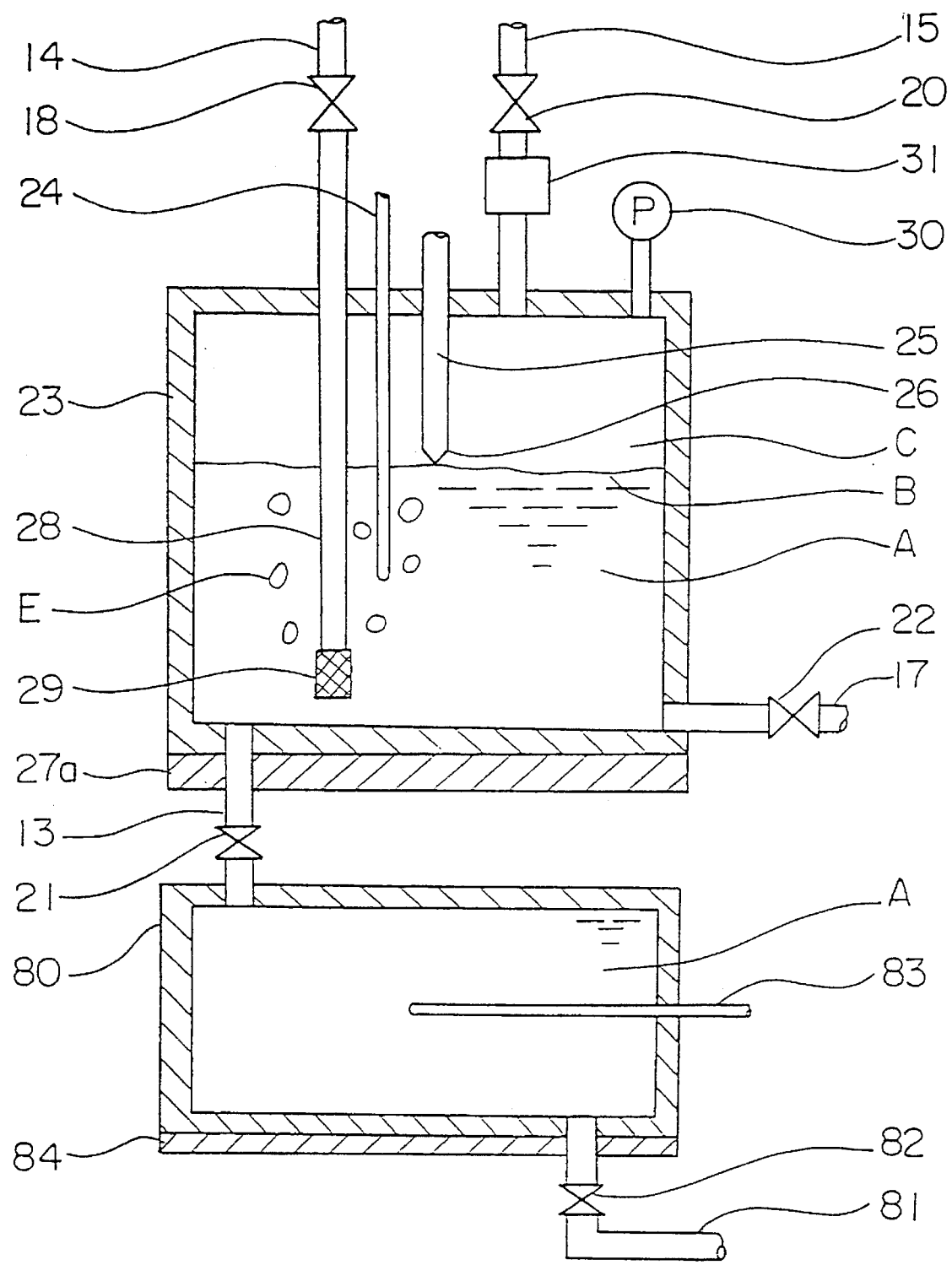
FIG. 38 is a vertical cross sectional view which illustrates the structure of a liquid vaporizing apparatus and a liquid-supply tank according to a thirty-sixth embodiment of the present invention.

FIG. 38 illustrates a thirty-sixth embodiment of the present invention. Referring to FIG. 38, units provided for the container 23 are disposed identically to those of the embodiment shown in FIG. 34. A liquid-supply tank 80 is disposed below the container 23. The liquid-supply pipe 13, which has an end penetrating the bottom wall of the container 23 to communicate with the inside portion of the container 23 and which is provided with the valve 21, is connected to the upper portion of the liquid-supply tank 23 at another end thereof. A supply pipe 81, which has an end communicated with a unit (omitted from illustration) for supplying the TEOS liquid A and which is provided with a valve 82, is connected to the bottom portion of the liquid-supply tank 80 at another end thereof. Further, a temperature sensor 83 for detecting the temperature of the TEOS liquid A in the liquid-supply tank 80 is attached to the side wall of the liquid-supply tank 80. A heater 84 for raising the temperature of the TEOS liquid A in the liquid-supply tank 80 to a predetermined level by using the temperature detected by the temperature sensor 83 is disposed on the outer surface of the bottom wall of the liquid-supply tank 80.

Then, referring to FIG. 39, the operation for supplying the TEOS liquid A to the container 23 will now be described. In a state where both container 23 and the liquid-supply tank 80 are not filled with the TEOS liquid A, the valves 20, 21 and 82 are, first, opened to inject the TEOS liquid A into the liquid-supply tank 80 through the supply pipe 81 by means of a liquid-supply unit (omitted from illustration). Further, it is injected to the leading portion 26 of the liquid-surface sensor 25 in the container 23 through the liquid-supply pipe 13, and then the valves 20, 21 and 82 are closed. Then, the TEOS liquid A in the container 23 and that in the liquid-supply tank 80 are heated and maintained at the same temperature by the corresponding heaters 27a and 84.

To supply the TEOS liquid A into the container 23 after the vaporization has been performed, the valves 20, 21 and 82 are opened to supply the TEOS liquid A from the supply pipe 81 into the liquid-supply tank 80 to wash away the TEOS liquid A heated and maintained by the heater 84 in the liquid-supply tank 80 so as to be supplied into the container 23 through the liquid-supply pipe 13. Since the low-temperature liquid, at this time, washes away the high-temperature liquid from the lower portion to the upper portion in the liquid-supply tank 80, convection cannot easily take place due to the difference in the temperature of the liquid. Therefore, the supply of the TEOS liquid A, the temperature of which has been lowered to a level lower than the heated and maintained level due to the mixture of the low-temperature liquid and the high-temperature liquid, into the container 23 is inhibited. Therefore, the TEOS liquid A, the temperature of which is the same as that of the TEOS liquid A in the container 23, can be supplied to the container 23.

Since the low-temperature TEOS liquid A is, at this time, supplied to the liquid-supply tank 80, the temperature is lowered. However, the temperature of the liquid-supply tank 80 and that of the container 23 are independently controlled by the heaters 84 and 27a, thus resulting in lowering of the temperature of the liquid-supply tank 80 that does not affect the container 23. The liquid-supply tank 80 and the TEOS liquid A in the liquid-supply tank 80, the temperature of each of which has been lowered, are heated and maintained at the original temperature during a period in which the vaporization is performed in the container 23 until the next liquid supply. The capacity of the liquid-supply tank 80 is required to be larger than the quantity of the TEOS liquid A to be supplied to the container 23 in one supplying operation. If the quantity is larger than the foregoing quantity, the change in the temperature of the liquid-supply tank 80 is reduced.

Figure 53:
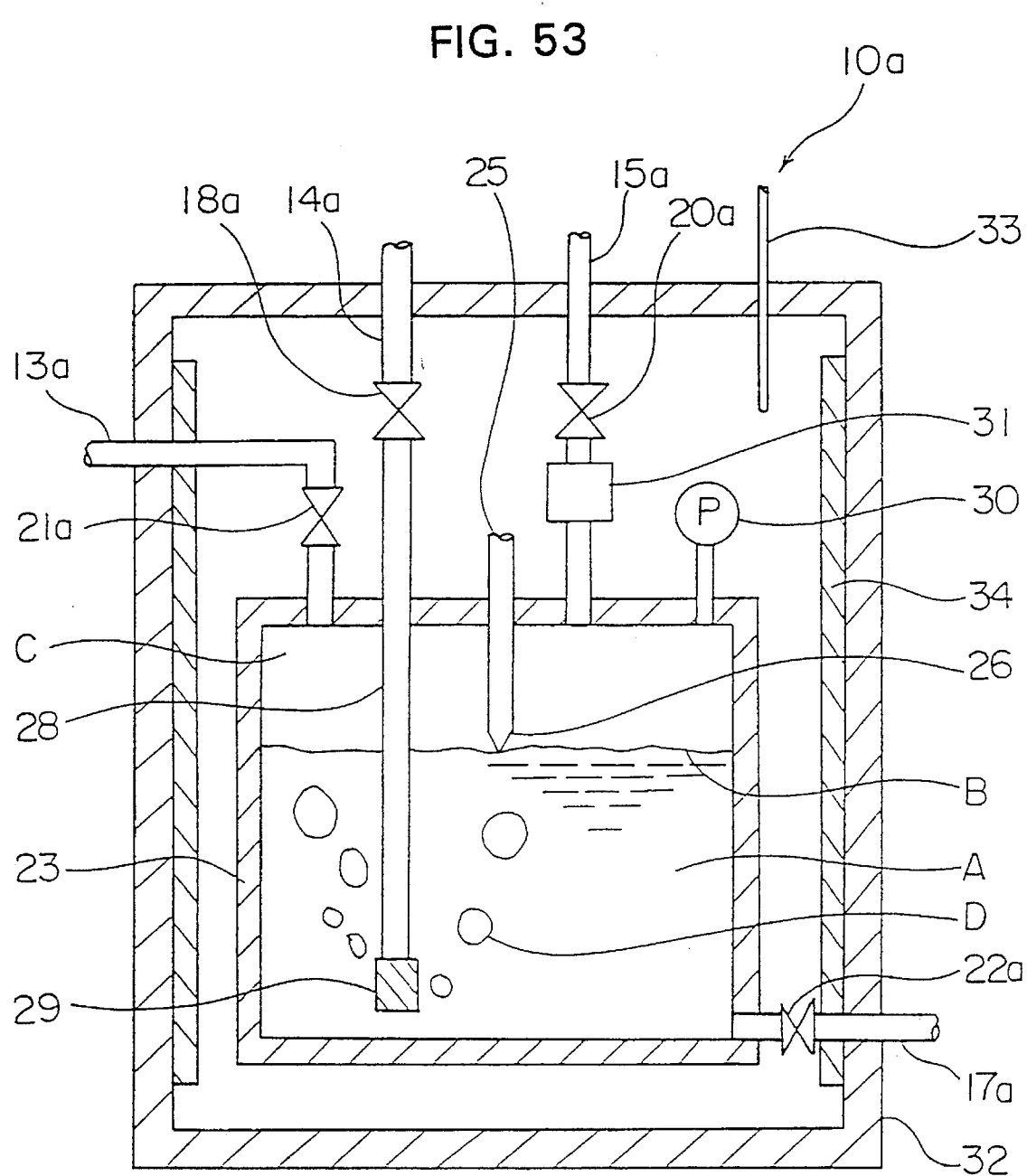
FIG. 53 is a vertical cross sectional view which illustrates the structure of a conventional liquid vaporizing apparatus.
Figure 54:
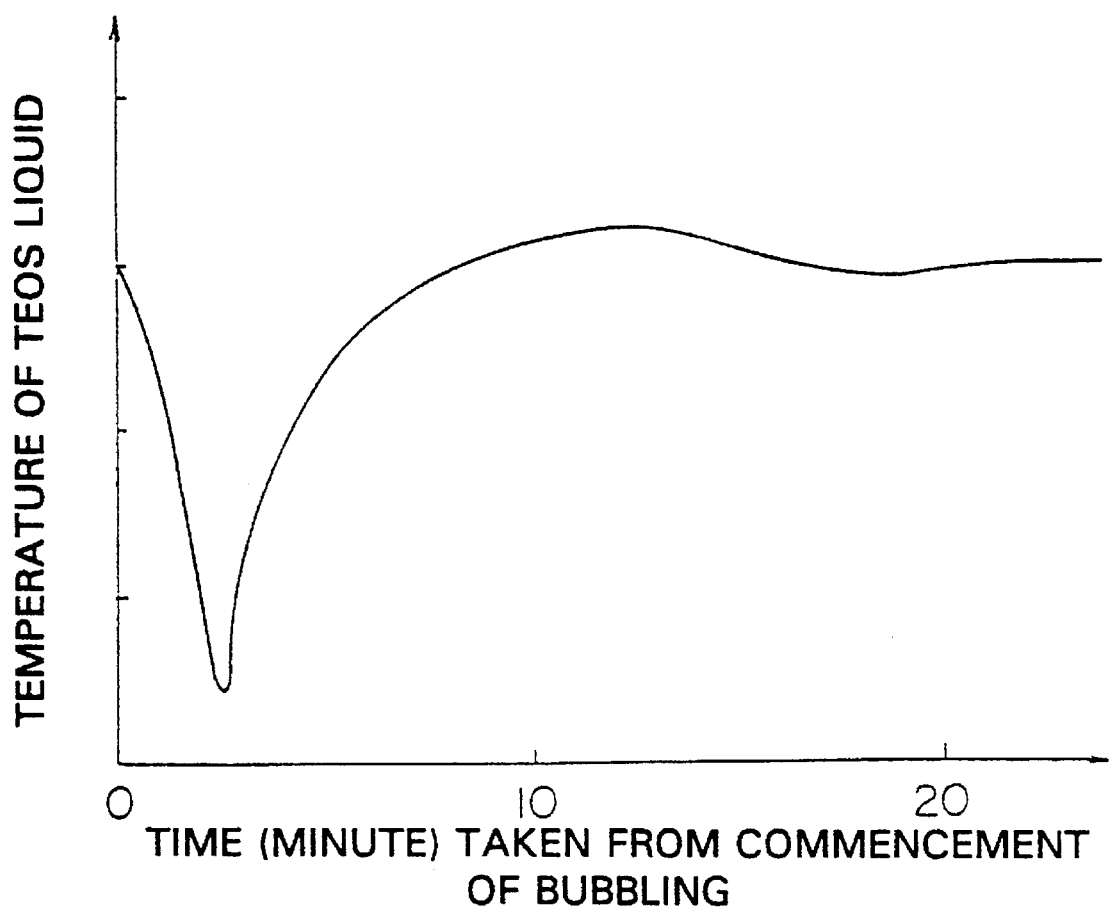
FIG. 54 is a graph showing change in the temperature in the conventional liquid vaporizing apparatus shown in FIG. 52.
Figure 55:
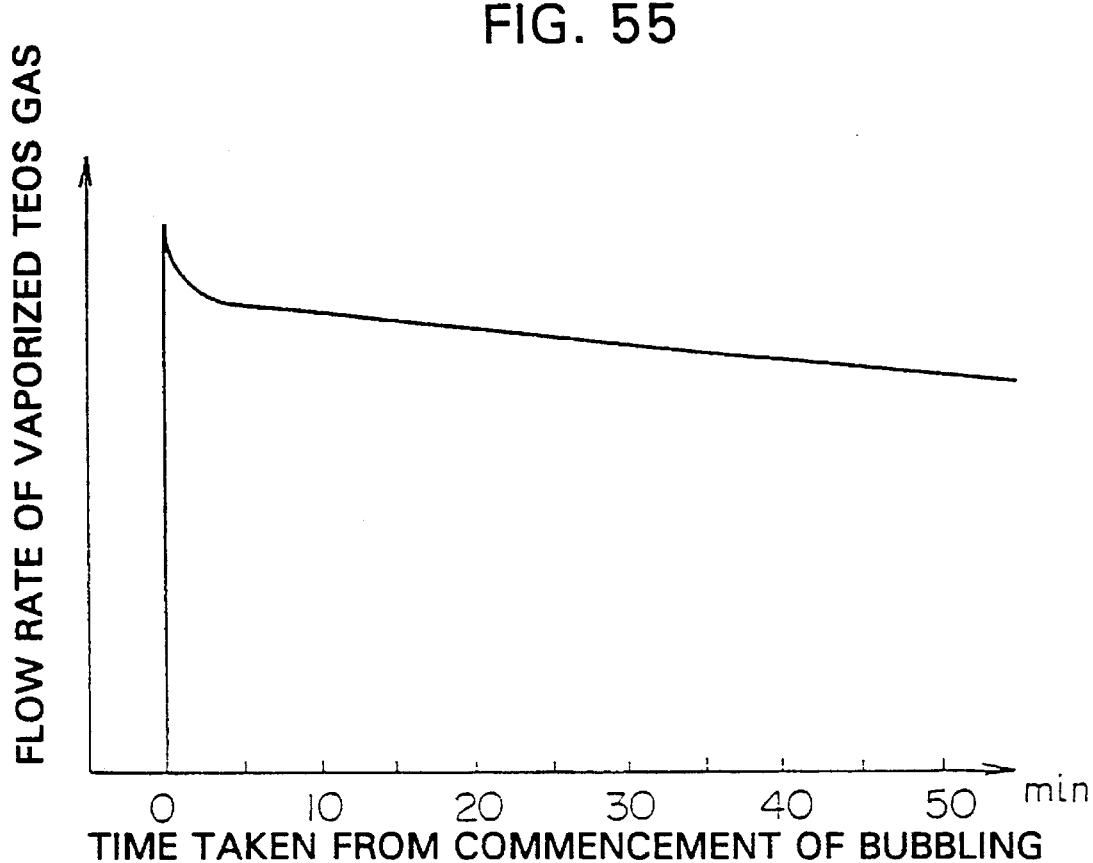
FIG. 55 is a graph showing change in the quantity of vaporized gas generated in the conventional liquid vaporizing apparatus shown in FIG. 52.
Figure 56:
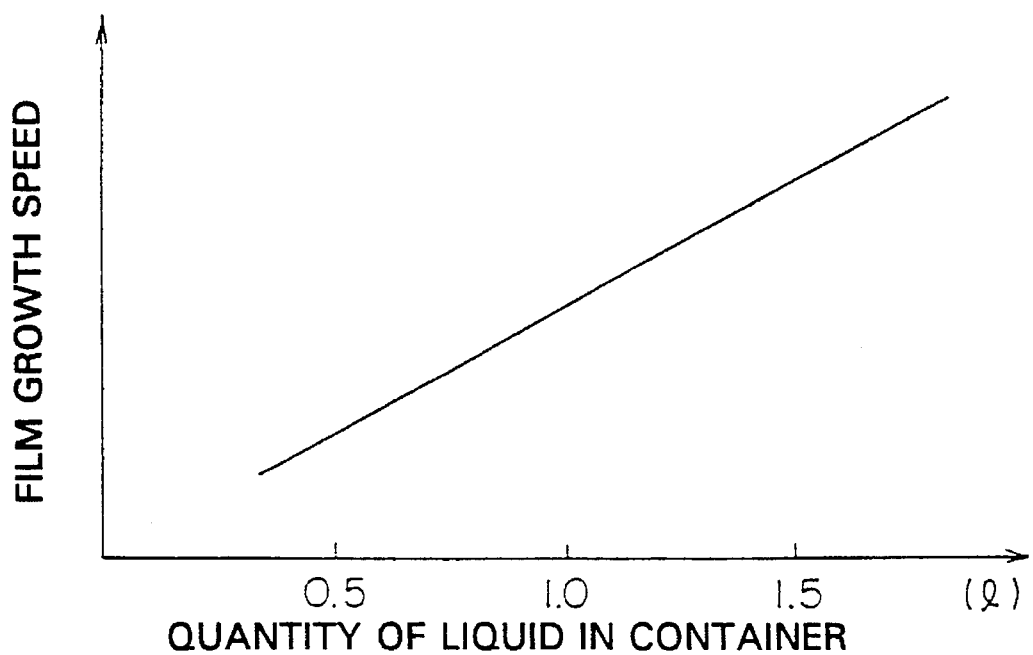
FIG. 56 is a graph showing the relationship between a liquid quantity in a vaporizer and film forming speed in a film forming chamber according to the conventional example shown in FIG. 52.

As a result, the problem experienced with the conventional example shown in FIG. 53 that the change in the temperature of the liquid in the container 23 after the liquid has been supplied can be prevented. Further, the change in the temperature in the container 23 due to the change in the temperature of the reservoir tank 35 can also be prevented. Therefore, the temperature of the vaporizer can be made to be constant, and therefore the change in the quantity of vaporization can be prevented.

Figure 39:
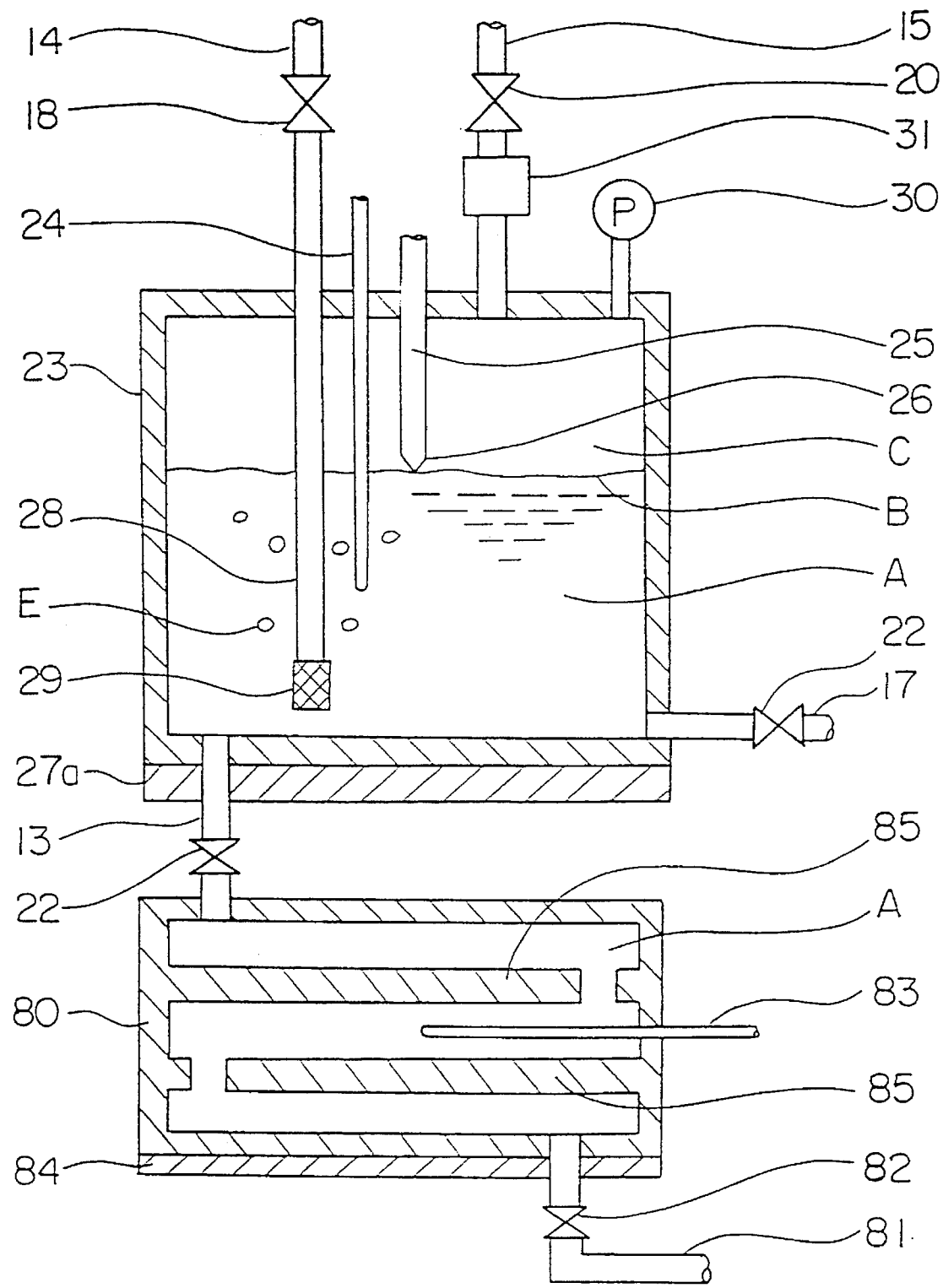
FIG. 39 is a vertical cross sectional view which illustrates the structure of a liquid vaporizing apparatus and a liquid-supply tank according to a thirty-seventh embodiment of the present invention.

A thirty-seventh embodiment of the present invention shown in FIG. 39 has an arrangement that the structure of the embodiment shown in FIG. 38 comprises an insulating plate 85 disposed between positions at which the supply pipe 81 and the liquid-supply pipe 13 are respectively opened in the liquid-supply tank 80 so as to lengthen the flow path in the liquid-supply tank 80. As a result, the mixture of the high-temperature liquid and the low-temperature liquid can be further prevented at the time of supplying the TEOS liquid A from the supply pipe 81 to the liquid-supply tank 80. Therefore, the TEOS liquid A having the same temperature as that of the TEOS liquid A in the container 23 can stably be supplied from the liquid-supply tank 80 to the container 23.

Figure 40:
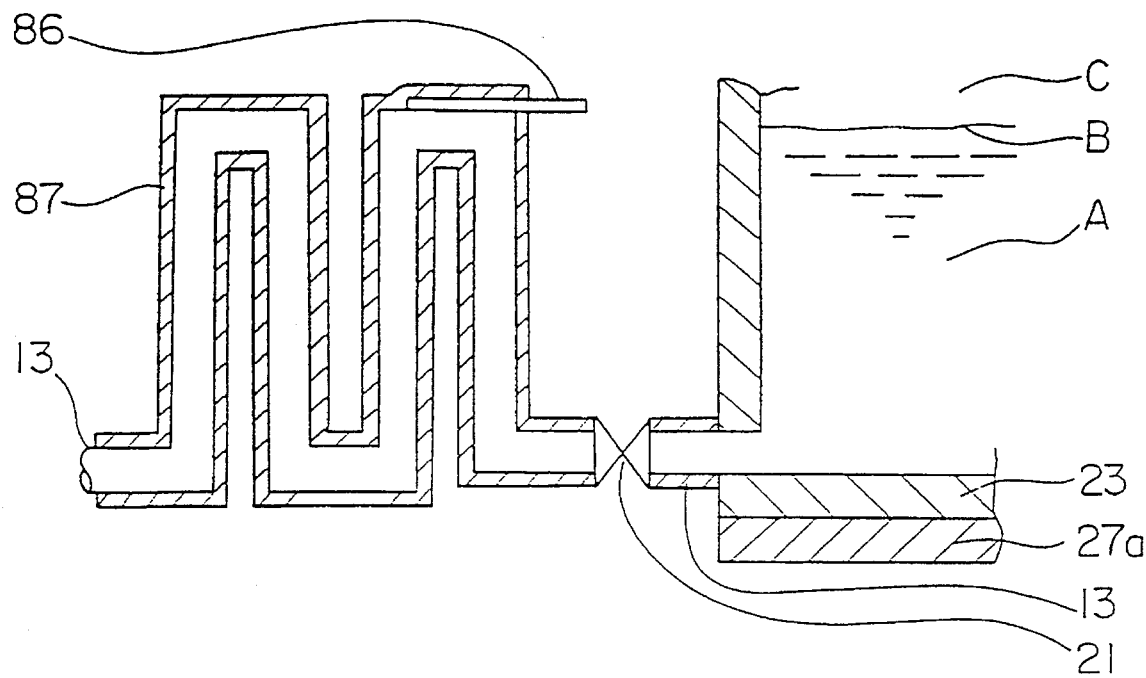
FIG. 40 is a vertical cross sectional view which illustrates the lower portion of a liquid vaporizing apparatus according to a thirty-eighth embodiment of the present invention.

In a thirty-eighth embodiment of the present invention shown in FIG. 40, a liquid-supply pipe 13 having a temperature sensor 86 and a heater 87 for controlling the temperature in accordance with the detected temperature is connected to the lower portion of the side wall of the container 23 in place of the liquid-supply tank 80. According to this embodiment, the liquid-supply pipe 13 for heating and maintaining the TEOS liquid A to be supplied to the container 23 enables the TEOS liquid A having the same temperature as that of the TEOS liquid A in the container 23 to be supplied into the container 23 without the foregoing liquid-supply tank 80. It should be noted that a length of the liquid-supply pipe 13 is required such that the capacity of the liquid-supply pipe 13 in the foregoing portion is larger than the quantity of the TEOS liquid A to be supplied to the container 23 in one supplying operation.

Figure 41:
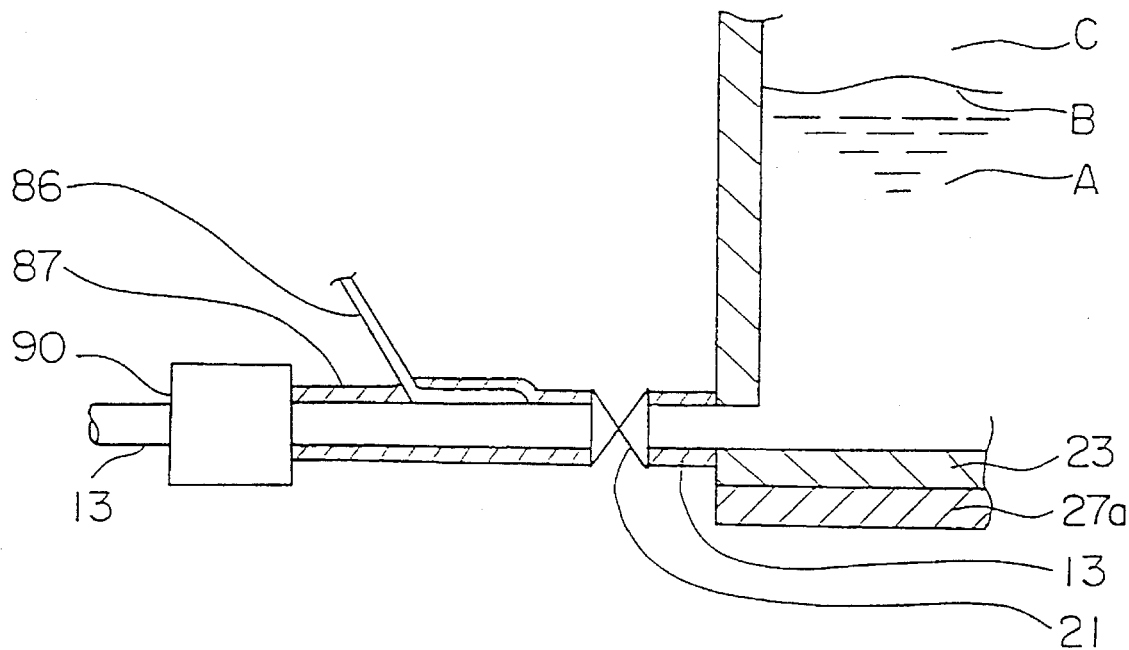
FIG. 41 is a vertical cross sectional view which illustrates the lower portion of a liquid vaporizing apparatus according to a thirty-ninth embodiment of the present invention.

A thirty-ninth embodiment of the present invention shown in FIG. 41 comprises the portion in which the heater 87 of the liquid-supply pipe 13 is shorter than that according to the embodiment shown in FIG. 40. Furthermore, a liquid flow-rate adjuster 90 for controlling the flow rate of the TEOS liquid A is disposed in the forward portion of the heater 87 so that the flow rate of the TEOS liquid A to be supplied is reduced. Thus, the TEOS liquid A is, by the heater 87, heated to the same temperature as that of the TEOS liquid A in the container 23 during its flow through the liquid-supply pipe 13. Therefore, the length for heating and maintaining the temperature can be made shorter such that the capacity of the corresponding portion is smaller than the quantity of the TEOS liquid A to be supplied to the container 23 in one supplying operation.

Figure 42:
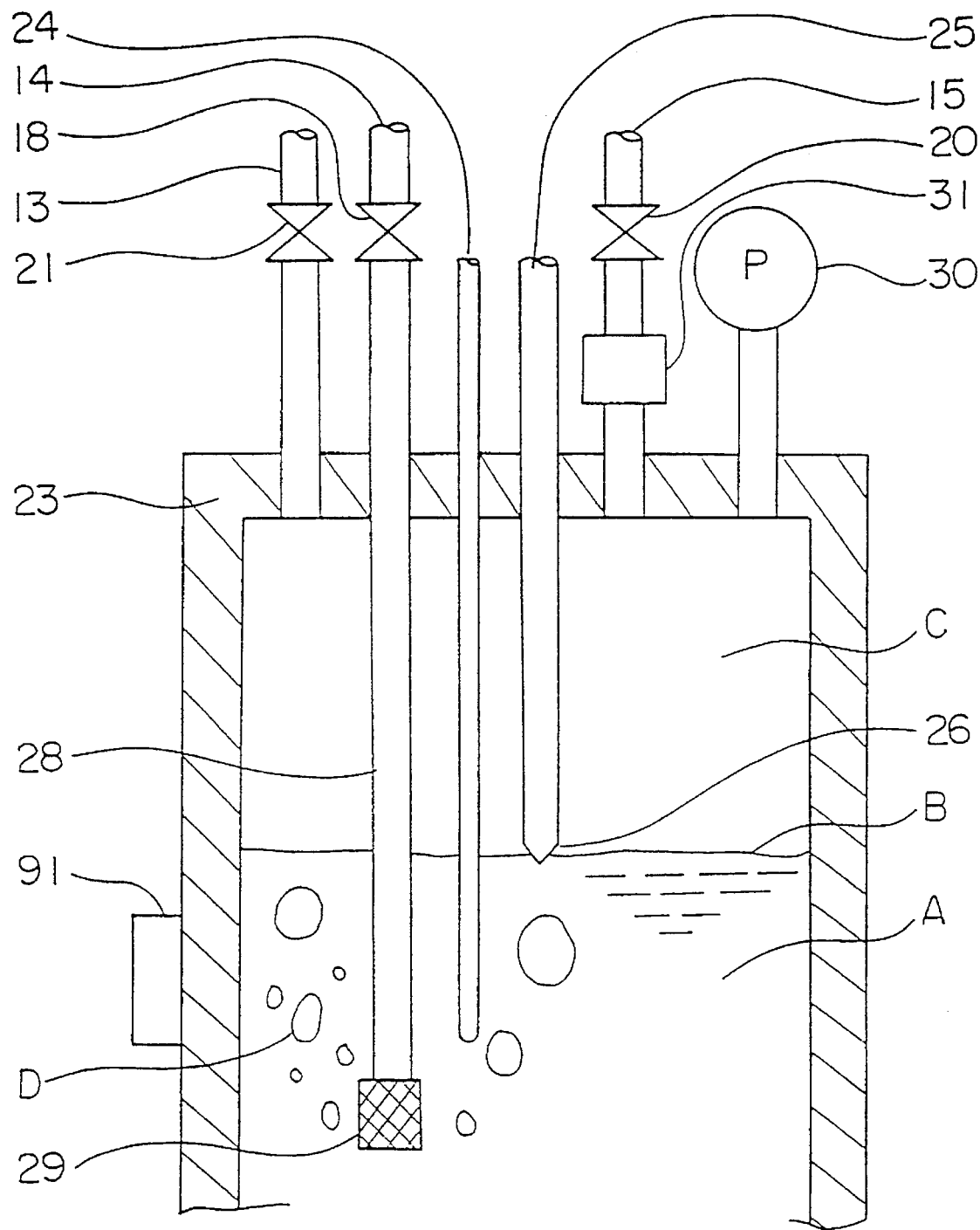
FIG. 42 is a vertical cross sectional view which illustrates the upper portion of a liquid vaporizing apparatus according to a fortieth embodiment of the present invention.

FIG. 42 illustrates a fortieth embodiment of the present invention. In this embodiment, a sound sensor 91 for detecting noise generated in the container 23 during bubbling and the vibration noise of the container 23 is disposed on the outer surface of the side wall of the container 23. The residual structures of this embodiment are substantially the same as those of the embodiment shown in FIG. 1.

Referring to FIG. 42, a state where the vaporization is constantly performed in the container 23 will now be described. The nitrogen gas is supplied to the bubbling tube 28 with a predetermined flow rate and under constant pressure so that the size, quantity and the force of the bubbles D passing through the mesh 29 are constant, causing the state of the liquid surface B to be constant. The noise generated during bubbling or the vibrations of the container 23 to be detected by the sound sensor 91 are constant.

Therefore, the noise in the container 23 generated during bubbling or the vibrations of the container 23 detected by the sound sensor 91 is always detected to enable a change in the state of the vaporization to be detected as a change in the value detected by the sound sensor 91 if the state of the vaporization changes due to some reason. Thus, if the value detected by the sound sensor 91 exceeds a predetermined allowable range, a determination is made that the state of the vaporization has been changed excessively due to abnormal lowering of the liquid surface B (reduction exceeding an allowable range) or the like and to stop the vaporization. Then, the TEOS liquid A or the like is supplied to overcome the cause of the abnormality, and then the vaporization is again started. Thus, the change in the quantity of vaporization can be minimized.

Figure 43:
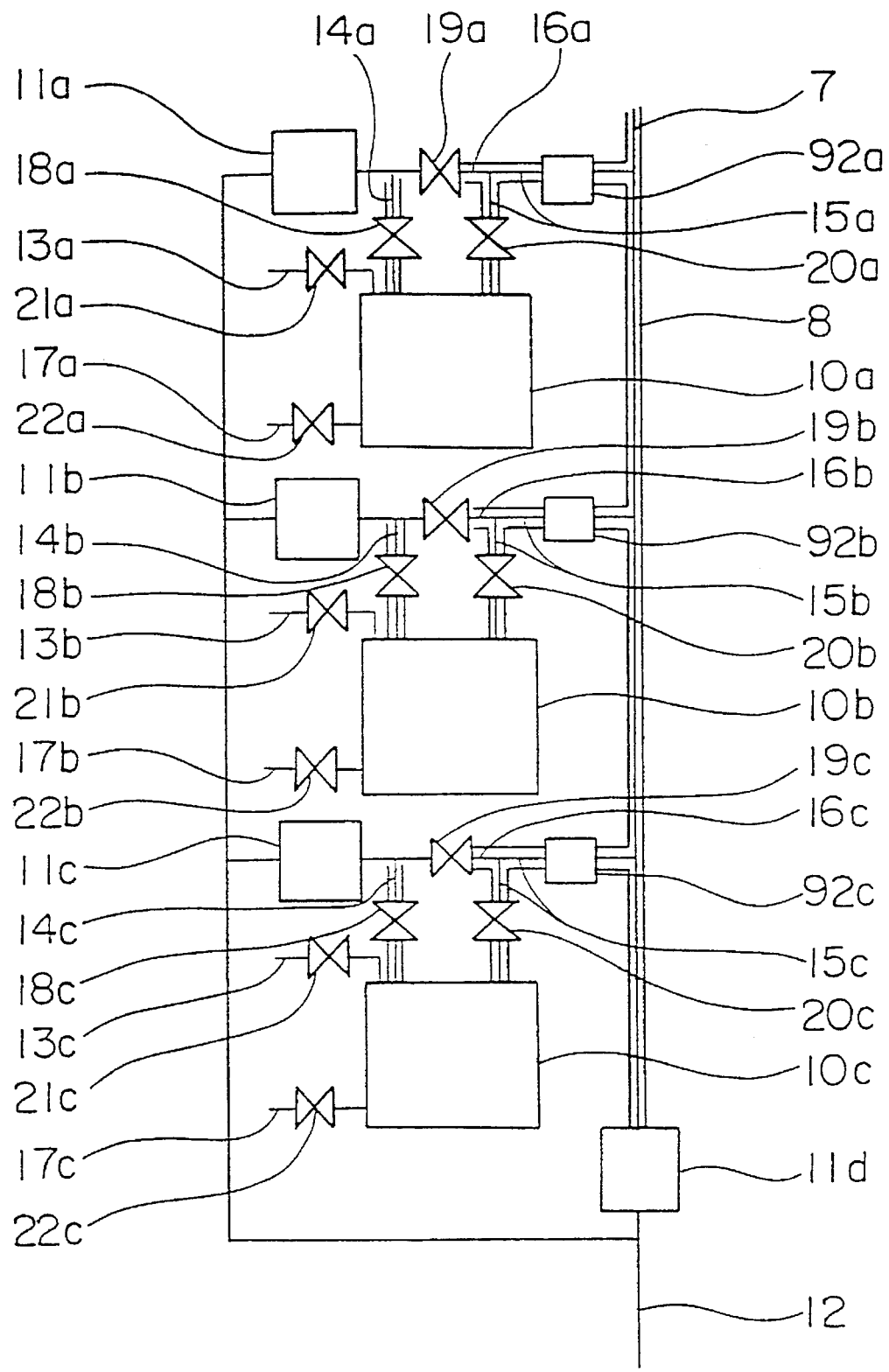
FIG. 43 is a schematic view which illustrates the structure of a vaporizing system according to a forty-first embodiment of the present invention.
Figure 51:
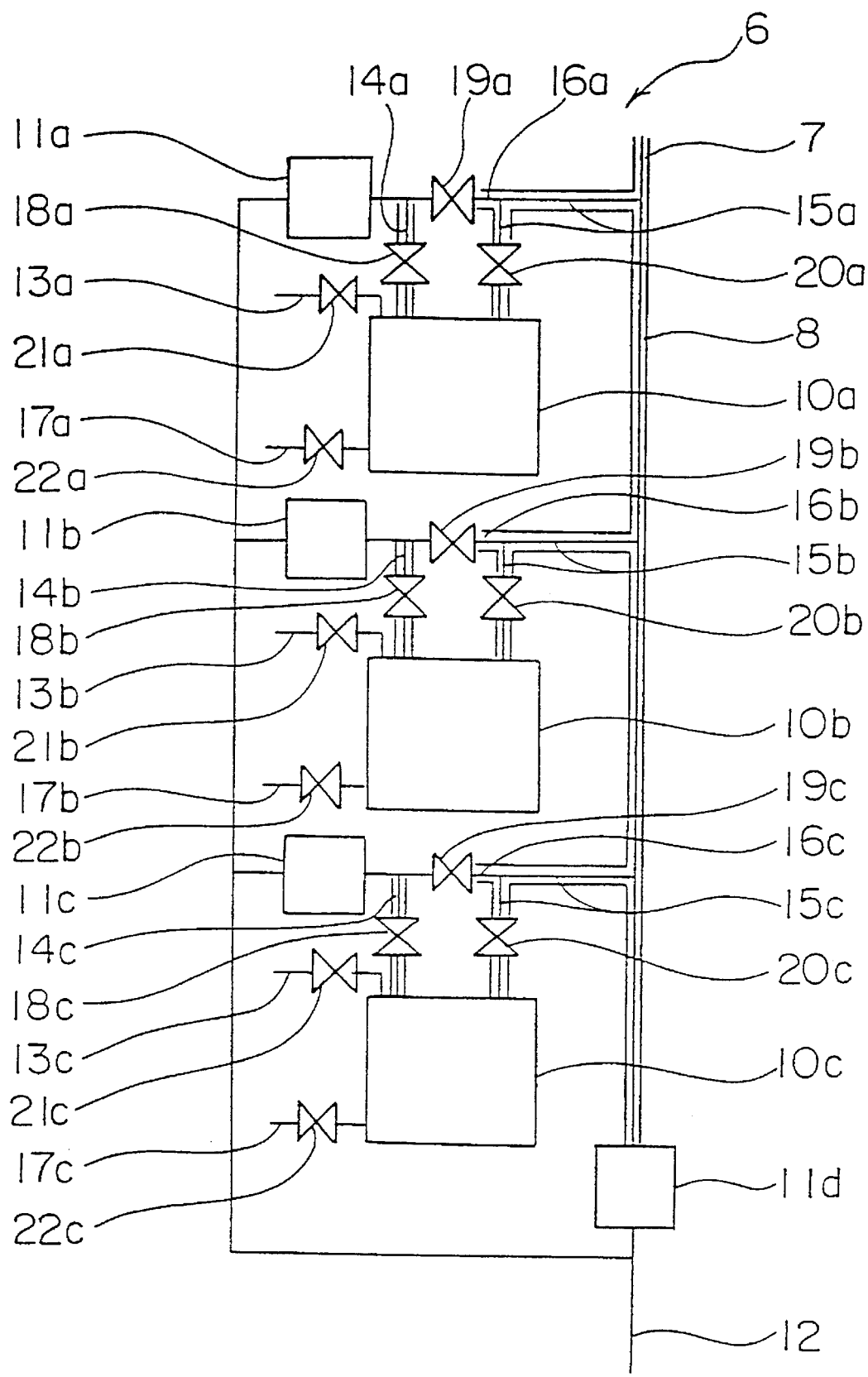
FIG. 51 is a schematic view which illustrates the structure of a conventional liquid vaporizing apparatus.

FIG. 43 is a schematic view which illustrates the schematic structure of a forty-first embodiment of the present invention. In this embodiment, vaporized-gas stabilizers 92a, 92b and 92c are connected to the corresponding gas ejection pipes 15a, 15b and 15c. The residual structures of this embodiment are the same as those of the conventional example shown in FIG. 51.

Figure 44:
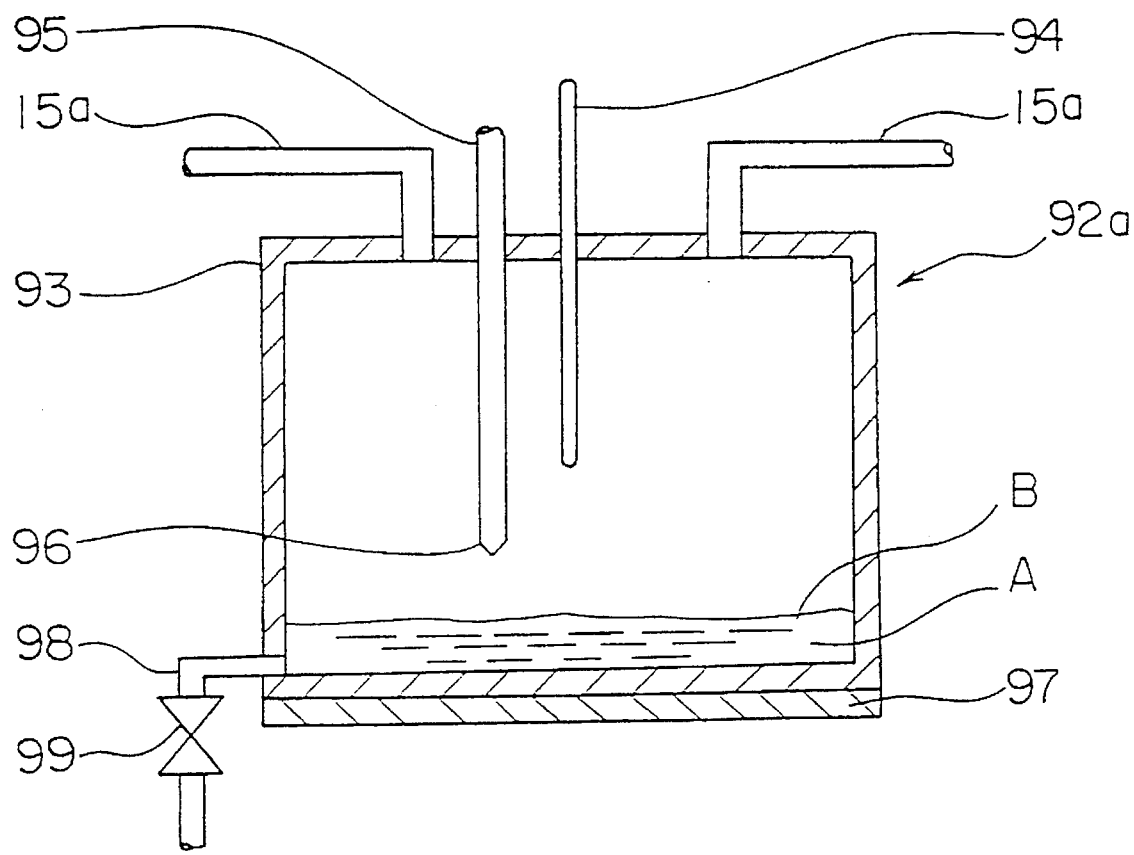
FIG. 44 is a vertical cross sectional view which illustrates the structure of a vaporized-gas stabilizer according to the forty-first embodiment of the present invention.

The vaporized-gas stabilizers 92a, 92b and 92c have the same structure, an example of which is shown in FIG. 44. Referring to FIG. 44, the vaporized-gas stabilizer 92a comprises: a hollow container 93 having an upper wall to which the gas ejection pipes 15a are connected; a temperature sensor 94 attached to the upper wall of the container 93 and detecting the temperature in the container 93; a liquid-surface sensor 95 similarly attached to the upper wall of the container 93 and having a detection portion 96 for detecting the liquid surface B of the TEOS liquid A remaining in the container 93; a heater 97 disposed on the outer surface of the bottom wall of the container 93 and heating the container bottom wall so that the temperature detected by the temperature sensor 94 is used to maintain the temperature in the container 93 at a predetermined level; and a drain pipe 98 connected to the lower portion of the side wall of the container 93 and having a valve 99.

Referring to FIG. 44, the operation of the vaporized-gas stabilizer 92a will now be described. The container 93 and its inside portion are heated and maintained at a predetermined temperature level by the temperature sensor 94 and the heater 97. The vaporized TEOS gas and the nitrogen gas flow into the container 93 through the gas ejection pipe 15a (the left gas ejection pipe shown in FIG. 44). Since the gas in the container 93 has been heated and maintained by the heater 97 at a level higher than the vaporization temperature for the TEOS gas, setting of the temperature of the container 93 to be lower than the vaporization temperature lowers the temperature of the vaporized TEOS gas. Therefore, the portion of the vaporized TEOS gas, the pressure of which is higher than the partial pressure of the evaporation pressure of the TEOS at the foregoing temperature, is again liquefied, thus resulting in it remaining in the container 93. A predetermined quantity of the residual portion of the vaporized TEOS gas is ejected from the vaporized-gas stabilizer 92a. If the liquid surface B of the TEOS liquid A remaining in the container 93 has been raised and detected by the detection portion 26 at the leading portion of the liquid-surface sensor 95, the valve 99 is opened for discharge through the drain pipe 98.

As a result, even if the quantity of the vaporized TEOS gas is changed by using the conventional vaporizer shown in FIG. 52 or 53, the quantity of the vaporized gas downstream from the vaporized-gas stabilizers 92a, 92b and 92c can be made to be constant at the partial pressure of the vapor pressure at the temperature of the vaporized-gas stabilizers 92a, 92b and 92c. Therefore, a constant quantity of the vaporized gas can always be supplied.

Figure 45:
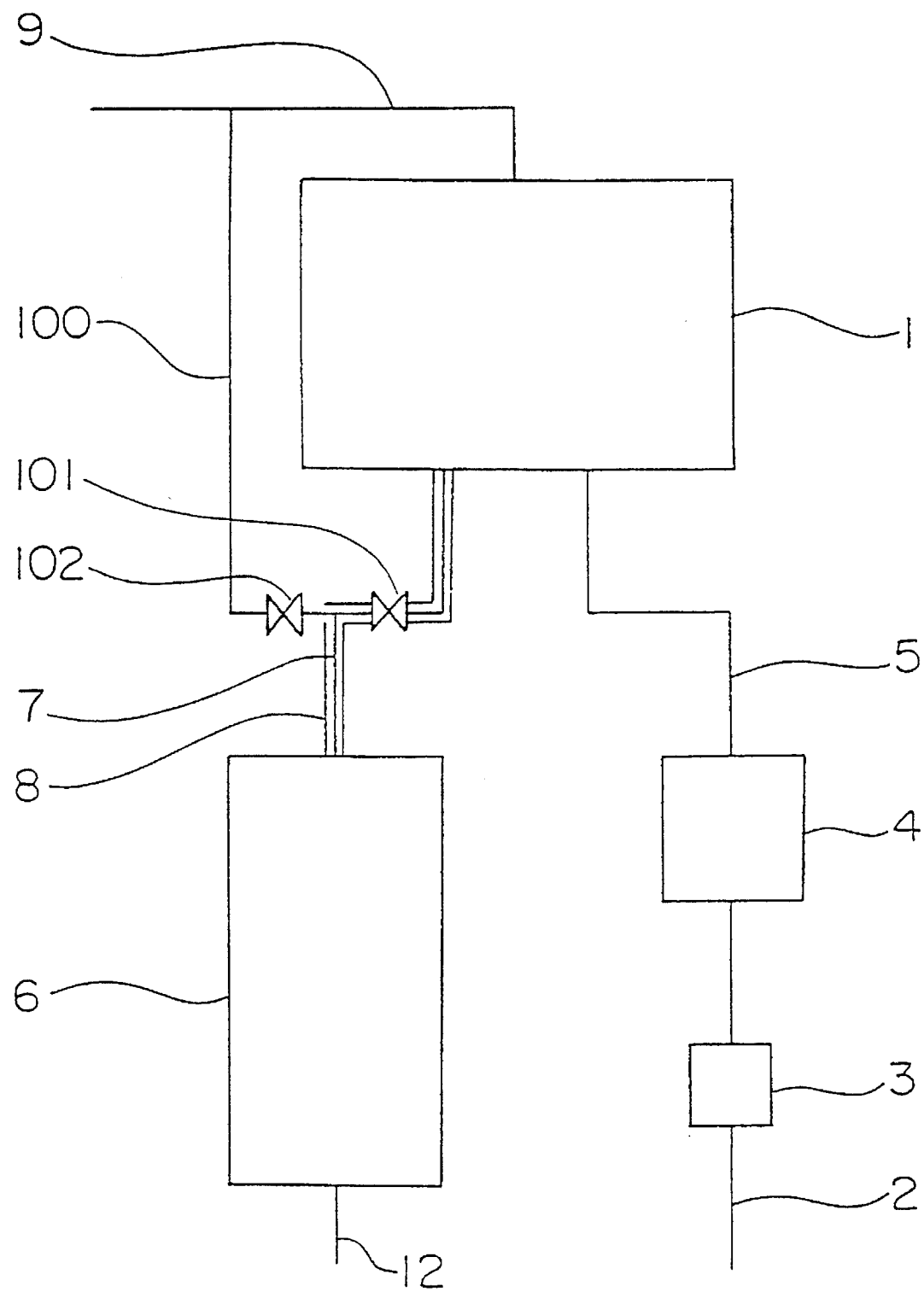
FIG. 45 is a schematic view which illustrates the structure of piping in a film forming apparatus according to a forty-second embodiment of the present invention.
Figure 50:
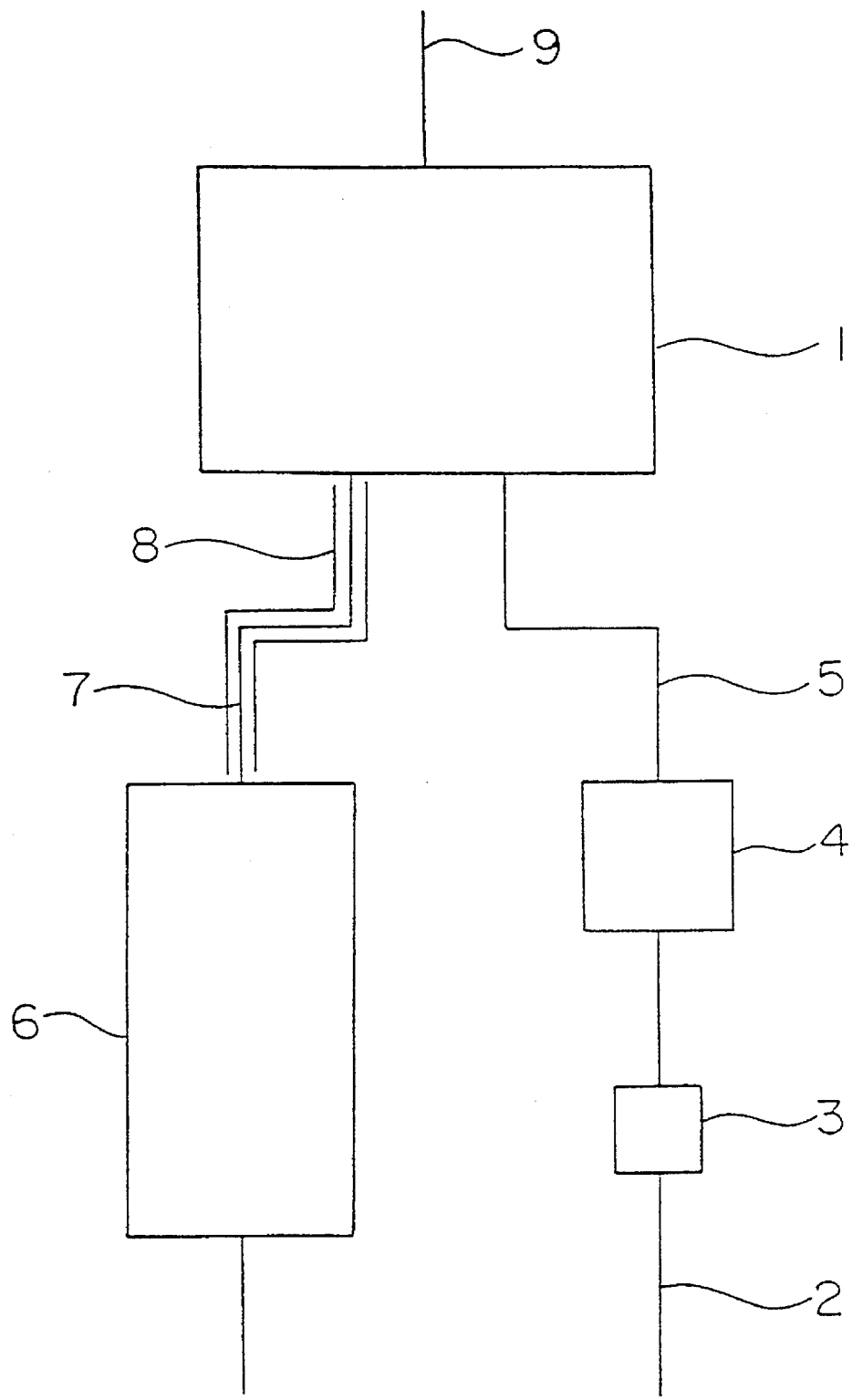
FIG. 50 is a schematic view which illustrates the structure of a conventional chemical gas-phase growth apparatus.

FIG. 45 is a schematic view which illustrates an embodiment of the structure of piping in the chemical gas-phase growth apparatus according to the present invention. This embodiment has substantially the same structure as that of the conventional example shown in FIG. 50 except the following structure. Referring to FIG. 45, a reaction-gas disposal pipe 100 branched at an intermediate position of the reaction-gas introduction pipe 7 extends from the liquid vaporizing apparatus 6 to the reaction chamber 1. The reaction-gas disposal pipe 100 is connected to the exhaust pipe 9 connected to the reaction chamber 1. The reaction-gas introduction pipe 7 and the reaction-gas disposal pipe 100 respectively have valves 101 and 102.

Figure 46:
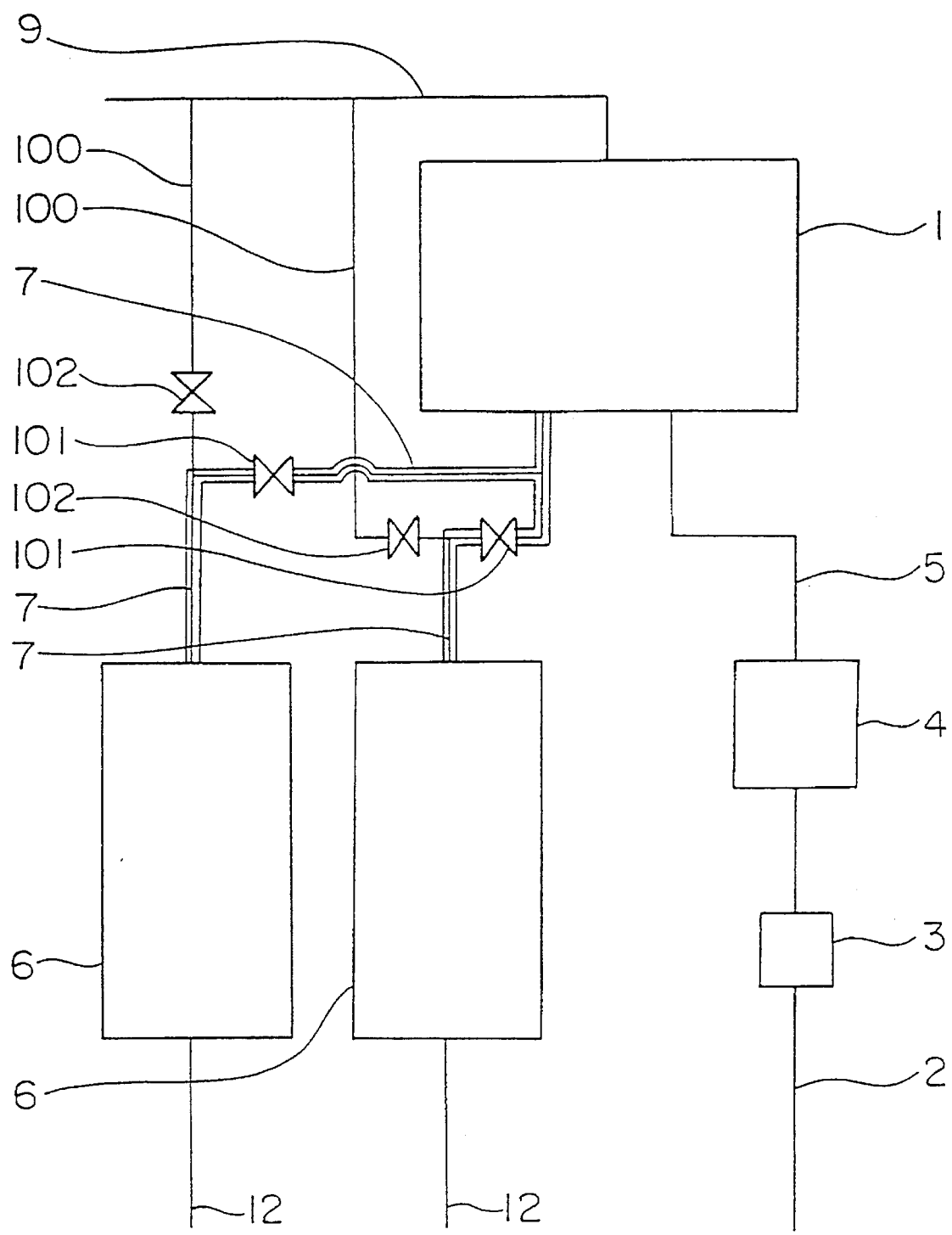
FIG. 46 is a schematic view which illustrates the structure of piping in a film forming apparatus according to a forty-third embodiment of the present invention.

Referring to FIG. 46, an operation for supplying the reaction gas to the reaction chamber 1 will now be described. The vaporization is commenced in the liquid vaporizing apparatus 6 prior to forming the film. At this time, the valve 101 is opened and the valve 102 is closed to flow the reaction gas from the liquid vaporizing apparatus 6 into the reaction-gas disposal pipe 100. When the film formation is commenced, the valve 102 is closed and the valve 101 is opened to flow the reaction gas from the liquid vaporizing apparatus 6 to the reaction chamber 1 through the reaction-gas introduction pipe 7.

When a predetermined film has been formed, the valve 102 is again opened and the valve 101 is closed to flow the reaction gas from the liquid vaporizing apparatus 6 into the reaction-gas disposal pipe 100. If the film formation is continued, the vaporization in the liquid vaporizing apparatus is continued even after the film formation has been completed. In a period between the film formation stages, that is, in a period in which the film formation is not performed by, for example, injecting/ejecting the semiconductor wafer (omitted from illustration) to and from the reaction chamber 1, the reaction gas is flowed to the reaction-gas disposal pipe 100. When the film formation is again commenced, the reaction gas is flowed to the reaction chamber 1 through the reaction-gas introduction pipe 7.

By forming a film in accordance with the foregoing procedure, there can be overcome a problem experienced with the conventional technology that the vaporized gas formed immediately after the commencement of the vaporization flows in a quantity larger than a steady state from the liquid vaporizing apparatus 6 to the reaction-gas disposal pipe 100 and to the reaction chamber 1. As a result, stable film formation can be performed. In a case where film formation is continuously performed, the vaporization in the liquid vaporizing apparatus 6 is not stopped. Therefore, the problems experienced with the conventional example shown in FIG. 50 can be prevented. Hence, further stable film formation can be performed.

Since the foregoing method has the arrangement that the vaporized gas flows to the reaction-gas disposal pipe 100 at the time of commencing the vaporization in the liquid vaporizing apparatus 6 until the flow rate of the vaporized gas from the liquid vaporizing apparatus 6 is stabilized, the vaporized gas cannot be supplied to the reaction chamber 1 until the flow rate of the vaporized gas is stabilized.

FIG. 46 schematically illustrates a chemical gas-phase growth apparatus according to another embodiment of the present invention which is capable of overcoming the foregoing problem. As shown in FIG. 46, this embodiment has an arrangement that a plurality of liquid vaporizing apparatus 6 are provided and the reaction-gas introduction pipe 7 and the reaction-gas disposal pipe 100 for each apparatus are disposed in parallel. Therefore, the vaporization is performed in one of the portions and supply of the liquid material, heating to a predetermined temperature level and flowing of the vaporized gas immediately after the commencement of the vaporization to the reaction-gas disposal pipe 100 are performed in another portion so that switching of the valves 101 and 102 enables the vaporized gas to be immediately supplied from the next liquid vaporizing apparatus 6 to the reaction chamber 1 in a stable quantity.

Figure 47:
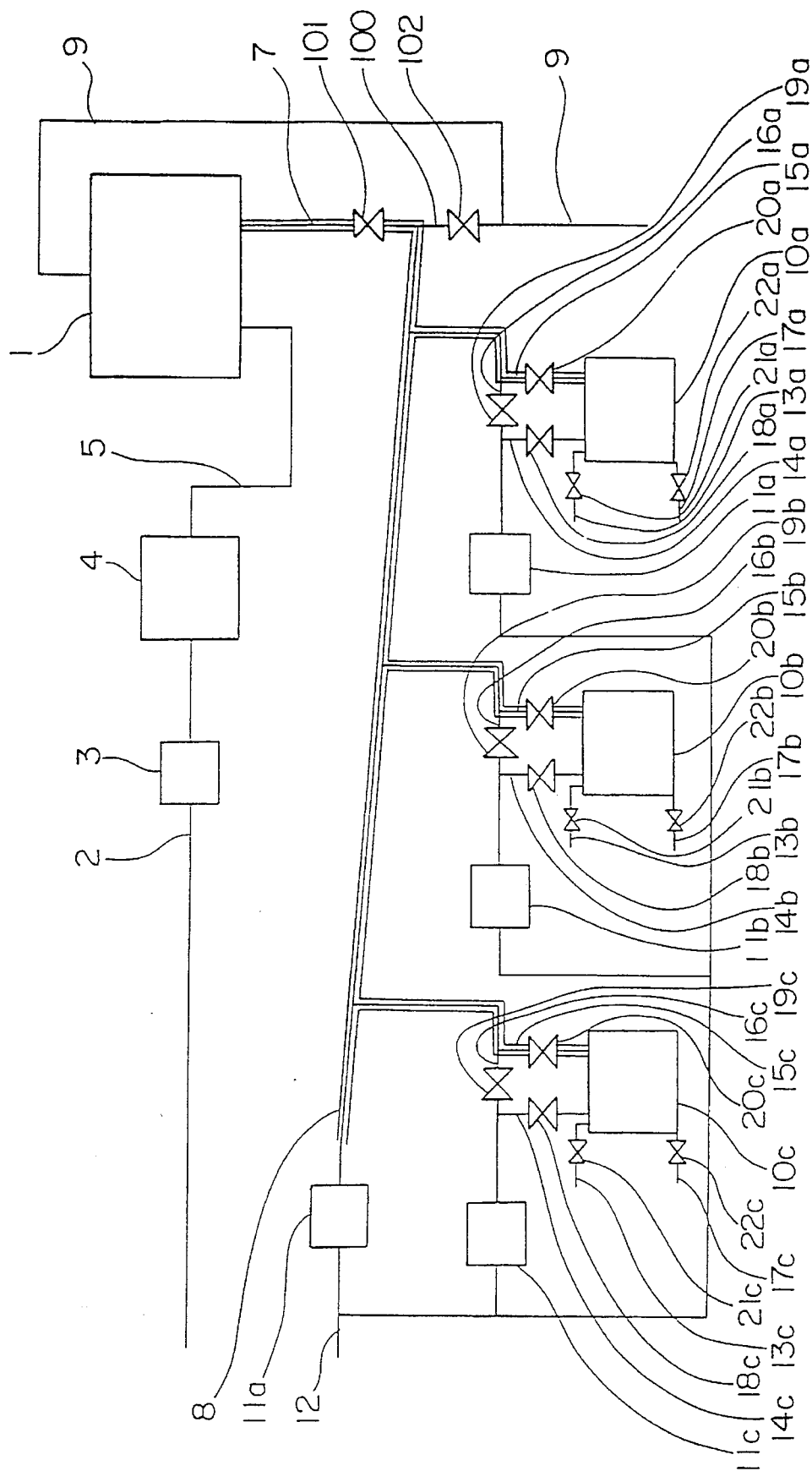
FIG. 47 is a schematic view which illustrates the structure of piping and a vaporizing system of a film forming apparatus according to a forty-fourth embodiment of the present invention.
Figure 48:
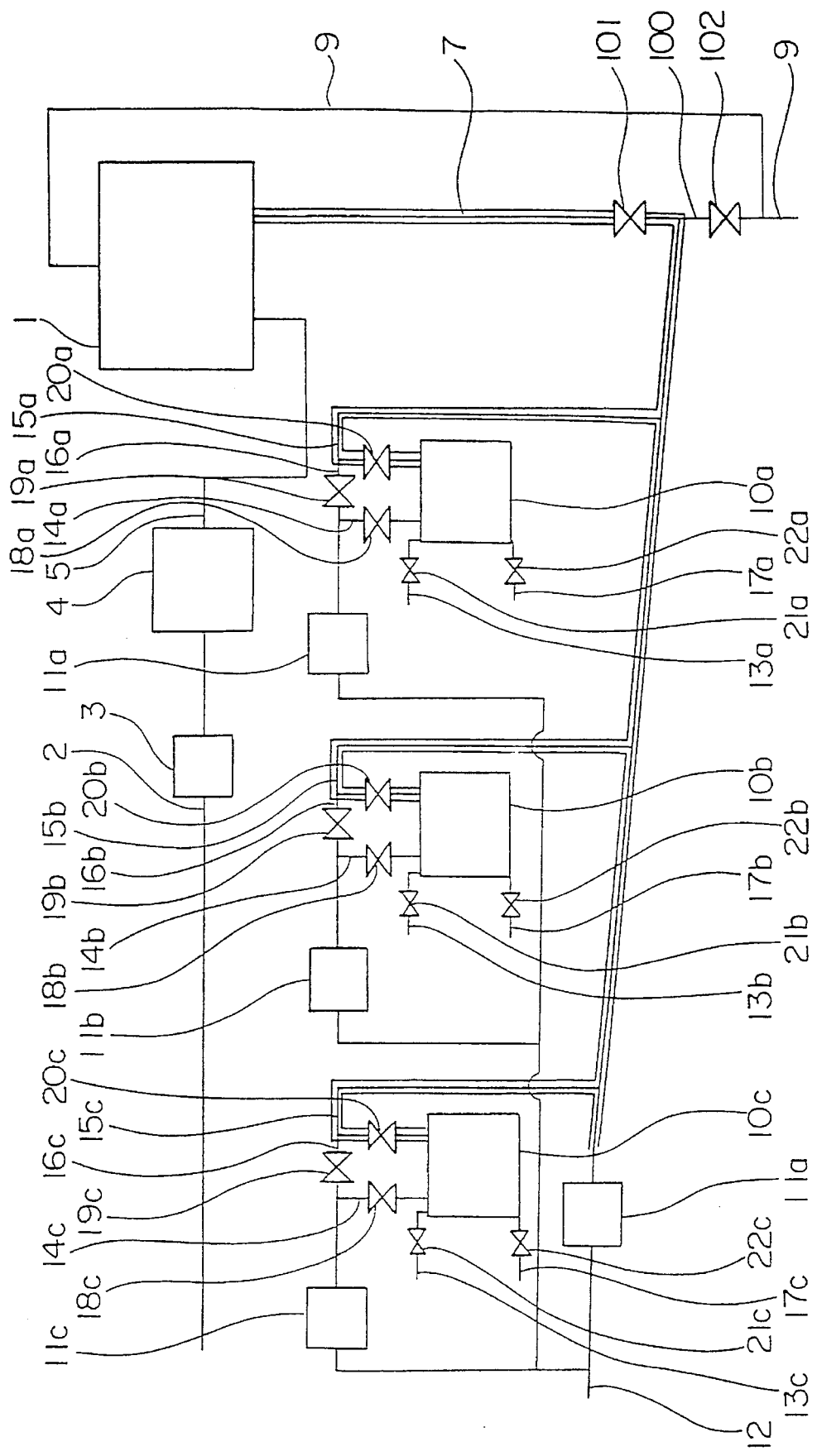
FIG. 48 is a schematic view which illustrates is a schematic view which illustrates the structure of piping and a vaporizing system of a film forming apparatus according to a forty-fifth embodiment of the present invention.

FIGS. 47 and 48 illustrate other embodiments of the present invention each showing the vertical cross section of the structure of a vaporizer, the structure of piping of a vaporizing system and the structure of piping of a chemical gas-phase growth apparatus, in particular schematically showing the direction of each piping.

The structure of the piping shown in FIG. 47 is substantially the same as that of the foregoing chemical gas-phase growth apparatus shown in FIG. 45 and opening/closing of the valves and the flow of the vaporized gas are the same as those of the foregoing apparatus. However, the reaction-gas introduction pipe 7 is disposed to face upwards and the reaction-gas disposal pipe 100 is disposed to face downwards. As a result, the problem experienced with the conventional technology can be prevented such that: if the TEOS liquid A in the vaporizers 10a, 10b and 10c flows over after it has flowed through the reaction-gas ejection pipes 15a, 15b and 15c due to a defect in operation of the liquid-surface sensor or the like, it flows to the reaction-gas disposal pipe 100 disposed at a lower portion, preventing the flow of the same from reaching the reaction chamber 1 through the reaction-gas introduction pipe 7 disposed at an upper portion. In the structure of the piping shown in FIG. 48, the reaction-gas ejection pipes 15a, 15b and 15c from the corresponding vaporizers 10a, 10b and 10c join the reaction-gas introduction pipe 7 from upper positions. Further, the reaction-gas introduction pipe 7 is disposed downwards from the first joint portion with the reaction-gas introduction pipe 7 facing toward the position at which it is branched from the reaction-gas disposal pipe 100. Therefore, even if liquid flows over one of the vaporizers 10a, 10b and 10c due to a defect in the operation of the liquid-surface sensor 25 or the like as described above, mixture of the liquids due to the introduction of the liquid into the reaction-gas ejection pipes 15a, 15b and 15c connected to the corresponding vaporizers 10a, 10a and 10b can be prevented. Furthermore, the foregoing liquid does not remain in the reaction-gas introduction pipe 7.

Figure 49:
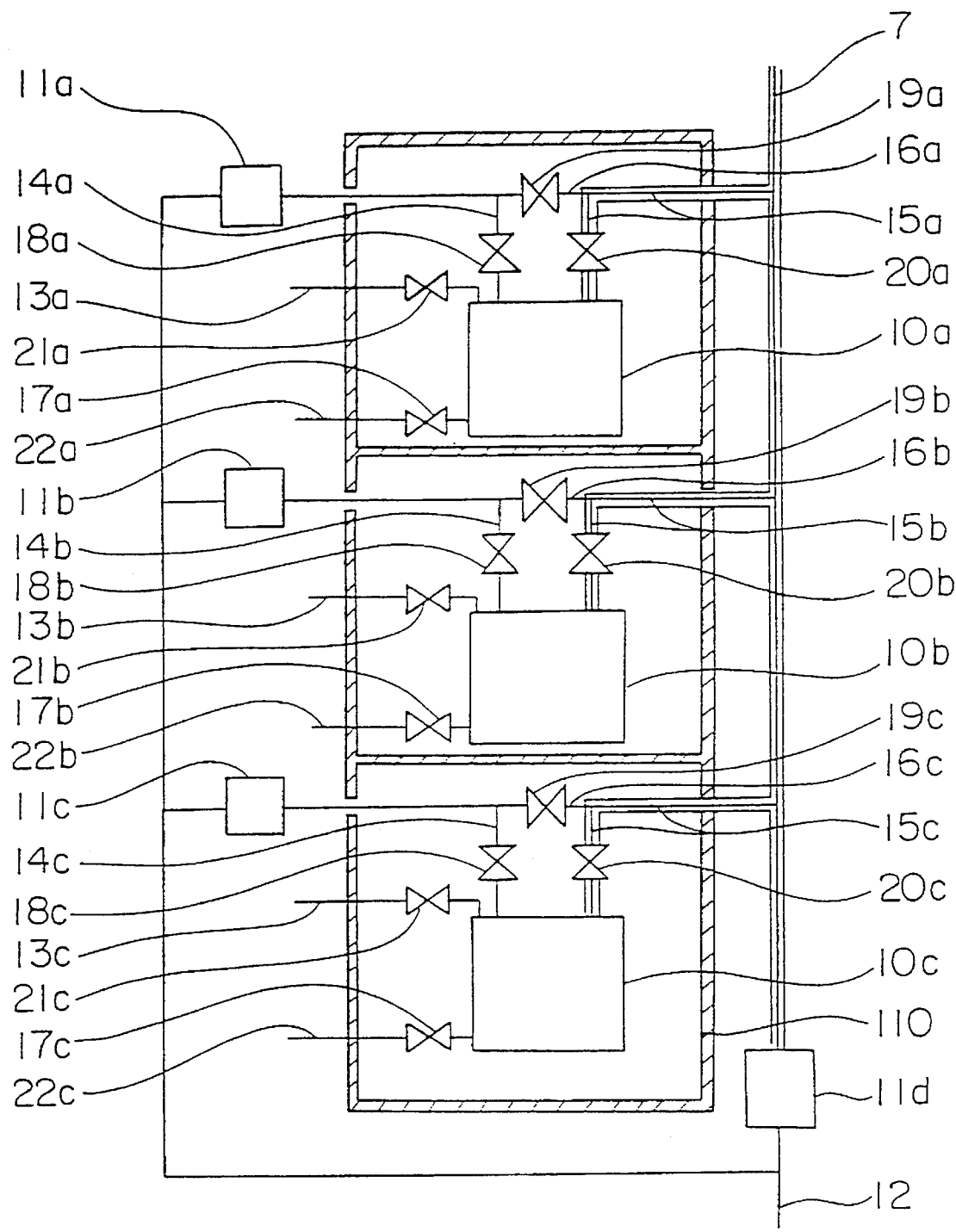
FIG. 49 is a schematic view which illustrates the structure of piping in a vaporizing system according to forty-sixth embodiment of the present invention.

FIG. 49 schematically illustrates the structure of piping of another embodiment of the present invention. Referring to the foregoing figure, reference numeral 110 represents a heat insulating material disposed to surround the vaporizers 10a to 10c and valves 18a to 18c, 19a to 19c, 20a to 20c, 21a to 21c and 22a to 22c provided for the corresponding vaporizers as individually separated units. As shown in FIG. 49, the heat insulating material 90 is disposed among the vaporizers 10a to 10c to decrease the influence of the temperature so as to enable the temperature of each of the vaporizers 10a to 10c to be controlled without mutual interference.

Although the nitrogen gas is used as gas for bubbling in each of the foregoing embodiments, a gas such as He or Ar may be employed if it is an inactive gas which does not react with the liquid to be vaporized. Although TEOS liquid is used as the liquid to be vaporized, any liquid may be employed to obtain the vaporized gas for forming a film made of a reaction product and having a predetermined characteristic. Although each of the foregoing embodiments has the arrangement that the TEOS liquid is heated and maintained at a temperature level higher than room temperature and the vaporization is performed by bubbling, bubbling may be performed depending upon the characteristics of the employed liquid so that the liquid is cooled and maintained at a temperature level lower than room temperature.

The shape, configuration and the structure and so forth of the containers, valves and the piping of each of the foregoing embodiments are not, of course, limited to the foregoing description. A plurality of the foregoing embodiments may be combined simultaneously within a scope in which their effects do not mutually affect another effect or inhibits another effect.

Although description has been, in each of the foregoing embodiments, made about a liquid vaporizing apparatus of a chemical gas-phase growth apparatus in which a liquid in a predetermined flow rate is vaporized in a vaporizer to be used as the reaction gas, the liquid vaporizing apparatus according to the present invention is not limited to this. The present invention may be employed in an apparatus or a system of a type in which liquid must be vaporized and it must be stably supplied at a predetermined flow rate.

Since the present invention is constituted as described above, the following effects can be obtained.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and a member disposed on the inner surface of the container in a portion which is immersed in the liquid in the container so as not to disorder natural convection of the liquid, extending from the inner surface of the container toward the inside portion of the liquid and exhibiting excellent heat conductivity. Therefore, the member exhibiting excellent heat conductivity enables heat to be conducted effectively from the container heated by the temperature adjustment means into the inside portion of the container. Therefore, the liquid in the container can be heated and maintained at a uniform temperature in a short time without vertical temperature irregularity.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and liquid-surface detection means for detecting the liquid surface of the liquid in the container, wherein all portions of the bubbling tube, the temperature detection means and the liquid-surface detection means that are disposed in the container are disposed below a liquid surface of the liquid in the container. Therefore, the factors for changing the temperature in the space above the liquid surface in the container can be eliminated, and therefore the space in the container above the liquid surface can be controlled and maintained at constant temperature.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; first temperature-detection means provided for the container and capable of detecting the temperature of the liquid; first temperature-adjustment means provided for the container and using the temperature detected by the first temperature-detection means to heat and maintain the liquid in the container at a predetermined temperature; second temperature-detection means for detecting the temperature of an internal space in the container formed on the liquid surface of the liquid in the container; and second temperature-adjustment means so provided for the container as to cover only the internal space in the container and using the temperature detected by the second temperature-detection means to perform control in such a manner that the temperature of the internal space in the container is the same as the temperature of the liquid. Therefore, the space in the container above the liquid surface can be controlled and maintained at constant temperature.

A liquid vaporizing apparatus according to the present invention has an arrangement that a portion of the container positioned between a lower end of a portion of the second temperature-adjustment means that is disposed on the side surface of the container and the liquid surface of the liquid in the container is made of material exhibiting excellent heat conductivity. Therefore, the heat conduct from the upper portion of the container heated by the second temperature-adjustment means to the lower portion of the same can be restricted effectively by the portion of the container made of the material having low heat conductivity. Thus, the space in the container above the liquid surface can be controlled and maintained at constant temperature without an influence of the temperature on the liquid.

A liquid vaporizing apparatus according to the present invention has an arrangement that a member exhibiting heat conductivity superior to that of a side wall portion of the container is so disposed in a portion of a lower portion of a side surface of the container in which the second temperature-adjustment means is not disposed as to outwards project over the outer surface of the container. As a result, even if heat is conducted from the upper portion of the side surface of the container heated by the second temperature-adjustment means to the lower portion of the side surface of the same, it is efficiently radiated to the outside portion by the member projecting over the side wall portion of the container. Therefore, the liquid in the container can be maintained at uniform temperature without vertical temperature irregularity.

A liquid vaporizing apparatus according to the present invention has an arrangement that a portion of the second temperature-adjustment means disposed on the side surface of the container is so constituted as to be capable of changing a portion effective to perform temperature adjustment in a direction of the height of the container. The adjustment of the effective portion disposed on the side surface of the container performed in accordance with change in the liquid surface in the container enables the space in the container above the liquid surface to be accurately controlled and maintained at constant temperature.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; first temperature-detection means provided for the container and capable of detecting the temperature of the liquid; first temperature-adjustment means provided for the container and using the temperature detected by the first temperature-detection means to heat and maintain the liquid in the container at a predetermined temperature; second temperature-detection means for detecting the temperature of an internal space in the container formed on the liquid surface of the liquid in the container; and second temperature-adjustment means disposed in the internal space of the container and using the temperature detected by the second temperature-detection means to perform control in such a manner that the temperature of the internal space in the container is the same as the temperature of the liquid. Therefore, the space in the container above the liquid surface can be controlled and maintained at constant temperature which is the same temperature as that of the liquid. A liquid vaporizing apparatus according to claim 8 of the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; first temperature-detection means provided for the container and capable of detecting the temperature of the liquid; first temperature-adjustment means provided for the container and using the temperature detected by the first temperature-detection means to heat and maintain the liquid in the container at a predetermined temperature; a cover so disposed in an upper portion of the container as to cover the internal space in the container and having, therein, a closed space for surrounding portions of the bubbling tube, the gas ejection pipe, the liquid-supply pipe and the first temperature-detection means that extend to the outside portion of the container; second temperature-detection means for detecting the temperature of the closed space in the cover; and second temperature-adjustment means provided for the cover and using the temperature detected by the second temperature-detection means to perform control in such a manner that the temperature of the closed space in the cover is the same as the temperature of the liquid. Therefore, the space in the container above the liquid surface can be controlled and maintained at constant temperature.

A liquid vaporizing apparatus according to the present invention has an arrangement that the bottom surface of the cover that is in contact with the side surface of the container is so constituted as to be capable of vertically moving along the container. Therefore, the temperature of the portions corresponding to the change of the space in the container above the liquid surface can be adjusted, and accordingly, the space in the container above the liquid surface can be accurately controlled and maintained at constant temperature without an influence of the temperature on the liquid.

A liquid vaporizing apparatus according to the present invention comprises: a first container for holding liquid to be vaporized in a predetermined quantity; a second container disposed in the first container and having an opening portion for introducing the liquid in the first container; a bubbling tube penetrating the first container and the second container to be inserted into liquid in the second container and capable of vaporizing the liquid by blowing predetermined gas into the liquid; a gas ejection pipe penetrating the first container to be connected to an upper portion of the second container and capable of ejecting the blown gas and the vaporized gas to the outside portion of the second container; a liquid-supply pipe for supplying the liquid into the first container; temperature detection means for detecting the temperature of the liquid in the second container; and temperature adjustment means provided for the first container and using the temperature detected by the temperature detection means to heat and maintain the liquid in the second container at a predetermined temperature. Therefore, the space in the container above the liquid surface can be controlled and maintained at constant temperature with is the same level as that of the liquid in the container.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the top surface of the container is formed into a mountain shape, the vertex of which is at the position at which the gas ejection pipe is attached and which is inclined to the side surfaces of the container. Therefore, liquid droplets allowed to adhere to the inner upper surface of the container can be returned into the liquid without accumulation.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and an insulating plate disposed in the container immediately below a position at which the gas ejection pipe is attached, having a plain area larger than the inner diameter of the gas ejection pipe and having a central portion projecting upwards. Therefore, ejection of the liquid droplets generated due to the vaporization from the container into the gas ejection pipe can be prevented.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and filter means so disposed in an internal space in the container formed on a liquid surface of the liquid in the container at a position between an opened end of the gas ejection pipe and the liquid surface as to traverse the internal space in the container and to be in contact with the inner surface of the container at the outer surface thereof and capable of permitting gas to pass through but inhibiting liquid to pass through. Therefore, liquid droplets and mist generated due to the vaporization can be brought into contact with the filter means so as to be vaporized.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the bubbling tube has a hollow diffusion plate having a plurality of small apertures on the top surface thereof, the diffusion plate having a plain area which is larger than the cross sectional area of the bubbling tube and smaller than the internal cross sectional area of the container. Therefore, a multiplicity of bubbles can be generated in a wide range from the diffusion plate to the portion around the bubbling tube. Further, the probability of joining of the bubbles can be lowered to enhance the vaporization of the liquid.

A liquid vaporizing apparatus according to the present invention has an arrangement that the diffusion plate is so provided with a filter capable of permitting gas to pass through and inhibiting liquid to pass through as to cover the small apertures in the top surface. Therefore, a counter flow of the liquid to the diffusion plate taking place when the vaporization is not performed can be prevented, and therefore the bubbles can stably be generated.

A liquid vaporizing apparatus according to the present invention has an arrangement that an ultrasonic oscillator is attached to the diffusion plate. Therefore, generated bubbles can be made to be smaller.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the bubbling tube is so constituted as to be formed into a shape having a narrowed leading portion. The flow velocity of the gas jetted from the leading portion of the bubbling tube can be raised and the generated bubbles can be made to be small size.

A liquid vaporizing apparatus according to the present invention has an arrangement that the narrow leading portion of the bubbling tube has, at the central portion thereof, a passage having an end opened in a direction in which the gas is jetted and another end which is communicated with the inside portion of the liquid. The generated bubbles can be made to be smaller size.

A liquid vaporizing apparatus according to the present invention has an arrangement that the bubbling tube is so disposed that its leading portion is positioned in the liquid in the container and allowed to face downwards at a position adjacent to the liquid surface. The distance for which the bubbles generated by the bubbling tube pass through the liquid can be lengthened.

A liquid vaporizing apparatus according to the present invention has an arrangement that the bubbling tube is so disposed that its leading portion is positioned in the liquid in the container at a position adjacent to the bottom portion of the container in a horizontal direction toward the side surface of the container. Therefore, the distance for which the bubbles pass through the liquid can be lengthened.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein an opening which causes the liquid to flow over to the outside portion and which can be opened/closed is formed in the upper portion of the side surface of the container. Therefore, the height of the liquid surface in the container can be made to be constant by causing overflow to take place at the position of the opening.

A liquid vaporizing apparatus according to the present invention has an arrangement that a supply container connected to the liquid-supply pipe and capable of supplying the liquid to the container through the liquid-supply pipe is disposed below the container, and the opening and the supply container are connected to each other by an overflow pipe. The liquid, which has flowed over, can be again supplied to the container.

A liquid vaporizing apparatus according to the present invention has an arrangement that the liquid-supply pipe is provided with a pump for, under pressure, sending the liquid from the supply container to the container. Therefore, the height of the liquid surface can be made to be constant by causing the overflow to take place.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the top surface of the container and capable of ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and a capacity-variable liquid-surface adjustment container disposed in the liquid in the container and having a capacity which is expanded in accordance with lowering of the liquid surface. The capacity of the liquid-surface adjustment container is enlarged as the liquid surface lowers so that the liquid in the container is flowed over to make the height of the liquid surface to be constant.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the upper surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the inside portion of the container is, by an insulating wall, sectioned into a liquid vaporizing portion having the bubbling tube and the gas ejection pipe and a liquid-supply portion having the liquid-supply pipe, an upper portion of the insulating wall has an opening for flowing over the liquid in the liquid vaporizing portion toward the liquid-supply portion, a liquid circulation pipe is used to establish the connection between the liquid-supply portion and the liquid vaporizing portion, and a pump for supplying the liquid from the liquid-supply portion to the liquid vaporizing portion is disposed in the liquid circulation pipe. The pump is used to return the liquid flowed over the container into the container through the liquid circulation pipe so that the liquid in the container is caused to always flow over so as to make the height of the liquid surface to be constant.

A liquid vaporizing apparatus according to the present invention has an arrangement that a filter is disposed in the liquid circulation pipe for removing impurities in the liquid flowing in the liquid circulation pipe. Therefore, foreign substances generated in the liquid can be removed.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the upper surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the inside portion of the container is, by an insulating wall, sectioned into a liquid vaporizing portion having the bubbling tube and the gas ejection pipe and a liquid-supply portion having the liquid-supply pipe, an upper portion of the insulating wall has an opening for flowing over the liquid in the liquid vaporizing portion toward the liquid-supply portion, a liquid circulation pipe is used to establish the connection between the liquid-supply portion and the liquid vaporizing portion, an end of the liquid circulation pipe is immersed in the liquid in the liquid-supply portion and another end of the same is connected to a passage formed in the narrow leading portion of the bubbling tube disposed in the liquid vaporizing portion. Therefore, the height of the liquid surface can be made to be constant by causing the liquid to flow over in the container. Further, the running cost of the apparatus can be reduced because no pump is used.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe connected to the upper surface of the container and capable of ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the liquid-supply pipe is connected to the container at a position below the liquid surface in the container. Therefore, fall of the supply liquid from the liquid-supply pipe into the liquid in the container can be prevented. As a result, flying of the liquid to adhere to the inner surface of the container and introduction of the same into the gas ejection pipe or the like can be prevented.

A liquid vaporizing apparatus according to the present invention has an arrangement that the liquid-supply pipe includes flow-rate adjustment means for detecting and controlling the flow rate of the liquid flowing in the liquid-supply pipe, and a valve is disposed between the flow-rate adjustment means of the liquid-supply pipe and the container. Therefore, the control performed by the flow-rate adjustment means enables the liquid to be always supplied from the liquid-supply pipe into the container in a constant quantity. As a result, the height of the liquid surface can be made to be constant.

A liquid vaporizing apparatus according to the present invention has an arrangement that a bypass pipe bypassing the flow-rate adjustment means and the valve is connected to the liquid-supply pipe, and a valve is provided for the bypass pipe. The flow-rate adjustment means enables the liquid to be always supplied into the container in a constant quantity. In addition, the bypass pipe is used at predetermined intervals to rapidly supply the liquid in a short time so that the height of the liquid surface is made to be constant.

A liquid vaporizing apparatus according to the present invention has an arrangement that the liquid-supply pipe is provided with pressure detection means for detecting the pressure of the liquid flowing in the liquid-supply pipe and pressure adjustment means for controlling the supply pressure of the liquid in accordance with the pressure detected by the pressure detection means. The pressure in the upper space in the container and the liquid supply pressure can be balanced by the pressure adjustment means so that the height of the liquid surface is made to be constant.

A liquid vaporizing apparatus according to the present invention comprises: a first container for holding liquid to be vaporized in a predetermined quantity; a bubbling tube inserted into the liquid in the first container and capable of vaporizing the liquid by blowing a predetermined gas into the liquid; a gas ejection pipe connected to the upper surface of the first container and capable of ejecting the blown gas and the vaporized gas to the outside portion of the first container; first temperature-detection means provided for the first container and capable of detecting the temperature of the liquid in the first container; first temperature-adjustment means provided for the first container and using the temperature detected by the first temperature-detection means to heat and maintain the liquid in the first container at a predetermined temperature; a second container disposed below the first container and capable of reserving the liquid in a quantity larger than that of the liquid to be steadily supplied into the first container; second temperature-detection means provided for the second container and capable of detecting the temperature of the liquid in the second container; second temperature-adjustment means provided for the second container and using the temperature detected by the second temperature-detection means to heat and maintain the liquid in the second container at a temperature which is the same as the temperature of the liquid in the first container; and valve-equipped liquid-supply pipe that establishes the connection between the second container and a lower portion of the first container so as to supply the liquid from the second container into the first container. Therefore, the liquid, the temperature of which is the same as that in the container, can be supplied to the container with a simple means.

A liquid vaporizing apparatus according to the present invention has an arrangement that a partition plate is disposed in the second container at a position between an upper portion to which the liquid-supply pipe is connected and a lower portion to which a pipe for supplying the liquid to the second container in order to lengthen the passage for the liquid. A liquid vaporizing apparatus according to the present invention comprises: a container for holding liquid to be vaporized in a predetermined quantity; a bubbling tube inserted into the liquid in the first container and capable of vaporizing the liquid by blowing a predetermined gas into the liquid; a gas ejection pipe connected to the upper surface of the first container and capable of ejecting the blown gas and the vaporized gas to the outside portion of the first container; a liquid-supply pipe connected to the container at a position below the liquid surface in the container and capable of supplying the liquid into the container; first temperature-detection means provided for the container and capable of detecting the temperature of the liquid in the container; first temperature-adjustment means provided for the container and using the temperature detected by the first temperature-detection means to heat and maintain the liquid in the container at a predetermined temperature; second temperature-detection means for detecting the temperature of the liquid in the liquid-supply pipe; and second temperature-adjustment means for controlling the temperature of the liquid in the liquid-supply pipe to be the same as the temperature of the liquid in the container in accordance with the temperatures detected by the first and second temperature-detection means, wherein a capacity of a portion of the liquid-supply pipe which is subjected to temperature adjustment is larger than a quantity of the liquid to be supplied to the container by one supply operation. Therefore, the liquid, the temperature of which is the same as that of the liquid in the container, can be supplied to the container further accurately.

A liquid vaporizing apparatus according to the present invention comprises: a container for holding liquid to be vaporized in a predetermined quantity; a bubbling tube inserted into the liquid in the first container and capable of vaporizing the liquid by blowing a predetermined gas into the liquid; a gas ejection pipe connected to the upper surface of the first container and capable of ejecting the blown gas and the vaporized gas to the outside portion of the first container; a liquid-supply pipe connected to the container at a position below the liquid surface in the container and capable of supplying the liquid into the container; first temperature-detection means provided for the container and capable of detecting the temperature of the liquid in the container; first temperature-adjustment means provided for the container and using the temperature detected by the first temperature-detection means to heat and maintain the liquid in the container at a predetermined temperature; second temperature-detection means for detecting the temperature of the liquid in the liquid-supply pipe; second temperature-adjustment means for controlling the temperature of the liquid in the liquid-supply pipe to be the same as the temperature of the liquid in the container in accordance with the temperatures detected by the first and second temperature-detection means, and flow-rate adjustment means for controlling the flow rate of the liquid which flows in the liquid-supply pipe. Therefore, the liquid, the temperature of which is the same as that of the liquid in the container, can be supplied to the container further accurately.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and means for detecting sound in the container or vibrations of the container. Therefore, the change in the state of the vaporization in the container can be detected, and therefore the liquid can be supplied in accordance with the detected change.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; temperature adjustment means provided for the container and using the temperature detected by the temperature detection means to heat and maintain the liquid in the container at a predetermined temperature; and vaporized-gas stabilizing means disposed at a position in front of a position at which the gas ejection pipe joins together another pipe and capable of controlling the flow rate of the vaporized gas flowing in the gas ejection pipe to a control value. Therefore, the vaporized gas can always be supplied in a predetermined quantity to the portion in which the vaporized gas is used.

A liquid vaporizing apparatus according to the present invention has an arrangement that the vaporized-gas stabilizing means comprises a second container having an upper portion to which a pipe for introducing/ejecting the vaporized gas from the gas ejection pipe is connected and a lower portion to which a drain pipe is connected, second temperature-detection means for detecting the temperature of the inside portion of the second container, and second temperature-adjustment means for controlling the temperature in the second container in accordance with the temperature detected by the second temperature-detection means. Therefore, the vaporized gas can always be supplied in a predetermined quantity to the portion in which the vaporized gas is used.

A liquid vaporizing apparatus according to the present invention comprises: a container for holding liquid to be vaporized in a predetermined quantity; a bubbling tube inserted into the liquid in the container and capable of vaporizing the liquid by blowing a predetermined gas into the liquid; a gas ejection pipe for ejecting the blown gas and the vaporized gas to the outside portion of the container; a liquid-supply pipe for supplying the liquid into the container; temperature detection means provided for the container and capable of detecting the temperature of the liquid in the container; and temperature adjustment means provided for the container and using the temperature detected by the temperature detection means to heat and maintain the liquid in the container at a predetermined temperature, wherein the gas ejection pipe connected to the container is branched into two sections each having a valve, one of branched pipes is connected to a portion in which the vaporized gas is used and another branched pipe is connected to an exhaust pipe. Therefore, the vaporized gas can be supplied in a predetermined quantity to the portion in which the vaporized gas is used.

A liquid vaporizing apparatus according to the present invention comprises: a plurality of containers for holding liquid to be vaporized in a predetermined quantity; a bubbling tube inserted into the liquid in each of the containers and capable of vaporizing the liquid by blowing a predetermined gas into the liquid; a gas ejection pipe provided for each of the containers and capable of ejecting the blown gas and the vaporized gas to the outside portion of the containers; a liquid-supply pipe for supplying the liquid into each of the containers; temperature detection means provided for each of the containers and capable of detecting the temperature of the liquid in each of the container; and temperature adjustment means provided for each of the containers and using the temperatures detected by the temperature detection means to heat and maintain the liquid in the containers at a predetermined temperature, wherein each of the gas ejection pipes connected to each of the containers is branched into two sections each having a valve, a group of branched pipes is connected to a portion in which the vaporized gas is used, another group of the branched pipes is connected to an exhaust pipe, and the branched pipes in the group branched from the gas ejection pipes are joined together at a position between a branch position and a portion in which the vaporized gas is used. By switching the valves, the vaporized gas can be supplied in a predetermined quantity to the portion in which the vaporized gas is used without a time delay.

A liquid vaporizing apparatus according to the present invention has an arrangement that one pipe formed by joining the gas ejection pipes extending from the plural containers is inclined in such a manner that its position adjacent to the container is positioned above the branched point, and the pipe is branched into two sections in such a manner that one of the branched pipes to be connected to the portion in which the vaporized gas is used is branched upwards and another branched pipe to be connected to the exhaust pipe is branched downwards. Therefore, shift of the liquid flowed over the container to the portion in which the vaporized gas is used is inhibited so that a breakdown or the like of the unit at the foregoing portion can be prevented.

A liquid vaporizing apparatus according to the present invention has an arrangement that each of the gas ejection pipes is, from an upper portion, allowed to individually join together a pipe connected to a portion in which the vaporized gas generated in the container is used. Therefore, mixture of liquids flowed over the container can be prevented.

A liquid vaporizing apparatus according to the present invention has an arrangement that the plural containers are, together with the bubbling tube, the gas ejection pipe, the temperature detection means and the temperature adjustment means provided for each container, covered with a heat insulating member so as to be separated from one another. The temperature of each container can be controlled without mutual interference.

What is claimed is:

1. A liquid vaporizing apparatus comprising:
   a container for holding a liquid to be vaporized;
   a bubbling tube inserted into said container for vaporizing the liquid by blowing a gas into the liquid;
   a gas ejection pipe for ejecting blown gas and vaporized liquid outside of said container;
   a liquid-supply pipe for supplying the liquid into said container;
   first temperature-detection means for detecting the temperature of the liquid in said container;
   first temperature-adjustment means responsive to said first temperature-detection means for maintaining the liquid in said container at a predetermined temperature;
   second temperature-detection means for detecting the temperature of an internal space in said container above the liquid in said container; and
   second temperature-adjustment means for controlling the temperature of the internal space in said container and using the temperature detected by said second temperature-detecting means to control the temperature of the internal space in said container to be the same as the temperature of the liquid in said container.

2. The liquid vaporizing apparatus according to claim 1 wherein said second temperature-adjustment means is disposed in the internal space in said container.

3. The liquid vaporizing apparatus according to claim 1 wherein said second temperature-adjustment means is disposed on said container covering the internal space in said container.

4. The liquid vaporizing apparatus according to claim 3 wherein a portion of said container between a lower end of said second temperature-adjustment means on a side surface of said container and the surface of the liquid container is made of a material exhibiting excellent heat conductivity.

5. The liquid vaporizing apparatus according to claim 3 including a member having a higher heat conductivity than a side wall of said container disposed on a side surface of said container where said second temperature-adjustment means is not present and projecting along an outside surface of said container.

6. The liquid vaporizing apparatus according to claim 3 wherein a portion of said second temperature-adjustment means is disposed on part of a side surface of said container and including separate parts for changing the temperature at selectable locations along the side surface of said container.

7. A liquid vaporizing apparatus comprising:
   a container for holding a liquid to be vaporized;
   a bubbling tube inserted into said container for vaporizing the liquid by blowing a gas into the liquid;
   a gas ejection pipe for ejecting blown gas and vaporized liquid outside of said container;
   a liquid-supply pipe for supplying the liquid into said container;
   first temperature-detection means for detecting the temperature of the liquid in said container;
   first temperature-adjustment means responsive to said first temperature-detection means for maintaining the liquid in said container at a predetermined temperature;
   a cover disposed in an upper portion of said container covering an internal space in said container and having therein a closed space surrounding portions of said bubbling tube, said gas ejection pipe, said liquid supply pipe, and said first temperature-detection means that extend outside of said container;
   second temperature-detection means for detecting the temperature of the closed space in said cover; and
   second temperature-adjustment means provided for said cover and using the temperature detected by said second temperature-detecting means to control the temperature of the closed space in said cover to be the same as the temperature of the liquid in said container.

8. A liquid vaporizing apparatus according to claim 7 wherein a bottom surface of said cover in contact with a side surface of said container is vertically movable along said container.

* * * * *